(12) United States Patent
Takata et al.

(10) Patent No.: US 6,809,829 B1
(45) Date of Patent: Oct. 26, 2004

(54) METHOD AND APPARATUS FOR EVALUATING ABERRATIONS OF OPTICAL ELEMENT AND METHOD AND APPARATUS FOR ADJUSTING OPTICAL UNIT AND LENS

(75) Inventors: Kazumasa Takata, Osaka-fu (JP); Masahiro Nakajo, Osaka-fu (JP); Kanji Nishii, Osaka-fu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/573,257

(22) Filed: May 18, 2000

(30) Foreign Application Priority Data

May 19, 1999 (JP) ............................................. 11-138584
Oct. 8, 1999 (JP) ............................................. 11-287865
Oct. 8, 1999 (JP) ............................................. 11-287868
Oct. 20, 1999 (JP) ............................................. 11-298184

(51) Int. Cl.[7] ................................................. G01B 9/02
(52) U.S. Cl. ........................... 356/520; 356/521; 356/515
(58) Field of Search ................................. 356/520, 521, 356/515

(56) References Cited

U.S. PATENT DOCUMENTS 6,538,749 B1 * 3/2003 Takata et al. ................. 356/520

FOREIGN PATENT DOCUMENTS

JP          401003820 A *  1/1989

* cited by examiner

Primary Examiner—Samuel A. Turner
(74) Attorney, Agent, or Firm—Wenderoth, Lind & Ponack, L.L.P.

(57) ABSTRACT

A lens evaluation method includes diffracting light derived from a lens so that two diffracted rays of different orders (e.g., a 0th-order diffracted ray and a +1st-order diffracted ray) interfere with each other, thereby obtaining a shearing interference figure, and changing phases of the diffracted rays. The method also includes in the shearing interference figure, determining phases of light intensity changes at a plurality of measuring points on a measuring line which passes through a midpoint of a line segment interconnecting optical axes of the two diffracted rays, and determining characteristics (defocus amount, coma, astigmatism, spherical aberration and a higher-order aberration) of the lens based on the phases.

49 Claims, 42 Drawing Sheets

4 : READ SIGNAL
5 : FUNDAMENTAL SIGNAL
6 : PHASE DIFFERENCE

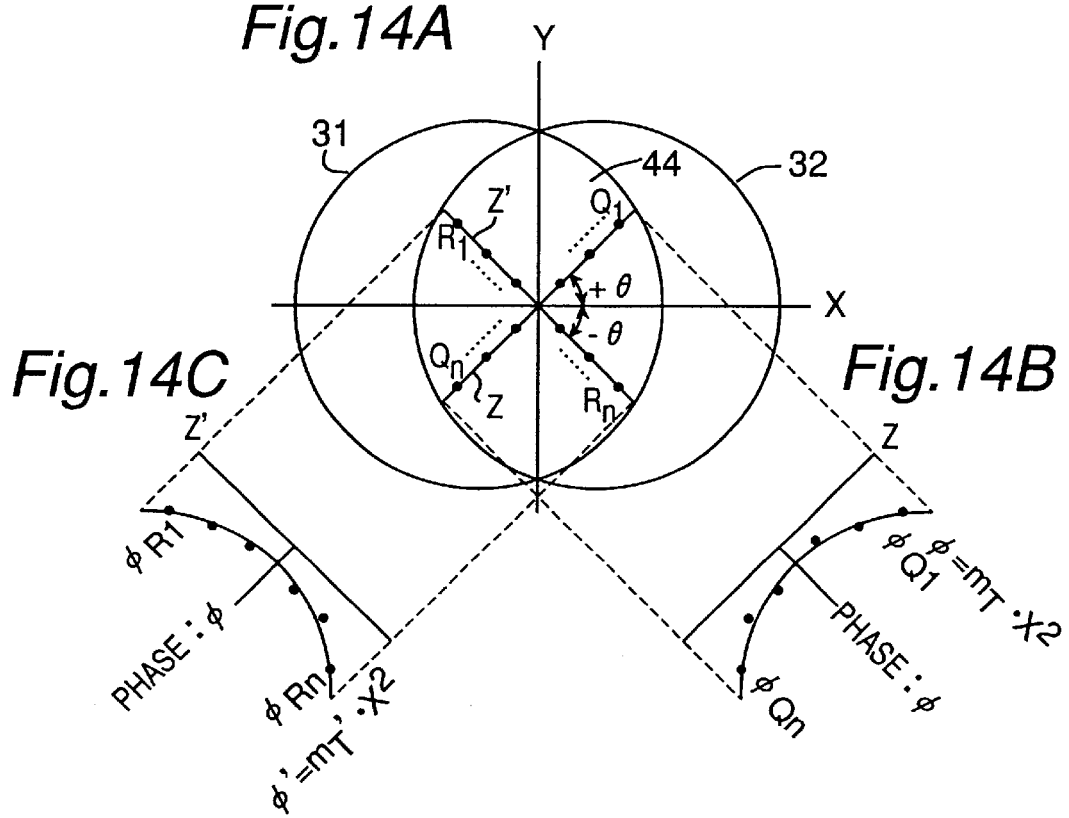
Fig.14A
Fig.14B
Fig.14C
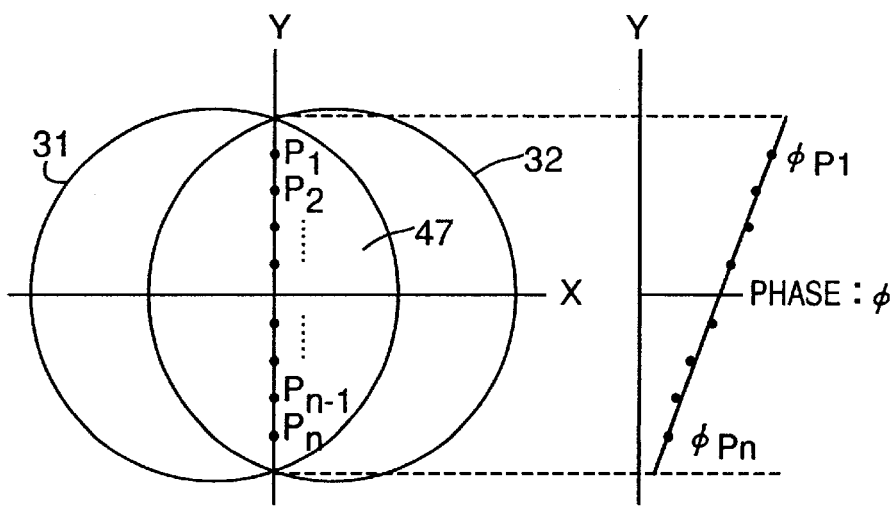
Fig.15A
Fig.15B

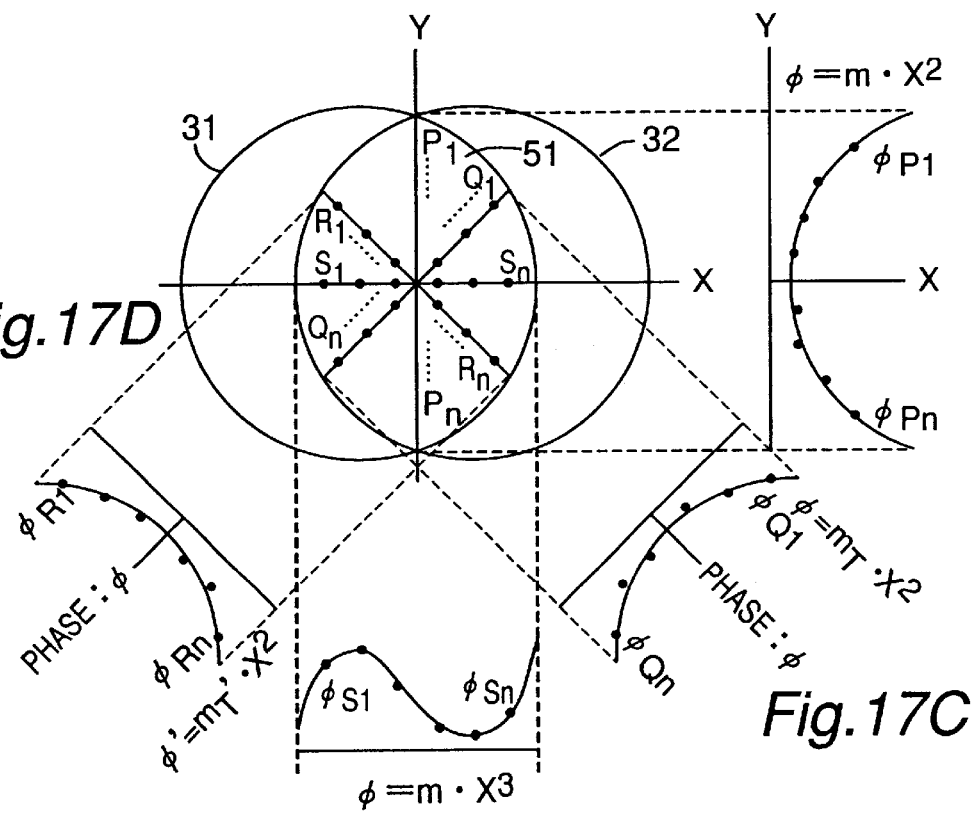

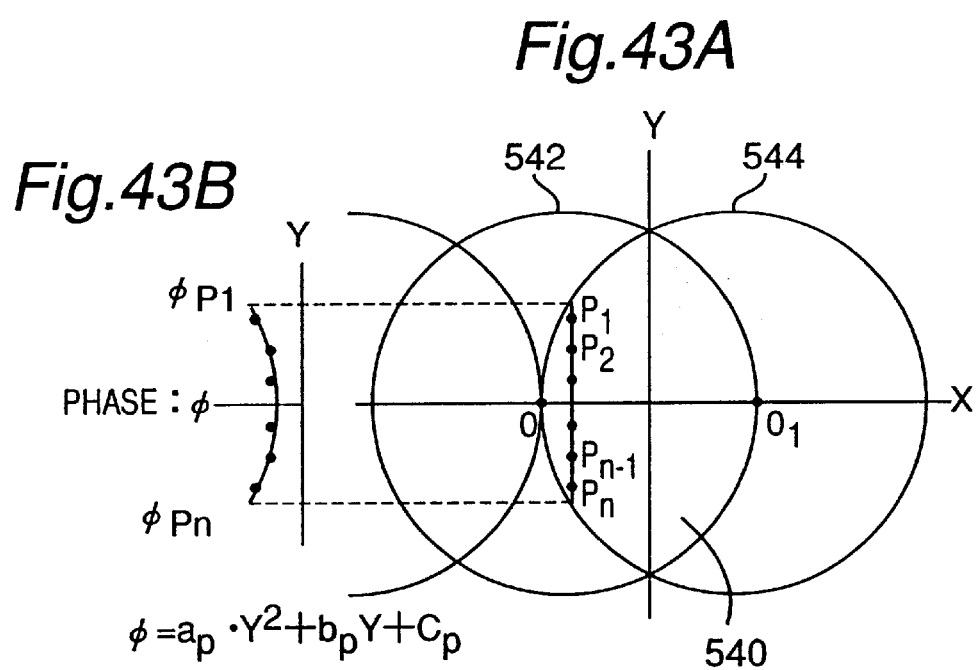

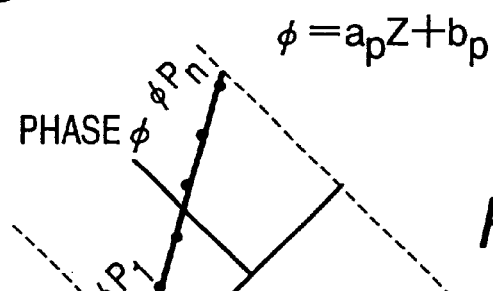
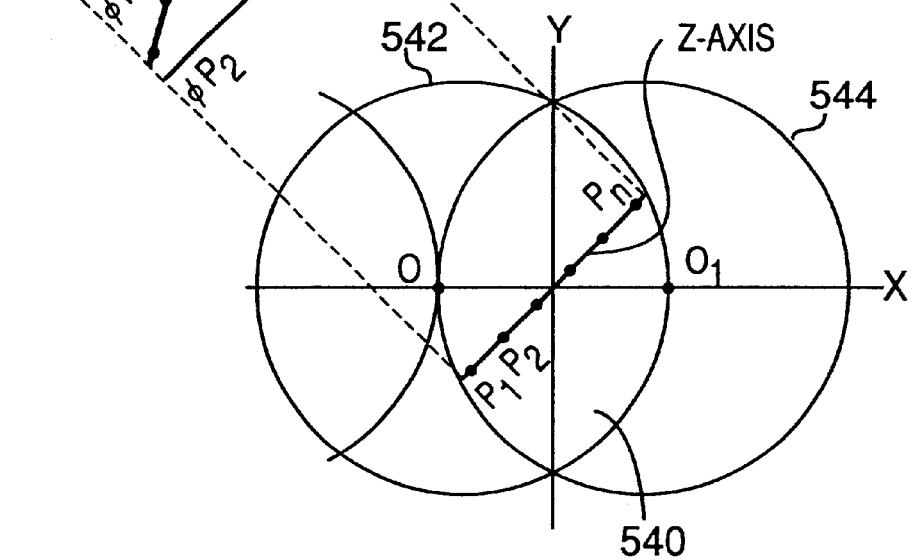

METHOD AND APPARATUS FOR EVALUATING ABERRATIONS OF OPTICAL ELEMENT AND METHOD AND APPARATUS FOR ADJUSTING OPTICAL UNIT AND LENS

BACKGROUND OF THE INVENTION

The present invention relates to a method and system for detecting characteristics of an optical lens used to read and write information on an information recording medium of an optical disk system, such as DVDs (Digital Versatile Disks), or an optical lens used to form a light spot by focusing light in laser beam machines, laser microscopes or the like, and further relates to a method and system for adjusting the optical lens. The invention also relates to method and system for adjusting an optical unit, for example, method and system for adjusting an optical unit which reads and writes information on an information recording medium of the optical disk system.

In order to read information from a high-density information recording medium of the optical disk system and to store information into this high-density information recording medium, an optical system capable of directing light emitted from a light source correctly to a target place is necessary. Therefore, in particular, the objective lens of an optical system is not only required to have strict optical characteristics for itself, but also has to be fixed to a target place with good precision.

Thus, as a method for inspecting or adjusting an objective lens, it would be conceivable to take a method (jitter method) including the steps of, as shown in FIG. 1, directing a light beam (e.g., laser beam) 2 emitted via an objective lens 1 to a reference object 3 (e.g., optical disk) for use of lens inspection, detecting reflected light from this reference object 3, comparing a read signal 4 resulting from the detection with a reference signal 5, and then adjusting the tilt or the like of the objective lens 1 so that a phase difference 6 between the read signal 4 and the reference signal 5 is minimized or the phase difference falls within a specified allowance value.

However, in general, characteristics of the objective lens 1 vary among individual objective lenses, and there is no definite relation between the degree of tilt or the like of the objective lens 1 and the phase difference 6. Moreover, as shown in FIG. 2, one objective lens 1A and another objective lens 1B, in some cases, show considerably different characteristics (lens tilt angle phase difference characteristics). Also, it is necessary to repeat the comparison between tilt adjustment of the objective lens and signals, and it is difficult to make an objective decision as to which stage the adjustment should be completed. Further, since the read signal 4 includes characteristics unique to the circuit for obtaining this read signal 4, the tilt or the like of the objective lens 1 could not necessarily be grasped enough from the read signal 4.

As a method substituting for the jitter method, it has been discussed to take a method (light intensity measuring method) including steps of, as shown in FIG. 3, condensing light 12 transmitted by an objective lens 11 to an image pickup device (CCD) 14 via a magnifying optical system 13 including a lens, a mirror and the like, displaying a beam spot (see FIGS. 4A, 4B) captured by this image pickup device 14 onto a signal processor 15 or the like, observing the light intensity (density variation pattern) (see FIG. 4A) of the beam spot displayed on the signal processor 15, and thereby inspecting or adjusting the tilt or the like of the objective lens 11. It is noted that FIG. 4A shows a beam spot 16 appearing on the signal processor 15 prior to adjustment with a density variation pattern 17 formed thereabout, while FIG. 4B shows a beam spot 18 appearing on the signal processor 15 after the adjustment without any density variation pattern.

However, this light intensity measuring method is based on light intensity information alone to detect tilt or the like of the objective lens 11, and thus is incapable of fine adjustment, for example, adjustment of the wavelength level of the light 12. Also, since the sensitivity characteristics of the image pickup device 14 vary among places, detection results may differ depending on which part of the image pickup device 14 receives the light 12. Besides, focal shifts of the beam spot 18 would have quite a large effect on the detection result. Furthermore, because of the use of the magnifying optical system 13, adjusting the tilt angle of the objective lens 11 would cause the beam spot 18 to go out of the image pickup device 14, giving rise to a case where the result of the adjustment could not be evaluated. Also, since light intensity of the beam spot 16 is read by human vision, differences among individuals are likely to affect the inspection results.

SUMMARY OF THE INVENTION

Accordingly, an object of the present invention is to provide a new lens evaluation method, lens evaluation system, lens adjustment system, and lens adjustment method to substitute for the aforementioned jitter method and light intensity measuring method.

Another object of the present invention is to provide an optical unit adjustment method and system capable of carrying out the adjustment of an optical unit in short time.

Still another object of the present invention is to provide a lens evaluation method and lens evaluation system capable of correctly measuring spherical aberration and defocus without being affected by lens' local deformation.

BRIEF DESCRIPTION OF THE DRAWINGS

FIG. 4A shows an image before adjustment and FIG. 4B shows an image after the adjustment;

FIGS. 10A, 10B, 10C and 10D show wave fronts of defocus amount, coma, astigmatism and spherical aberration, respectively;

FIGS. 11A, 11B, 11C, 11D and 11E show interference fringes of defocus amount, coma (coma R component), coma (coma T component), astigmatism and spherical aberration, respectively;

FIG. 12A shows measuring points on the shearing interference figure and FIG. 12B is a graph in which a linear function of measuring point coordinates is fitted to phases;

FIG. 13A shows measuring points on a shearing interference figure and FIG. 13B is a graph in which a quadratic function of measuring point coordinates is fitted to phases;

FIGS. 14A–C are views for explaining the evaluation method of coma T component, where FIG. 14A shows measuring points on a shearing interference and FIG. 14B is a graph in which a quadratic function of measuring point coordinates is fitted to phase;

FIGS. 15A and B are views for explaining the evaluation method of astigmatism, where FIG. 15A shows measuring points on a shearing interference and FIG. 15B is a graph in which a linear function of measuring point coordinates is fitted to phases;

FIG. 16A shows measuring points on a shearing interference and FIG. 16B is a graph in which a quadratic function of measuring point coordinates is fitted to phases;

FIGS. 17A–E are views for explaining the evaluation method of higher-order aberrations, where FIG. 17A shows measuring points on a shearing interference and FIGS. 17B through 17E are graphs in which a function of measuring point coordinates is fitted to phases;

FIGS. 43A and B are views showing measuring points set in the interference region to determine spherical aberrations and a state in which a quadratic function is fitted to phases measured at the measuring points;

FIGS. 44A and B are views showing measuring points set in the interference region to determine defocuses and a state in which a linear function is fitted to phases measured at the measuring points;

DETAILED DESCRIPTION OF THE PREFERRED EMBODIMENTS

I. First Embodiment

Figure 1:
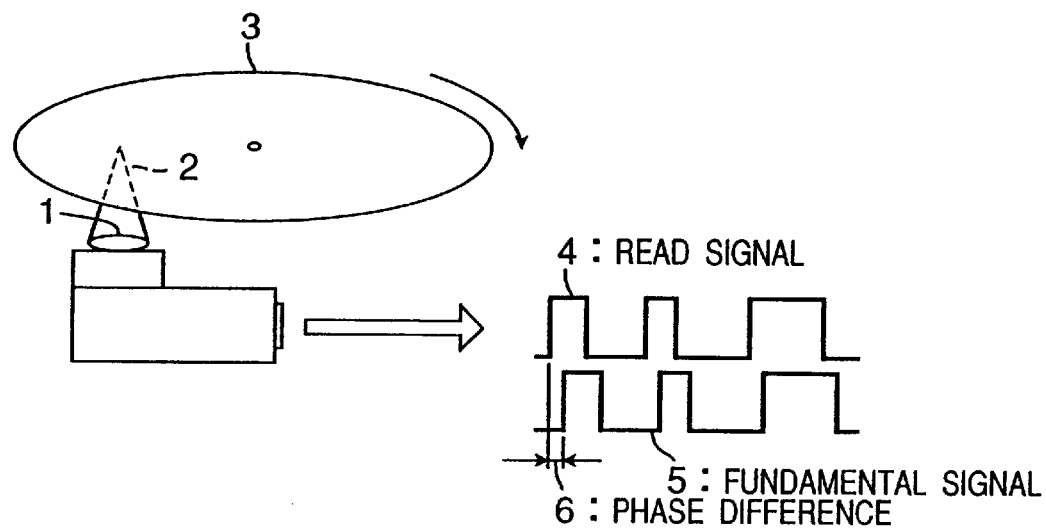
FIG. 1 is an explanatory view of schematic constitution of a conventional method (jitter method) and system for detecting lens aberrations, as well as the principle of the method and system.
Figure 2:
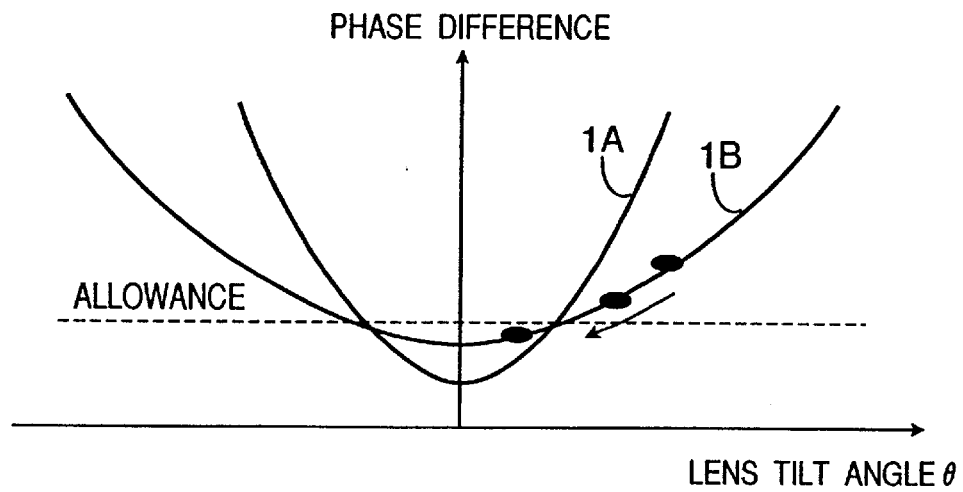
FIG. 2 is a graph for explaining a method for adjusting aberrations with the system shown in FIG. 1.
Figure 3:
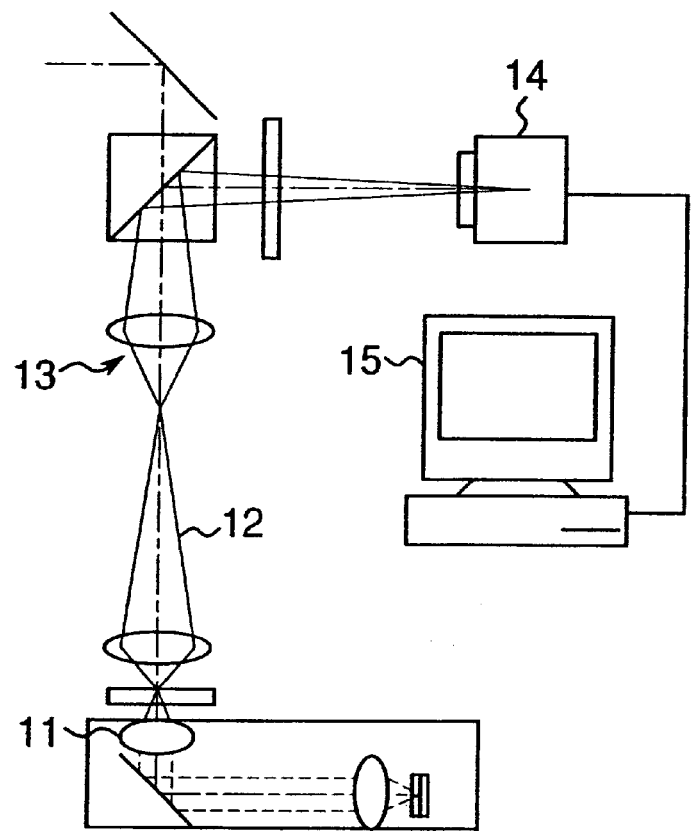
FIG. 3 is an explanatory view of schematic constitution of another conventional method (light intensity measuring method) and system for detecting lens aberrations, as well as the principle of the method and system.
Figure 4A:
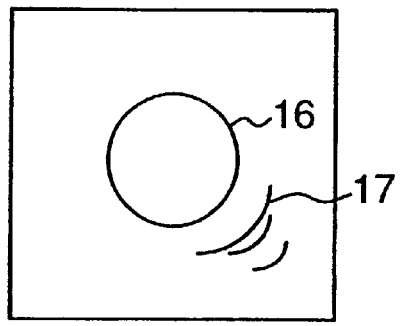
FIGS. 4A and B show an image obtained by the lens aberration detecting method shown in FIG. 3, where
Figure 4B:
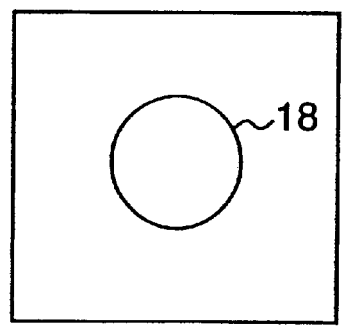
Figure 5:
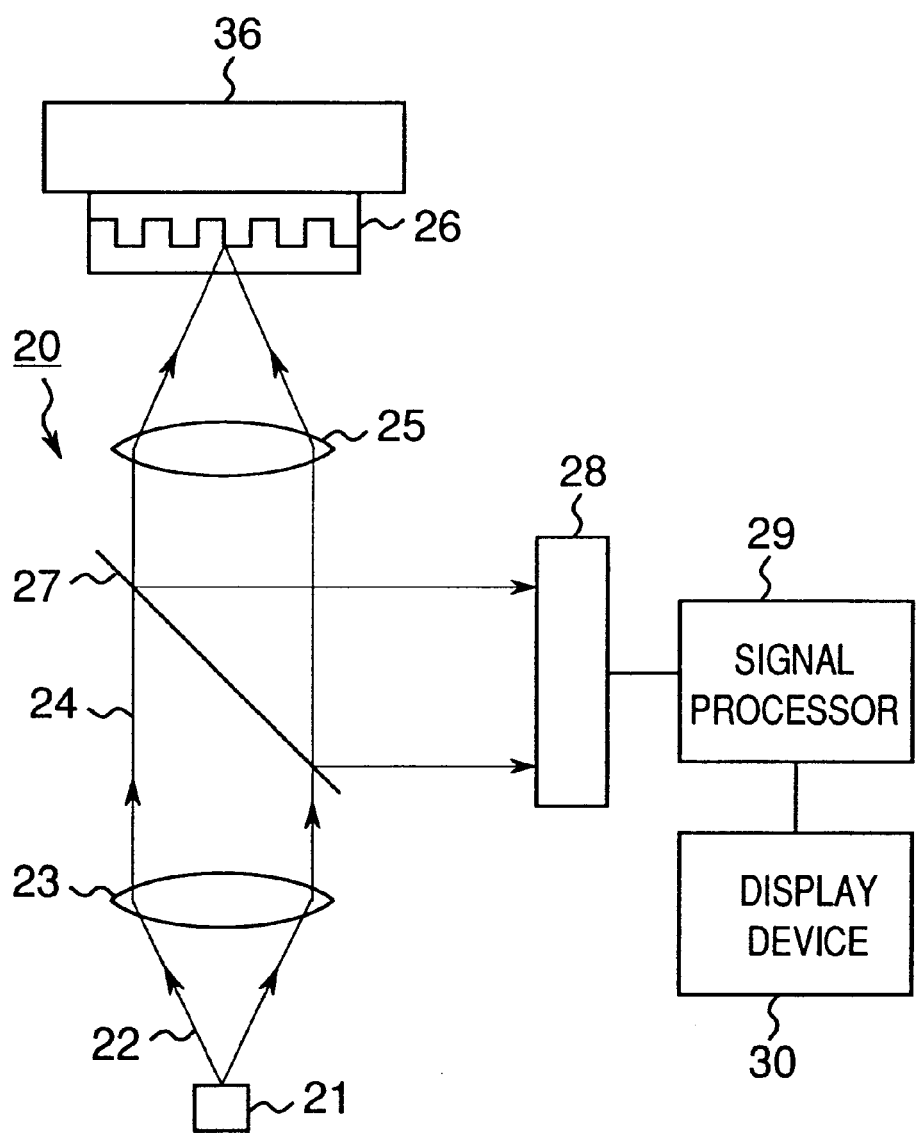
FIG. 5 is a view showing schematic constitution of a lens aberration evaluating system according to the present invention.

FIG. 5 shows schematic constitution of a lens evaluation system 20. In the lens evaluation system 20, a laser generation source 21 serving as a light source emits a coherent laser beam (e.g., helium neon laser beam) 22. The emitted laser beam 22 is adjusted to generally parallel light 24 by a lens 23 and then focused on a reflecting diffraction grating 26 by an objective lens 25. The laser beam 22 reflected by the diffraction grating 26 passes again through the objective lens 25 to turn back again generally to parallel light 24, and is reflected by a half mirror 27 placed between the objective lens 25 and the lens 23, thus projected onto an image pickup device (e.g., CCD sensor) 28. The image pickup device 28 is connected to a signal processor 29, where an image captured by the image pickup device 28 is processed by the signal processor 29 and a processing result is projected onto a display device 30.

Figure 6:
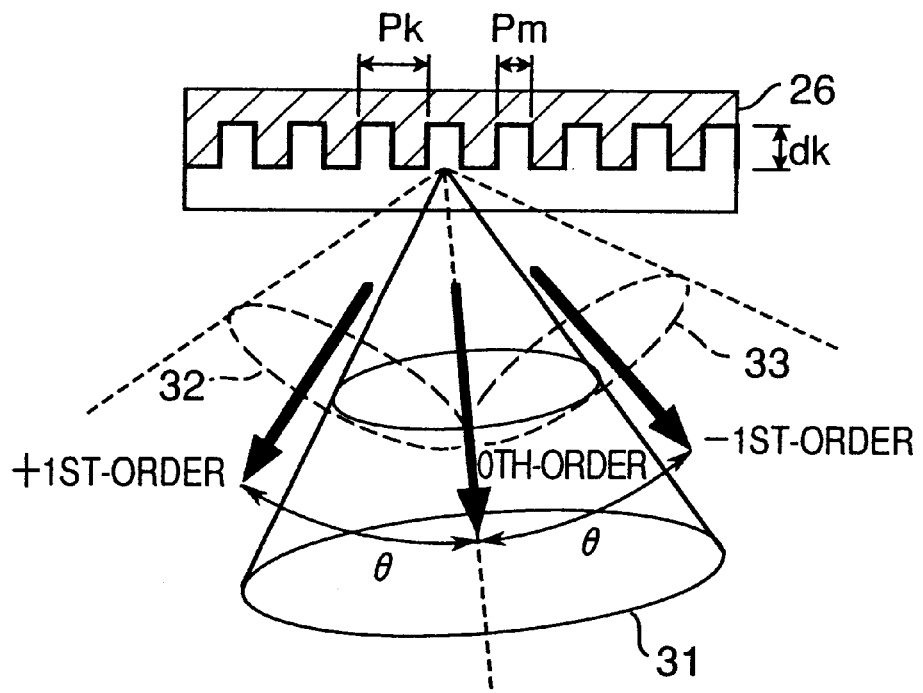
FIG. 6 is a view showing diffracted rays generated from a reflecting diffraction grating.
Figure 7:
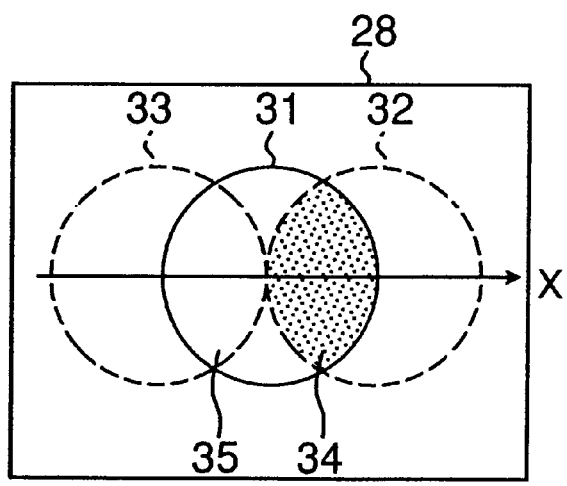
FIG. 7 is a view showing a shearing interference figure formed on the image pickup device.

In this system 20, as shown in FIG. 6, the 0th-order diffracted ray 31, ±1st-order diffracted rays 32, 33, ±2nd-order diffracted rays 32, 33 . . . are obtained from the diffraction grating 26. It is noted that if trench spacing (grating pitch) and trench depth (grating depth) of the diffraction grating 26 are appropriately designed, the diffracted ray 31 and the like can be made to focus an interference figure shown in FIG. 7 onto the image pickup device 28. Preferred design conditions will be described later.

Now, the interference figure is expressed on the 0th-order diffracted ray (diffraction image) 31 in a state in which the rays of the 1st-order diffracted rays (diffraction circles) 32, 33 are not overlapped with each other and are in contact with each other. Hereinafter, such interference of diffracted rays of different orders will be referred to as "shearing" or "shearing interference," the figure or image formed by interference will be referred to as "shearing interference figure," the axis that interconnects centers of diffracted rays to each other (X-axis shown in FIG. 7) will be referred to as "shearing axis," and the direction of the shearing axis will be referred to as "shearing direction."

When the objective lens 25 has no other aberrations and yet the objective lens 25 is accurately focused with respect to the diffraction grating 26, for example, an interference region 34 of the 0th-order diffracted ray 31 and the +1st-order diffracted ray 32 is expressed in no-patterned black color, and an interference region 35 of the 0th-order diffracted ray 31 and the −1st-order diffracted ray 33 is expressed in no-shaded white color. However, actual lenses involve various aberrations, so that interference fringes corresponding to these aberrations appear in the interference regions 34, 35.

With regard to the light intensities of two points away from each other in the interference regions 34, 35, light intensities of these two points show different values depending on the aberration of the objective lens 25 or the like. Also, when the diffraction grating 26 is moved in a direction perpendicular to its grating trenches (a right-and-left direction in FIG. 5), for example, by using an appropriate transfer mechanism (indicated by reference numeral 36 in FIG. 5) employing a piezo device, the light intensities of the two points in the interference regions 34, 35 cyclically vary while drawing sine curves. Concurrently, differences in aberration appear as phase differences between the two sine curves.

Figure 8:
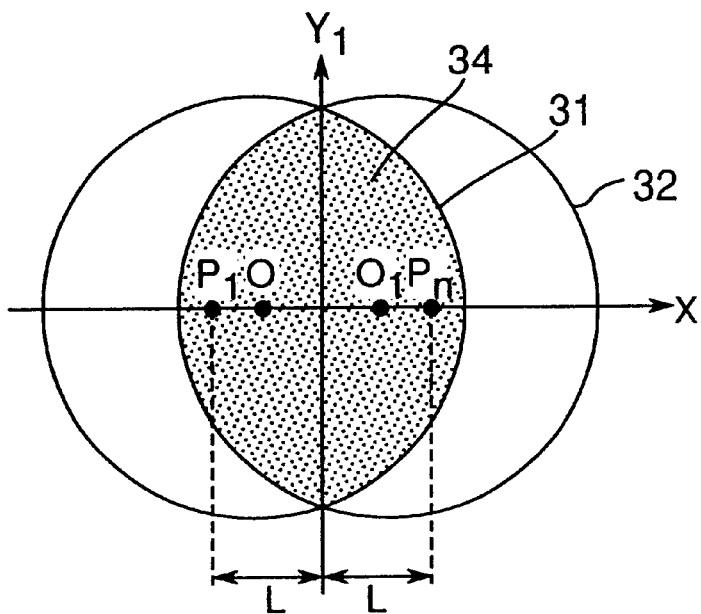
FIG. 8 is a view showing measuring points on the shearing interference figure.
Figure 9:
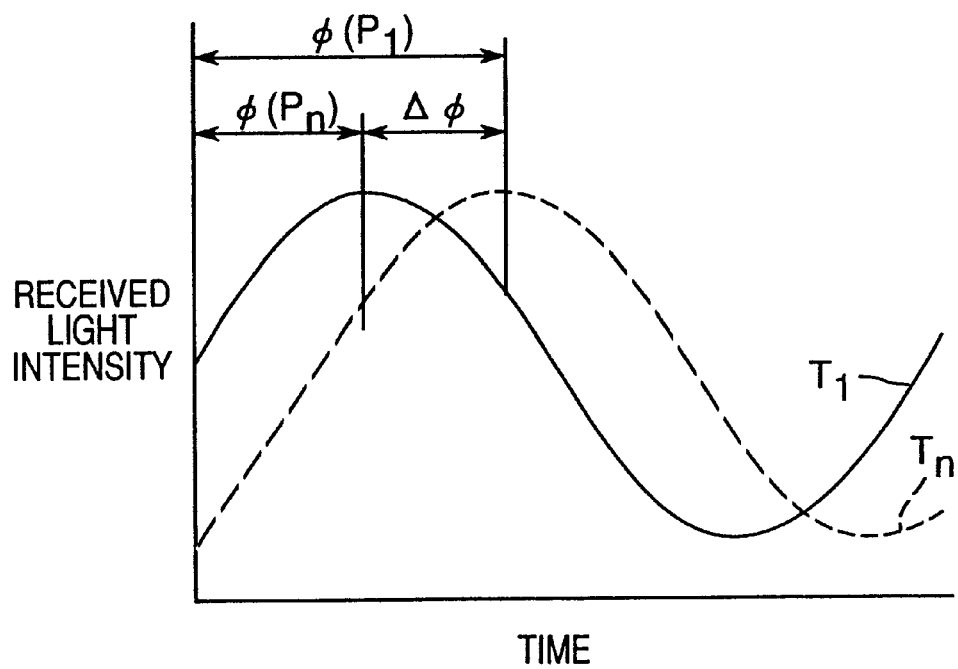
FIG. 9 is a view showing light intensity changes in the measurement on the shearing interference figure shown in FIG. 8.

For instance, as shown in FIG. 8, with regard to the interference region 34 of the 0th-order diffracted ray 31 and the +1st-order diffracted ray 32, when time variations of light intensities are measured at two points $P_1, P_n$, located at an equidistance L from these centers O and $O_1$, respectively, on a shearing axis (X-axis) that connects a diffraction circle center O of the 0th-order diffracted ray 31 and a diffraction circle center O to each other, a phase difference $\Delta\phi$ appears between a phase $\phi(P_1)$ of a sine curve $T_1$ representing the light intensity change of the point $P_1$ and a $\phi(P_n)$ of a sine curve $T_n$ representing the light intensity change of the point $P_n$ as shown in FIG. 9, the phase difference $\Delta\phi$ being dependent on the aberration of the objective lens 25 or the like.

In this connection, an aberration generated with monochromatic incident light is called monochromatic aberration, which includes spherical aberration, coma, astigmatism, curvature of field, distortion (Seidel's five aberrations). The monochromatic aberration can also be classified into ray aberration and wave front aberration depending on differences in the notation of aberration. It is known that these ray aberration and wave front aberration can be interconverted, and the wave front aberration is normally represented in polar coordinates.

Hereinafter, for simpler description, the wave front aberration is herein treated as classified into coma, astigmatism, spherical aberration, other higher-order aberrations and defocus.

Figure 10B:
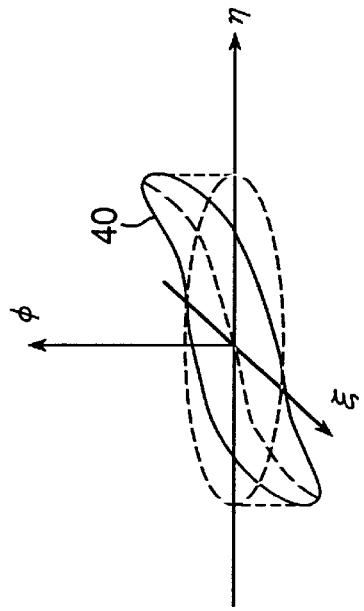
FIGS. 10A–D are views showing wave front configurations of aberrations, where
Figure 10D:
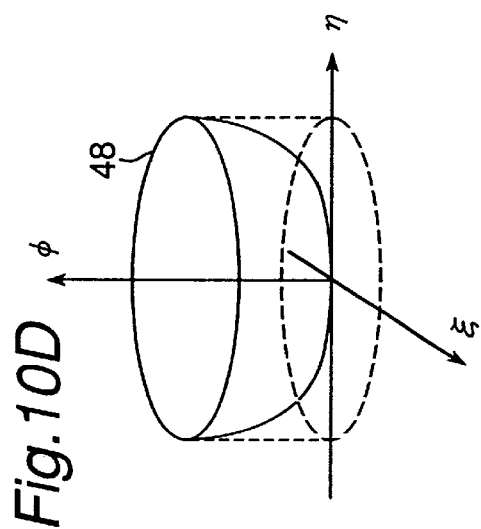
Figure 10A:
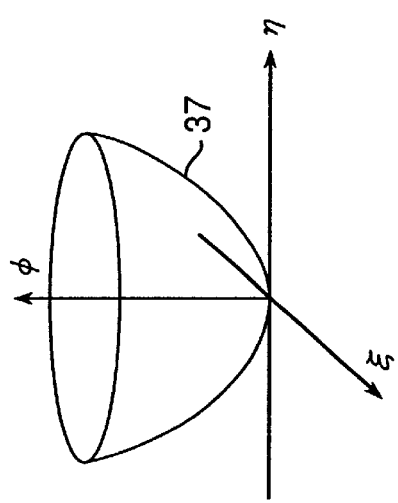

Given that a plane wave is referenced, as shown in FIG. 10A, a defocus wave front 37 takes a rotationally symmetrical form, representable by Equation (1):

$$\phi = m \cdot (\xi^2 + \eta^2) \tag{1}$$

where m is a constant.

Accordingly, when two diffracted rays interfere in the $\xi$ direction, and when two diffracted rays interfere in the $\eta$ direction, intensity differences (i.e., phase differences) between the two interfering rays of light are expressed as linear functions of Equations (2) and (3), respectively:

$$d\phi/d\xi = 2m\xi \tag{2}$$

$$d\phi/d\eta = 2m\eta \tag{3}$$

Figure 11A:
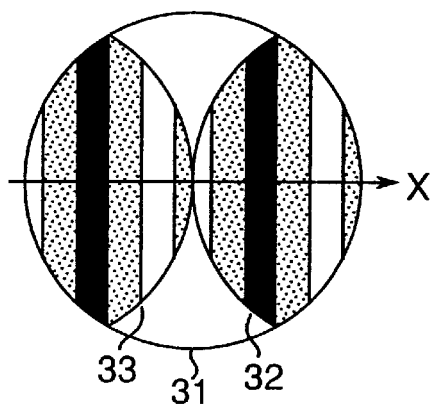
FIGS. 11A–F show interference fringes appearing on the shearing interference figure, where
Figure 12A:
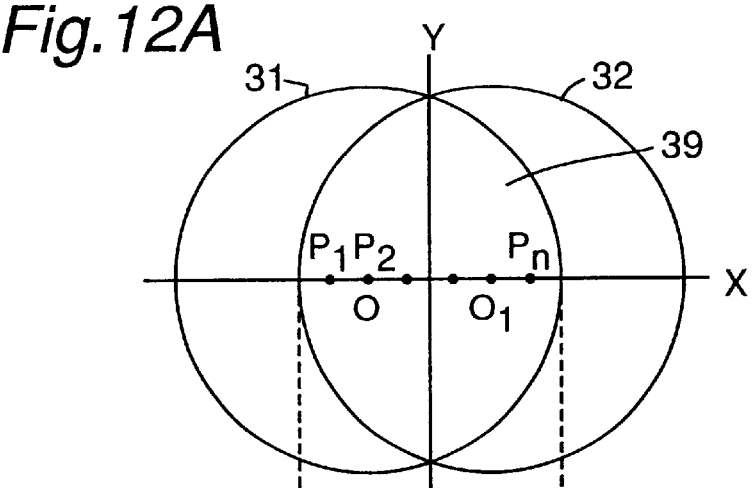
FIGS. 12A and B are graphs for explaining the evaluation method of defocus amount, where
Figure 12B:
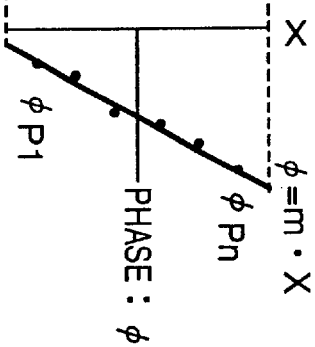

This can be understood also from the fact that defocus appears as interference fringes shown in FIG. 11A on the shearing interference figure. Accordingly, as shown in FIG. 12A, a plurality of points $(P_1, P_2, \ldots, P_{n-1}, P_n)$ are set on the shearing axis (X-axis) that connects the diffraction circle center O of the 0th-order diffracted ray 31 and the diffraction circle center $O_1$ of the +1st-order diffracted ray 32 to each other, preferably symmetrically with respect to a bisector (Y-axis) that passes through a midpoint of a line segment interconnecting the centers O, $O_1$ and that is perpendicular to the shearing axis (X-axis), on a shearing interference FIG. 39. Then, the diffraction grating 26 is moved in a direction perpendicular to the grating trenches, and phase changes of the individual points $(P_1, P_2, \ldots, P_{n-1}, P_n)$ are determined. Further, as shown in FIG. 12B, X-coordinates of these points $(P_1, P_2, P_{n-1}, P_n)$ and phases $\phi P(\phi_{P1}, \phi_{P2}, \ldots, \phi_{P(n-1)}, \phi_{Pn})$ of the individual points are plotted on the coordinate system, and then a linear function is fitted to plotted points. Thus, the defocus amount (the constant m in Equations (1) to (3)) can be quantitatively determined.

Figure 39:
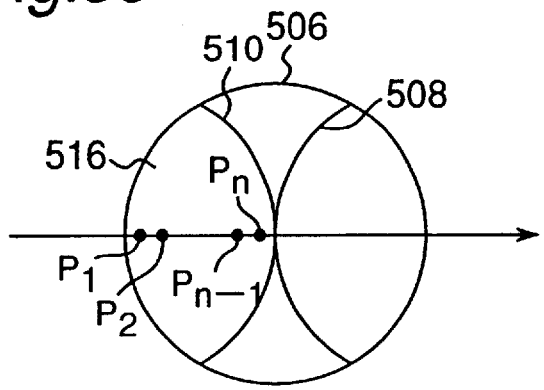
FIG. 39 is a view showing measuring point examples set in the interference region.

Concrete procedure for evaluating the defocus amount with the signal processor 29 is as follows:

(i) As shown in FIG. 12A, an image is received by the image pickup device 28, where centers (optical axes O, $O_1$) of the diffracted rays (diffraction circles) 31, 32 and the shearing axis (X-axis) are determined on the shearing interference FIG. 39 displayed on the display device 30;

(ii) A plurality of measuring points ($P_1, P_2, \ldots, P_{n-1}, P_n$) are determined on the shearing axis (X-axis). These measuring points are preferably placed right-and-left symmetrical with respect to the bisector (Y-axis) of a line segment that interconnects the optical axes O, $O_1$;

(iii) The transfer mechanism 36 is driven so that the diffraction grating 26 is moved in a direction perpendicular to the grating;

(iv) Light intensities of the measuring points ($P_1, P_2, \ldots, P_{n-1}, P_n$) that vary with the move of the diffraction grating 26 are measured. It is noted that the light intensities are obtained from output signals of image pickup devices located at positions corresponding to the measuring points. Measured light intensities vary sinusoidally with respect to the individual measuring points;

(v) With respect to the individual measuring points, phases $\phi_P(\phi_{P1}, \phi_{P2}, \ldots, \phi_{P(n-1)}, \phi_{Pn})$ of the light-intensity sine waves are determined. The light-intensity sine waves corresponding to the individual measuring points have different phases, for example, as shown in FIG. 9;

(vi) The X-coordinates of the individual measuring points and their corresponding light intensities $\phi_P(\phi_{P1}, \phi_{P2}, \ldots, \phi_{P(n-1)}, \phi_{Pn})$ are plotted to the rectangular coordinate system as shown in FIG. 12B;

(vii) A linear function ($\phi = m \cdot x$) is fitted to the plotted points; and (viii) A first-order coefficient (m) of the fitted linear function is determined, by which the defocus amount is evaluated.

Given that a plane wave is referenced, the coma takes a wave front 40 shown in FIG. 10B and can be expressed by the following Equation (4):

$$\phi = m \cdot \eta \cdot (\xi^2 + \eta^2) \quad (4)$$

where m is a constant.

As shown in this Equation (4), the coma has a directivity toward higher numbers of orders ($\eta$ direction, i.e., coma direction). This coma direction, which is not coincident with the shearing direction, needs to be determined by separately determining a coma component in the shearing direction and another coma component in a direction perpendicular to the shearing direction and then determining the coma direction from a ratio of their magnitudes.

The coma component in the shearing direction (i.e., coma component in a direction perpendicular to the grating trenches; hereinafter, referred to as "coma R component") is expressed by Equation (5):

$$d\phi/d\eta = m_R \cdot (\xi^2 + \eta^2) \quad (5)$$

Figure 11B:
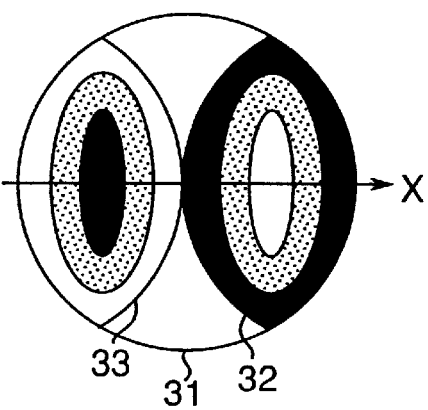
Figure 13A:
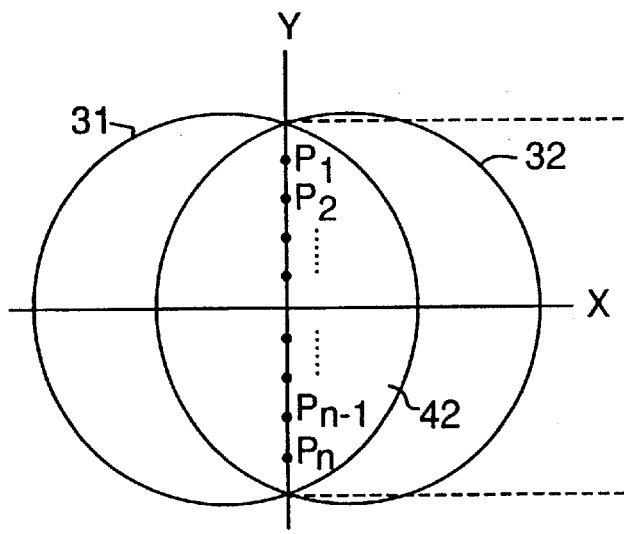
FIGS. 13A and B are views for explaining the evaluation method of coma R component, where

Given that the lens has no other aberrations, the coma R component appears as interference fringes 41 shown in FIG. 11B in the shearing interference figure. Accordingly, as shown in FIG. 13A, a plurality of points ($P_1, P_2, \ldots, P_{n-1}, P_n$) are set on the Y-axis, preferably symmetrically with respect to the X-axis, on a shearing interference FIG. 42.

Figure 13B:
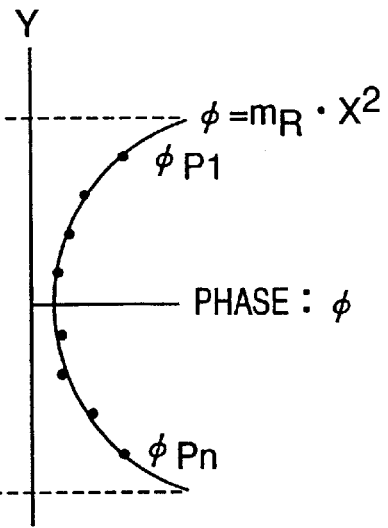

Then, while the diffraction grating 26 is moved in the direction perpendicular to the grating direction, phases $\phi_P(\phi_{P1}, \phi_{P2}, \ldots, \phi_{P(n-1)}, \phi P_n)$ of the individual points ($P_1, P_2, \ldots, P_{n-1}, P_n$) are determined. Further, as shown in FIG. 13B, coordinates (Y-coordinates) of these points and phases $\phi_P(\phi_{P1}, \phi_{P2}, \ldots, \phi_{P(n-1)}, \phi_{Pn})$ of the individual points are plotted on the coordinate system, and then a quadratic function is fitted to plotted points. Thus, the coma R component (constant $m_R$ in Equation (4)) can be quantitatively determined based on the second-order coefficient (constant $m_R$) of this quadratic function.

On the other hand, the coma component in a direction perpendicular to the shearing direction (i.e., coma component in a direction parallel to the grating trenches; hereinafter, referred to as "coma T component") is expressed by Equation (6):

$$d\phi/d\xi = m_T \cdot (2\xi\eta) \quad (6)$$

Figure 11C:
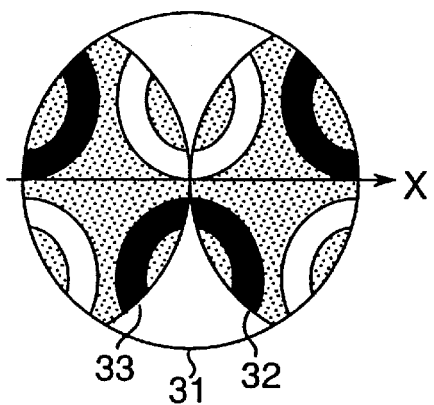

Given that the lens has no other aberrations, the coma T component appears as interference fringes 41 shown in FIG. 11C in the shearing interference figure. Accordingly, as shown in FIG. 14A, a plurality of points ($Q_1, Q_2, \ldots, Q_{n-1}, Q_n$) ($R_1, R_2, \ldots, R_{n-1}, R_n$) are set on Z, Z' axes that are angled to a specified angle in the positive and negative directions with respect to the X- and Y-axes, preferably symmetrically with respect to the intersecting point of the X- and Y-axes, on the shearing interference figure. Then, while the diffraction grating 26 is moved in the direction perpendicular to the grating, phases of the individual points ($Q_1, Q_2, \ldots, Q_{n-1}, Q_n$), ($R_1, R_2, \ldots, R_{n-1}, R_n$) are determined. Further, as shown in FIGS. 14B and 14C, coordinates Z, Z' of these points and phases $\phi_Q(\phi_{Q1}, \phi_{Q2}, \ldots, \phi_{Q(n-1)}, \phi_{Qn})$, $\phi_R(\phi_{R1}, \phi_{R2}, \ldots, \phi_{R(n-1)}, \phi_{Rn})$ of the individual points are plotted on the coordinate system, and then quadratic functions ($\phi = m_T \cdot x^2$, $\phi' = m_T' \cdot x^2$) or cubic functions are fitted to plotted points. Furthermore, a difference between the second-order coefficients ($m_T, m_T'$) of these quadratic functions or cubic functions is determined. Thus, the coma T component can be quantitatively determined.

It is noted that the direction of the coma can be determined from the ratio of the coma R component coefficient $m_R$ to the difference of the coma T components ($m_T - m_T'$).

Figure 42:
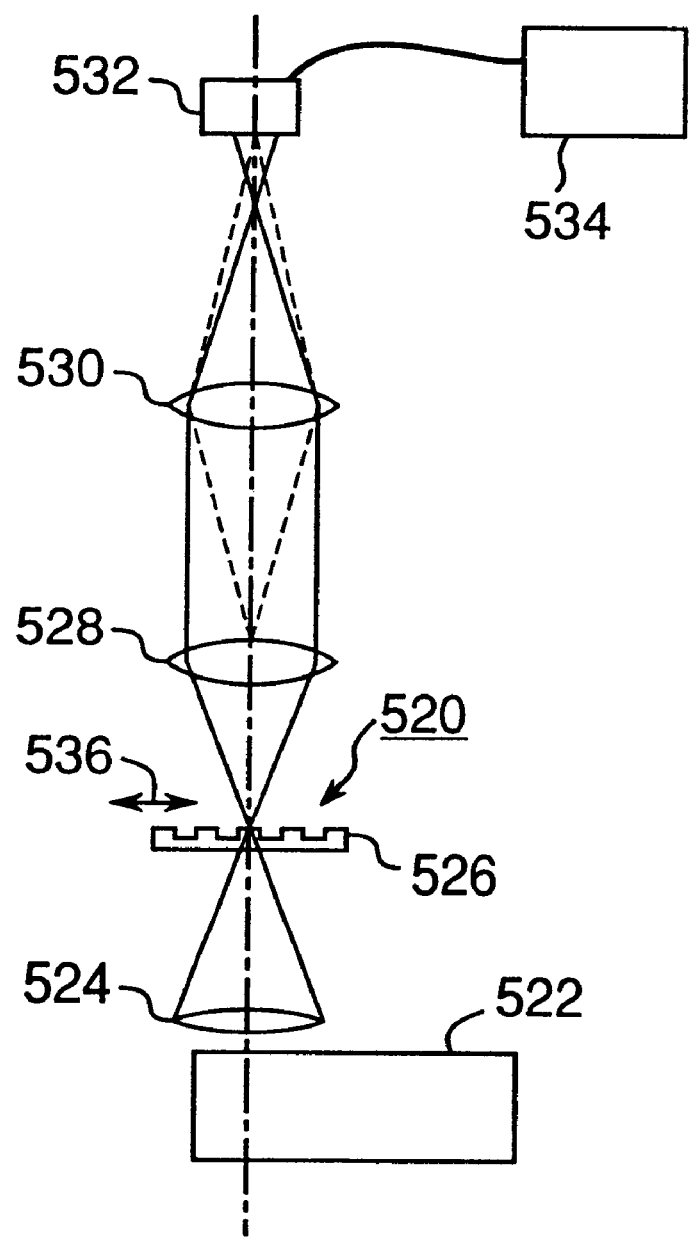
FIG. 42 is a view showing schematic constitution of a lens evaluation system according to the present invention.

Concrete procedure for evaluating the coma R component is as follows:

(i) As shown in FIG. 13A, centers (optical axes O, $O_1$) of the diffracted rays (diffraction circles) 31, 32, the shearing axis (X-axis), and a vertical bisector (Y-axis) of a line segment that interconnects the optical axes O, $O_1$ are determined on the shearing interference FIG. 42;

(ii) A plurality of measuring points ($P_1, P_2, \ldots, P_{n-1}, P_n$) are determined on the vertical bisector (Y-axis) These measuring points are preferably placed symmetrical with respect to the X-axis;

(iii) The diffraction grating 26 is moved in a direction perpendicular to the grating;

(iv) Light intensities of the measuring points ($P_1, P_2, \ldots, P_{n-1}, P_n$) are measured;

(v) With respect to the individual measuring points, phases $\phi_P(\phi_{P1}, \phi_{P2}, \ldots, \phi_{P(n-1)}, \phi_{Pn})$ of the light-intensity sine waves are determined;

(vi) The Y-coordinates of the individual measuring points and their corresponding light-intensity phases $\phi_P(\phi_{P1}, \phi_{P2}, \ldots, \phi_{P(n-1)}, \phi_{Pn})$ are plotted to the rectangular coordinate system as shown in FIG. 13B;

(vii) A quadratic function ($\phi = m_R \cdot x^2$) is fitted to the plotted points; and (viii) A second-order coefficient ($m_R$) of the fitted quadratic function is determined, by which the coma R component is evaluated.

Concrete procedure for evaluating the coma T component is as follows:

(i) As shown in FIG. 14A, centers (optical axes O, $O_1$) of the diffracted rays (diffraction circles) 31, 32, the shearing axis (X-axis), a vertical bisector (Y-axis) of a line segment that interconnects the optical axes O, $O_1$, and Z- and Z'-axes that pass through an intersecting point of the X-axis and the Y-axis and that are angled to a specified angle θ (30°≦θ≦60°, preferably 45°) in the positive (counterclockwise) and negative (clockwise) directions with respect to the X-axis are determined on a shearing interference FIG. 44;

(ii) A plurality of measuring points $(Q_1, Q_2, \ldots, Q_{n-1}, Q_n)$ $(R_1, R_2, \ldots, R_{n-1}, R_n)$ are determined on the Z- and Z'-axes. These measuring points are preferably placed symmetrical with respect to the intersecting point of the X-axis and the Y-axis;

(iii) The diffraction grating 26 is moved in a direction perpendicular to the grating;

(iv) Light intensities of the measuring points $(Q_1, Q_2, Q_{n-1}, Q_n)$, $(R_1, R_2, \ldots, R_{n-1}, R_n)$ are measured;

(v) With respect to the individual measuring points, phases $\phi_Q(\phi_{Q1}, \phi_{Q2}, \ldots, \phi_{Q(n-1)}, \phi_{Qn})$, $\phi_R(\phi_{R1}, \phi_{R2}, \ldots, \phi_{R(n-1)}, \phi_{Rn})$ of the light-intensity sine waves are determined;

(vi) The Z-coordinates and Z'-coordinates of the individual measuring points and their corresponding light-intensity phases $\phi_Q(\phi_{Q1}, \phi_{Q2}, \ldots, \phi_{Q(n-1)}, \phi_{Qn})$, $\phi_R(\phi_{R1}, \phi_{R2}, \ldots, \phi_{R(n-1)}, \phi_{Rn})$ are plotted to the rectangular coordinate system as shown in FIGS. 14B, 14C;

(vii) Quadratic functions ($\phi = m_T \cdot x^2$, $\phi' = m_T' \cdot x^2$) are fitted to the plotted points;

(viii) Second-order coefficients ($m_T$, $m_T'$) of the fitted quadratic functions are determined;

(ix) A difference $m_T - m_T'$ of the second-order coefficients is determined, by which the coma T component is evaluated; and (x) The direction of coma is evaluated from a ratio $m_R/(m_T - m_T')$ of the coma R component ($m_R$) to the coma R component difference ($m_T - m_T'$).

Figure 10C:
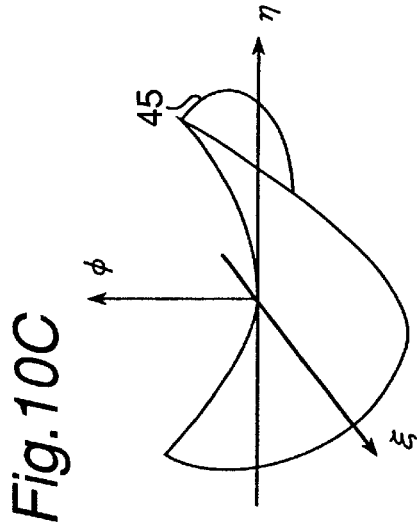
Figure 11D:
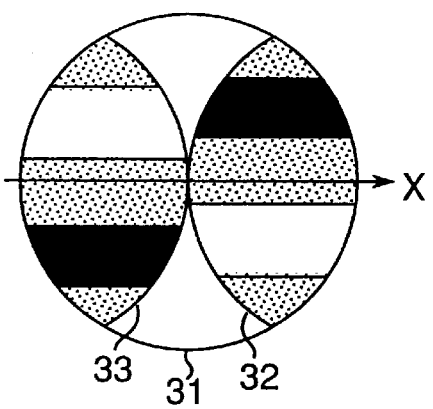

Given that a plane wave is referenced, the astigmatism takes a configuration of a wave front 45 shown in FIG. 10C. This astigmatism has a quadratic-function like phase distribution with respect to one direction and another direction perpendicular to the direction. Also, the astigmatism has axes whose signs of quadratic functions are inverse to each other, i.e., an axis (ξ-axis of FIG. 10C) having a downwardly convex distribution and an axis having an upwardly concave distribution (η axis of FIG. 10C). In the case of shearing in the ξ, η directions, interference fringes resulting from superimposing this wave front 45 appear in the form of fringes vertical to the shearing axis as their respective linear functions (see FIG. 11D). However, in the case of shearing in a direction other than the ε, η directions, there occurs a phase distribution as a linear function associated with an axis vertical to the shearing axis, causing interference fringes parallel to the shearing axis. In the case of shearing in a direction angled 45 degrees to the ε, η directions, there appears a phase distribution only on an axis perpendicular to the shearing axis, where the interference fringes become parallel to the shearing axis (interference fringes shown in FIG. 11D). Therefore, by extracting the linear function component of the phase distribution on a line perpendicular to the shearing axis, the astigmatism in a particular direction can be quantitatively determined.

Figure 47:
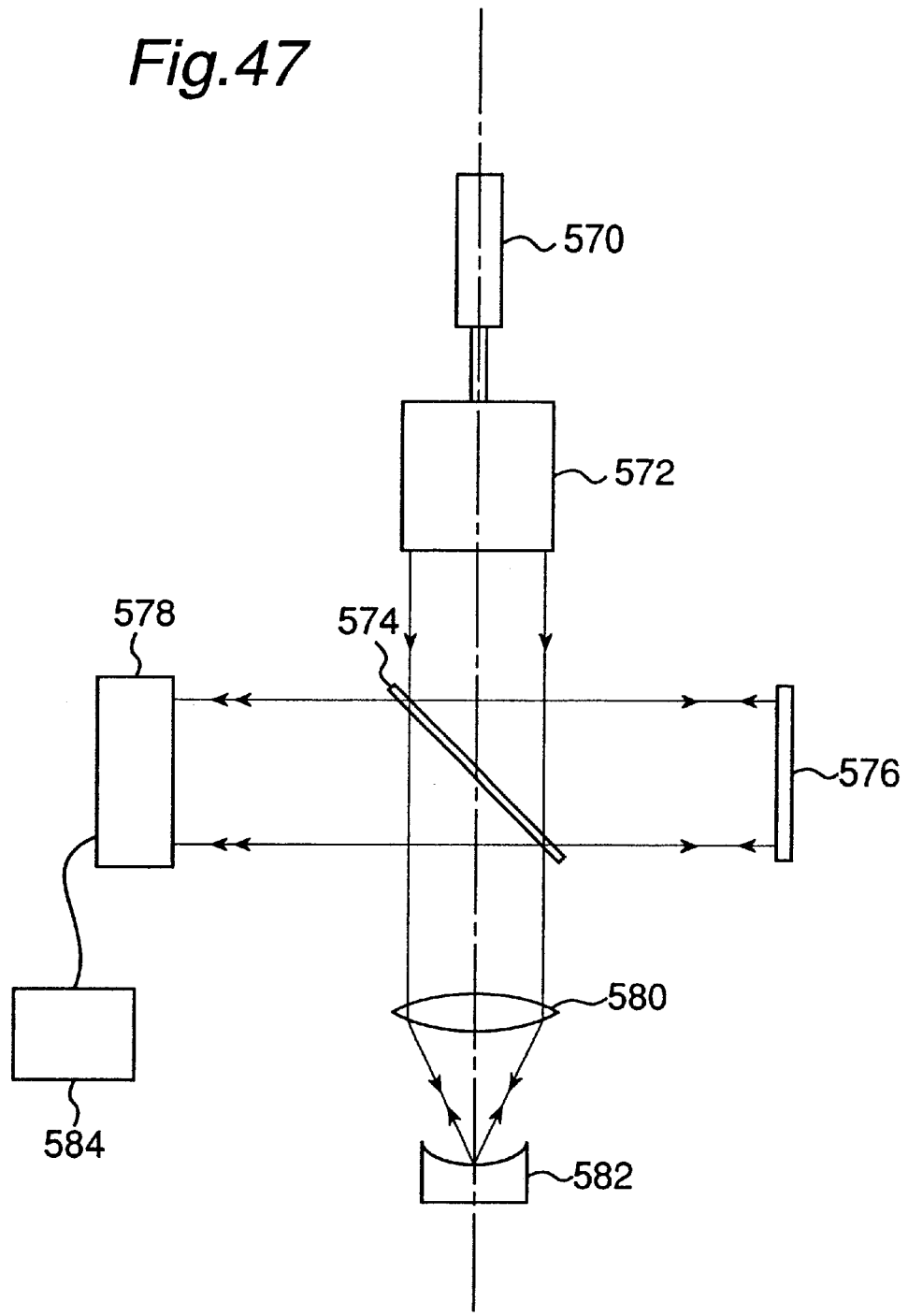
FIG. 47 is a schematic constitutional diagram of a conventional system for measuring fifth- and seventh-order spherical aberrations.

More specifically, as shown in FIG. 15A, a plurality of points $(P_1, P_2, \ldots, P_{n-1}, P_n)$ are set, preferably symmetrically with respect to the X-axis, on a shearing interference FIG. 47, and changes of phases $\phi_P(\phi_{P1}, \phi_{P2}, \ldots, \phi_{P(n-1)}, \phi_{Pn})$ of the individual points are determined while the diffraction grating 26 is moved in the grating direction. Then, as shown in FIG. 15B, coordinates (Y-coordinates) of these points and phases $\phi_P(\phi_P, \phi_{P2}, \ldots \phi_{P(n-1)}, \phi_{Pn})$ of the individual points are plotted onto the coordinate system, and a linear function is fitted to the plotted points. Thus, the astigmatism can be quantitatively determined.

Figure 29:
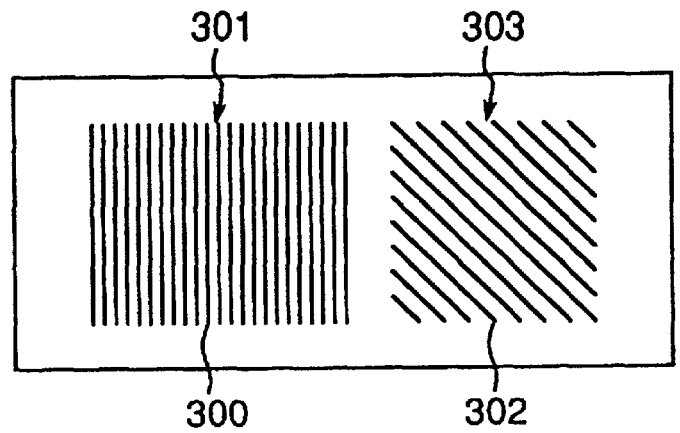
FIG. 29 is a view showing a diffraction grating in which grating trenches are formed in specific directions, and a diffraction grating in which grating trenches are formed in directions angled at 45° to these directions.

For detection of an astigmatism component in a particular direction, the shearing direction does not need to be changed. However, for detection of direction and magnitude of the astigmatism, there is a need of executing the above detection procedure for one particular direction and another direction angled to a specified angle (45°) with respect to the particular direction. In this case, the method for changing the shearing direction may be to rotate the diffraction grating, or to rotate the lens, or to prepare a first diffraction grating 301 in which grating trenches 300 are formed in a particular direction, as well as a second diffraction grating 303 in which grating trenches 302 are formed in a direction angled at a specified angle (45°) to the particular direction, as shown in FIG. 29.

Concrete procedure for evaluating the astigmatism is as follows:

(i) As shown in FIG. 15A, centers (optical axes O, $O_1$) of the diffracted rays (diffraction circles) 31, 32 (not shown), a shearing axis (X-axis), and a vertical bisector (Y-axis) of a line segment that interconnects the optical axes O, $O_1$ are determined on the shearing interference FIG. 47;

(ii) A plurality of measuring points $(P_1, P_2, \ldots, P_{n-1}, P_n)$ are determined on the Y-axis. These measuring points are preferably placed symmetrical with respect to the X-axis;

(iii) The diffraction grating 26 is moved in a direction perpendicular to the grating;

(iv) Light intensities of the measuring points $(P_1, P_2, \ldots, P_{n-1}, P_n)$ are measured;

(v) With respect to the individual measuring points, phases $\phi_P(\phi_{P1}, \phi_{P2}, \ldots, \phi_{P(n-1)}, \phi_{Pn})$ of the light-intensity sine waves are determined;

(vi) The X-coordinates of the individual measuring points and their corresponding light-intensity phases $\phi_P(\phi_{P1}, \phi_{P2}, \ldots, \phi_{P(n-1)}, \phi_{Pn})$ are plotted to the rectangular coordinate system as shown in FIG. 15B;

(vii) A linear function ($\phi = m \cdot x$) is fitted to the plotted points; and (viii) A first-order coefficient (m) of the fitted linear function is determined, by which the astigmatism is evaluated.

Given that a plane wave is referenced, as shown in FIG. 10D, a spherical-aberration wave front 44 takes a rotationally symmetric form, representable by Equation (7):

$$\phi = d \cdot (\xi^2 + \eta^2)^2 \quad (7)$$

where d is a constant.

Accordingly, in the cases of shearing in the ξ direction and shearing in the η direction, intensity differences (i.e., phase differences) between the two interfering rays of light with respect to the individual directions are expressed as cubic functions of Equations (8) and (9) relative to the shearing direction, respectively:

$$d\phi/d\xi = 2d(\xi^2 + \eta^2)(2\xi) \quad (8)$$

$$d\phi/d\eta = 2d(\xi^2 + \eta^2)(2\eta) \quad (9)$$

Figure 11E:
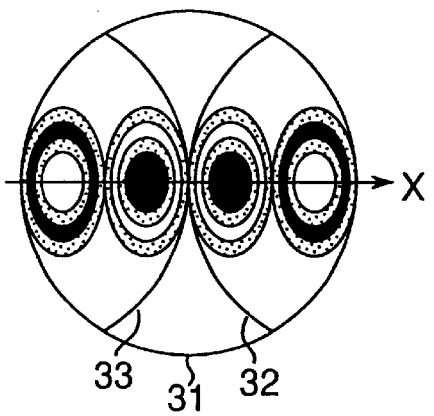
Figure 16A:
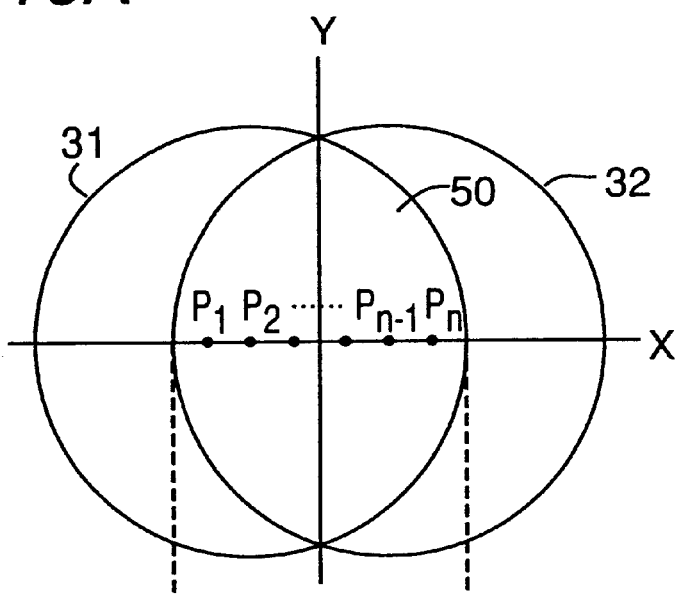
FIGS. 16A and B are views for explaining the evaluation method of spherical aberration, where
Figure 16B:
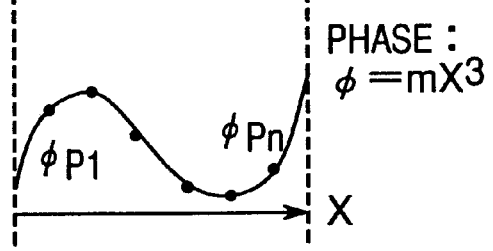

This can be understood also from the fact that the spherical aberration appears as interference fringes shown in FIG. 11E on the shearing interference figure, given that the lens has no other aberrations or the like. Accordingly, as shown in FIG. 16A, a plurality of points $(P_1, P_2, \ldots, P_{n-1}, P_n)$ are set on the X-axis, preferably symmetrically with respect to a bisector (Y-axis) that passes through a midpoint of a line segment interconnecting the centers O, $O_1$ and that is perpendicular to the shearing axis (X-axis), on a shearing interference FIG. 50. Then, the diffraction grating 26 is moved in a direction perpendicular to the grating trenches, and phase changes of the individual points $(P_1, P_2, \ldots, P_{n-1}, P_n)$ are determined. Further, as shown in FIG. 16B, X-coordinates of these points $(P_1, P_2, \ldots, P_{n-1}, P_n)$ and phases $\phi_P(\phi_{P1}, \phi_{P2}, \ldots, P_{(n-1)}, \phi_{Pn})$ of the individual points are plotted on the coordinate system, and then a cubic function is fitted to plotted points. Thus, the spherical aberration (the constant d in Equations (6) to (8)) can be quantitatively determined.

Figure 50A:
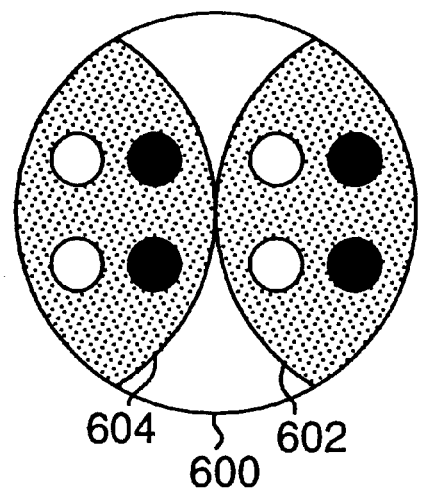
FIGS. 50A and B are views showing a coordinate system for explaining wave front configurations.
Figure 50B:
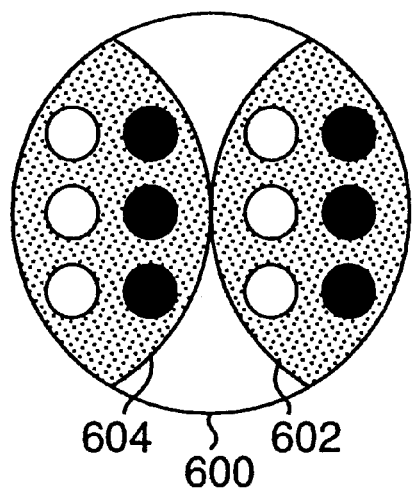

Concrete procedure for evaluating the spherical aberration is as follows:

(i) As shown in FIG. 16A, centers (optical axes O, $O_1$) of the diffracted rays (diffraction circles) 31, 32, and a shearing axis (X-axis) are determined on the interference FIG. 50;

(ii) A plurality of measuring points $(P_1, P_2, \ldots, P_{n-1}, P_n)$ are determined on the X-axis. These measuring points are preferably placed right-and-left symmetrical with respect to a bisector (Y-axis) of a line segment that interconnects the optical axes O, $O_1$ (not shown)

(iii) The diffraction grating 26 is moved in a direction perpendicular to the grating;

(iv) Light intensities of the measuring points $(P_1, P_2, \ldots, P_{n-1}, P_n)$ are measured;

(v) With respect to the individual measuring points, phases $\phi_P(\phi_{P1}, \phi_{P2}, \ldots, \phi_{P(n-1)}, \phi_{Pn})$ of the light-intensity sine waves are determined;

(vi) The X-coordinates of the individual measuring points and their corresponding light-intensity phases $\phi_P(\phi_{P1}, \phi_{P2}, \ldots, \phi_{P(n-1)}, \phi_{Pn})$ are plotted to the rectangular coordinate system as shown in FIG. 16B;

(vii) A cubic function ($\phi = m \cdot x^3$) or biquadratic function is fitted to the plotted points; and (viii) A third-order coefficient (m) of the fitted function is determined, by which the spherical aberration is evaluated.

The higher-order aberrations include aberration components other than the above-described defocus, coma, astigmatism and spherical aberrations. Accordingly, the higher-order aberrations can be determined by determining the residuals between the fitted functions (linear function, quadratic function and cubic function) and the phases in evaluating the defocus, coma, astigmatism and spherical aberration.

Figure 51:
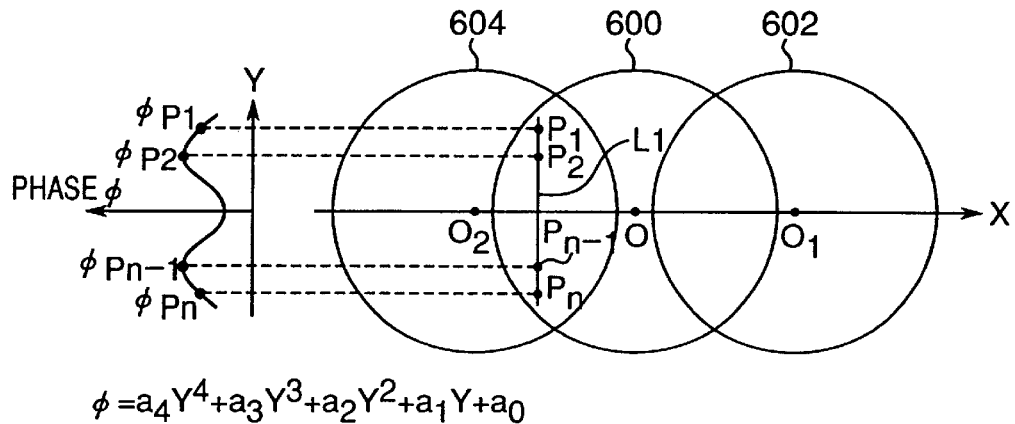
FIG. 51 is a view showing interference fringes generated by fifth- and seventh-order spherical aberrations.

More specifically, as shown in FIG. 17A, a plurality of points $(P_1, P_2, \ldots, P_{n-1}, P_n), (Q_1, Q_2, \ldots, Q_{n-1}, Q_n), (R_1, R_2, \ldots, R_{n-1}, R_n)$ and $(S_1, S_2, \ldots, S_{n-1}, S_n)$ are set on Z, Z' axes that are angled to a specified angle in the positive and negative directions with respect to the X-, Y- and Z-axes, symmetrically with respect to the intersecting point of the X- and Y-axes (shearing center point), on a shearing interference FIG. 51. Then, while the diffraction grating 26 is moved in the direction perpendicular to the grating direction, phase changes and phase differences of the individual points are determined. Further, as shown in FIGS. 17B, 17C, 17D and 17E, coordinates of these points and phase differences of the individual points are plotted on the coordinate system, and then quadratic functions are fitted to plotted points P, R, S, respectively, while the points Q are plotted by a cubic function. Furthermore, residuals between these quadratic functions and cubic function and the plotted phase values are determined, by which the higher-order aberrations can be quantitatively determined.

Concrete procedure for evaluating the higher-order aberrations is as follows:

(i) As shown in FIG. 17A, a shearing axis (X-axis) that interconnects optical axes O, $O_1$, a vertical bisector (Y-axis) that interconnects the optical axes O, $O_1$, and Z- and Z'-axes that pass through an intersecting point of the X-axis and the Y-axis and that are angled to a specified angle $\theta$ ($30° \leq \theta \leq 60°$, preferably 45°) in the positive (counterclockwise) and negative (clockwise) directions with respect to the X-axis are determined on a shearing interference FIG. 51;

(ii) A plurality of measuring points $P(P_1, P_2, \ldots, P_{n-1}, P_n)$, $Q(Q_1, Q_2, \ldots, Q_{n-1}, Q_n)$, $R(R_1, R_2, \ldots, R_{n-1}, R_n)$ and $S(S_1, S_2, \ldots, S_{n-1}, S_n)$ are determined on the Y-, Z-, Z'- and X-axes. These measuring points are preferably placed symmetrical with respect to the intersecting point of the X-axis and the Y-axis;

(iii) The diffraction grating 26 is moved in a direction perpendicular to the grating;

(iv) Light intensities of the measuring points P, Q, R, S are measured;

(v) With respect to the individual measuring points, phases of the light-intensity sine waves are determined;

(vi) The light-intensity phases $\phi_P(\phi_{P1}, \phi_{P2}, \ldots, \phi_{P(n-1)}, \phi_{Pn})$, $\phi_Q(\phi_{Q1}, \phi_{Q2}, \ldots, \phi_{Q(n-1)}, \phi_{Qn})$, $\phi_R(\phi_{R1}, \phi_{R2}, \ldots, \phi_{R(n-1)}, \phi_{Rn})$ and $\phi_S(\phi_{S1}, \phi_{S2}, \ldots, \phi_{S(n-1)}, \phi_{Sn})$ of the measuring points are plotted to the rectangular coordinate system as shown in FIGS. 17B, 17C, 17D, 17E;

(vii) Quadratic functions, $\phi_P = m \cdot x^2$, $\phi_Q = m_T \cdot x^2$, $\phi_R = m_R \cdot x^2$ are fitted to the plotted points ($\phi_P$, $\phi_Q$, $\phi_R$). Similarly, a cubic function, $\phi_S = m \cdot x^3$, or biquadratic function is fitted;

(viii) Residuals between the fitted functions and the phases ($\phi_P$, $\phi_Q$, $\phi_R$, $\phi_S$) are determined; and (ix) Higher-order aberrations are evaluated based on the residuals ($\Delta\phi_P$, $\Delta\phi_Q$, $\Delta\phi_R$, $\Delta\phi_S$). For the evaluation of higher-order aberrations, mean squares of these residuals may also be used.

Figure 18:
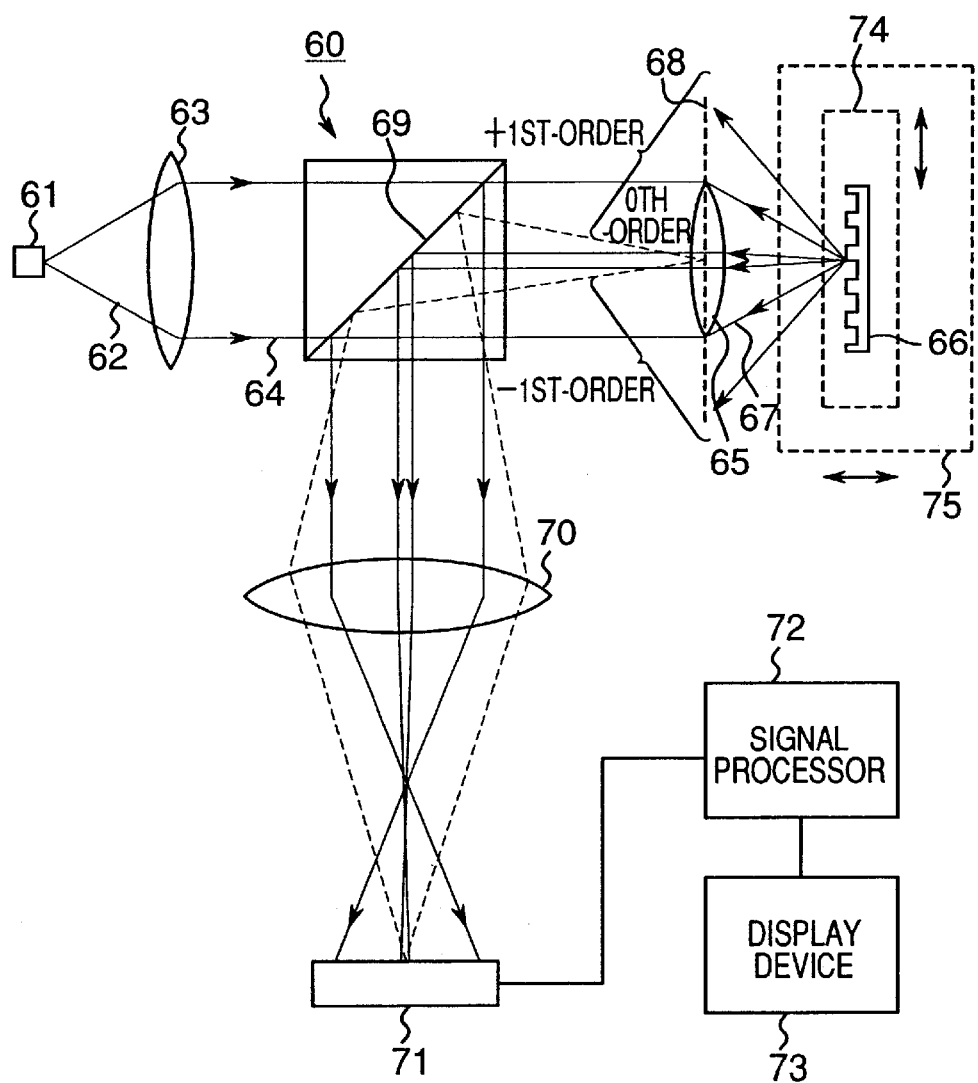
FIG. 18 is a view showing schematic constitution of a lens aberration evaluating system according to another embodiment.

FIG. 18 shows another lens evaluation system 60. In the lens evaluation system 60 shown in this figure, a laser generation source 61 serving as a light source emits a laser beam 62. This laser beam has coherence and, for example, a helium neon laser beam can preferably be used therefor. This is applicable also to the following embodiments. The emitted laser beam 62 is adjusted to generally parallel light 64 by a lens 63 and directed to a reflecting diffraction grating 66 by an objective lens 65. Diffracted light 67 derived from the diffraction grating 66 is directed to be incident again on the objective lens 65. The diffraction grating 66 is so designed that a 0th-order diffracted ray and a +1st-order diffracted ray or −1st-order diffracted ray generate shearing interference at a pupillary surface 68 of the objective lens 65. This shearing interfering light is returned to generally parallel light by the objective lens 65, changed in direction about 90° by a half mirror 69 placed between the objective lens 65 and the lens 63, and focused into an image on an image pickup device 71 (e.g., CCD sensor) by an image forming lens 70. The image pickup device 71 is connected to a signal processor 72, and a shearing interference figure captured by the image pickup device 71 is subjected to signal processing by the signal processor 72 and then displayed onto a display device 73. Then, the diffraction grating 66 is moved in a direction perpendicular to the grating trenches, for example, by a transfer mechanism 74 having a piezo device, where defocus amount and various aberrations of the objective lens 65 are evaluated in the above-described manner with the use of the signal processor 72 and the display device 73. Besides, in order to correctly focus a shearing interference figure on the image pickup device 71, another transfer mechanism 75 capable of moving the diffraction grating 66 in the optical-axis direction (right-and-left direction in FIG. 18) may be provided. The transfer mechanism 75, preferably, has a constitution that a frame for holding the diffraction grating 66 and a base for supporting this frame are coupled to each other with a plurality of screws, and that the transfer mechanism 75 can be controlled in position by turning these screws. In addition, in the embodiments of the invention described below, mechanisms for moving, rotating and tilting various members (for example, lens, light source, diffraction grating, image pickup device, etc., as well as an optical system including those) may be constructed similarly, or made up by using piezo devices.

Figure 19:
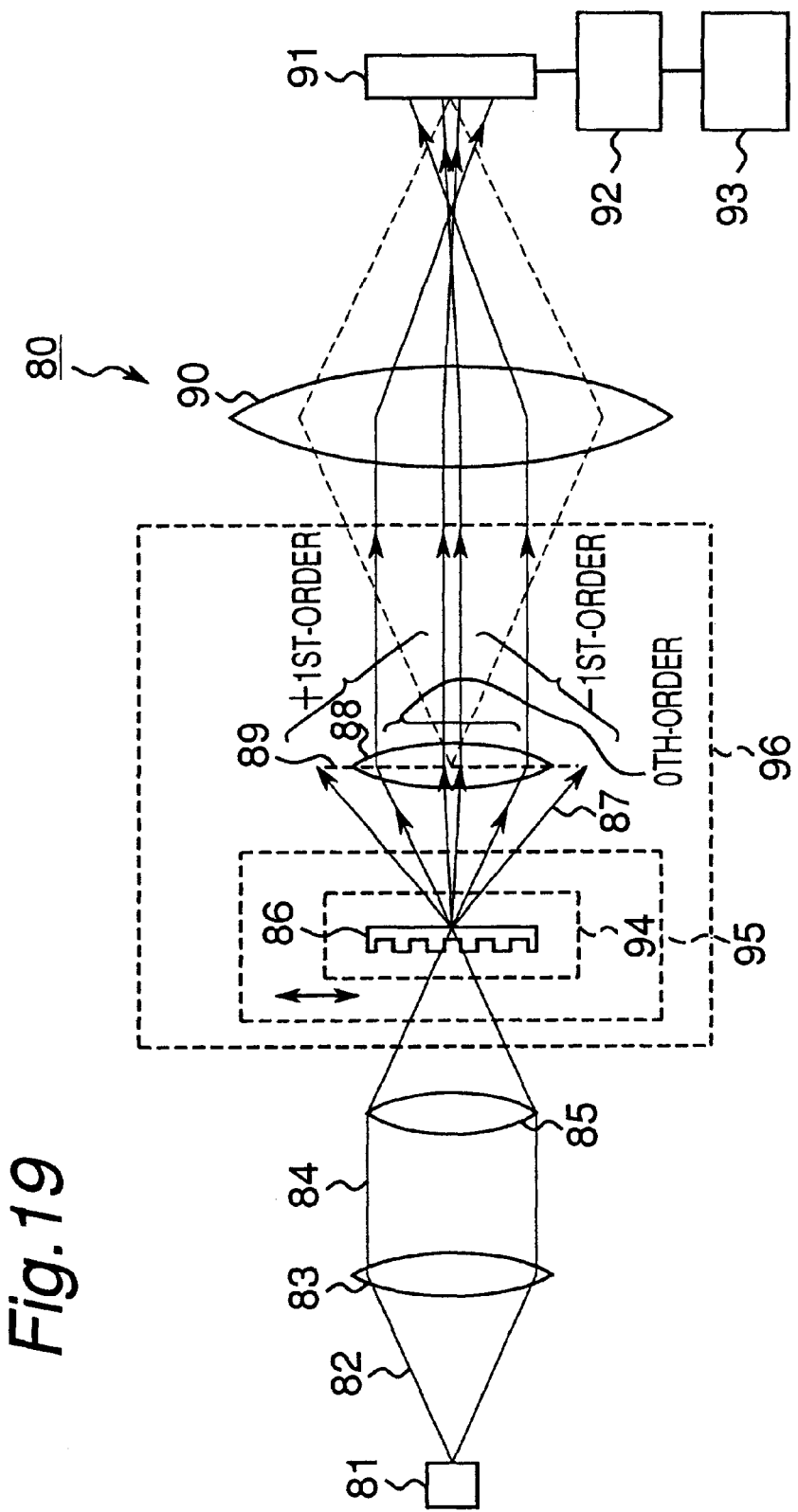
FIG. 19 is a view showing schematic constitution of a lens aberration evaluating system according to another embodiment.

FIG. 19 shows another lens evaluation system 80. In the lens evaluation system 80 shown in this figure, a laser generation source 81 serving as a light source emits a laser beam 82. The emitted laser beam 82 is adjusted to generally parallel light 84 by a lens 83 and directed to a transmission diffraction grating 86 by an objective lens 85. Diffracted light 87 derived from the diffraction grating 86 is directed to be incident on a lens 88. The diffraction grating 86 is so designed that a 0th-order diffracted ray and a +1st-order diffracted ray or −1st-order diffracted ray generate shearing interference at a pupillary surface 89 of the objective lens 85. This shearing interfering light is returned to generally parallel light by the lens 88, and focused into an image on an image pickup device 91 by an image forming lens 90. The image pickup device 91 is connected to a signal processor 92, and a shearing interference figure captured by the image pickup device 91 is subjected to signal processing by the signal processor 92 and then a processing result is displayed onto a display device 93. Then, the diffraction grating 86 is moved in a direction perpendicular to the grating trenches (up-and-down direction in FIG. 19), for example, by a transfer mechanism 94 having a piezo device, where defocus amount and various aberrations of the objective lens 88 are evaluated in the above-described manner with the use of the signal processor 92 and the display device 93. Besides, in order to correctly focus a shearing interference figure on the image pickup device 91, another transfer mechanism 95 capable of moving the diffraction grating 86 in the optical-axis direction (right-and-left direction in FIG. 19) may be provided. Also, another transfer mechanism 96 may be provided so as to allow the diffraction grating 86 to be moved in the optical-axis direction together with the lens 88 so as to cancel the evaluated defocus.

Figure 20:
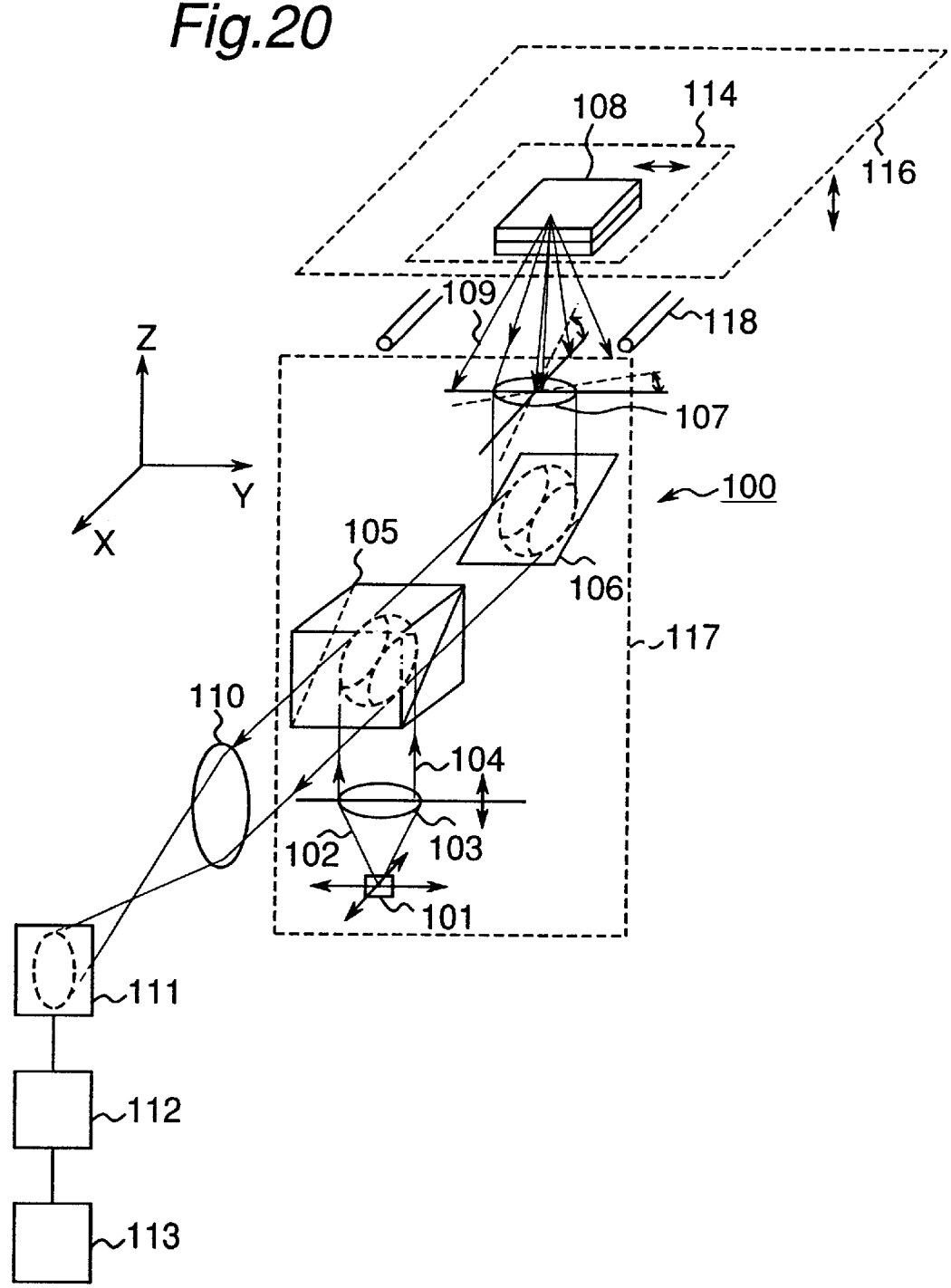
FIG. 20 is a view showing schematic constitution of a lens adjustment system according to another embodiment.

FIG. 20 shows another lens evaluation system 100. In the lens adjustment system 100 shown in this figure, a laser generation source 10l serving as a light source emits a laser beam 102. The emitted laser beam 102 is adjusted to generally parallel light 104 by a lens 103, thereafter reflected by a half mirror 105 and a reflecting mirror 106 and focused into an image onto a reflecting diffraction grating 108 by an objective lens 107. Diffracted light 109 derived from the diffraction grating 108 is directed to be incident on the objective lens 107. The diffraction grating 108 is so designed that a 0th-order diffracted ray and a +1st-order diffracted ray or −1st-order diffracted ray generate shearing interference at a pupillary surface of the objective lens 107. This shearing interfering light is returned to generally parallel light by the lens 107, and focused into an image on an image pickup device 111 by an image forming lens 110 via the reflecting mirror 106 and the half mirror 105. The image pickup device 111 is connected to a signal processor 112, and a shearing interference figure captured by the image pickup device 111 is subjected to signal processing by the signal processor 112 and then a processing result is displayed onto a display device 113. Then, the diffraction grating 108 is moved in a direction perpendicular to the grating trenches (right-and-left direction in FIG. 20), for example, by a transfer mechanism 114 having a piezo device, where defocus amount and various aberrations of the objective lens 107 are evaluated in the above-described manner with the use of the signal processor 112 and the display device 113. Besides, in order to correctly focus a shearing interference figure on the image pickup device 111, another transfer mechanism 116 capable of moving the diffraction grating 108 in the optical-axis direction (up-and-down direction in FIG. 20) may be provided. It is also possible to provide another transfer mechanism 117 capable of moving wholly an optical system including the laser generation source 101, the lens 103 and the objective lens 107, or singly the laser generation source 101 and the like included therein, in the optical-axis direction or in directions perpendicular thereto (X-, Y-directions) so as to cancel the evaluated defocus. Furthermore, the lens evaluation system 100 is provided with an adjustment mechanism 118 capable of adjusting the tilts of the objective lens 107 in the X-, Y-directions and the direction about the optical axis (i.e., adjustment of rotation), so that aberrations (e.g., coma) of the objective lens 107 evaluated by the signal processor 112 and the like can be adjusted.

Figure 21:
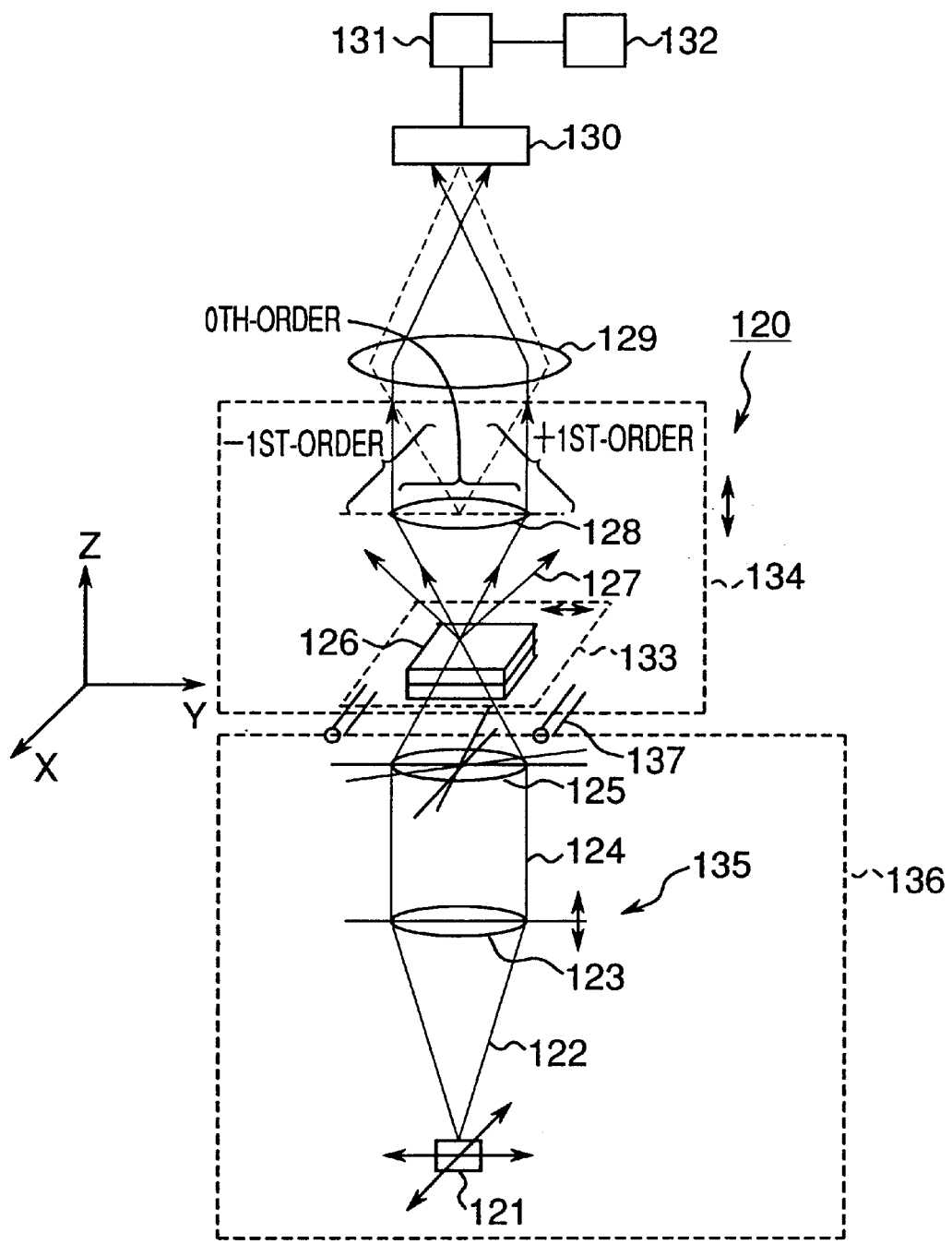
FIG. 21 is a view showing schematic constitution of a lens adjustment system according to another embodiment.

FIG. 21 shows schematic constitution of a lens evaluation system 120. In the lens evaluation system 120 shown in this figure, a laser generation source 121 serving as a light source emits a laser beam 122. The emitted laser beam 122 is adjusted to generally parallel light 124 by a lens 123 and then directed to a transmission diffraction grating 126 by an objective lens 125. Diffracted light 127 derived from the diffraction grating 126 is directed to be incident on a lens 128. The diffraction grating 126 is so designed that a 0th-order diffracted ray and a +1st-order diffracted ray or −1st-order diffracted ray generate shearing interference at a pupillary surface of the lens 128. This shearing interfering light is returned to generally parallel light by the objective lens 128, and focused into an image on an image pickup device 130 by an image forming lens 129. The image pickup device 130 is connected to a signal processor 131, and a shearing interference figure captured by the image pickup device 130 is subjected to signal processing by the signal processor 131 and then a processing result is displayed onto a display device 132. Then, the diffraction grating 126 is moved in a direction perpendicular to the grating trenches (right-and-left direction in FIG. 21), for example, by a transfer mechanism 133 having a piezo device, where defocus amount and various aberrations of the objective lens 125 are evaluated in the above-described manner with the use of the signal processor 131 and the display device 132. Besides, in order to correctly focus a shearing interference figure on the image pickup device 130, another transfer mechanism 134 capable of moving the diffraction grating 126 in the optical-axis direction (up-and-down direction in FIG. 21) may be provided. It is also possible to provide another transfer mechanism 136 capable of moving wholly an optical system 135 including the laser generation source 121, the lens 123 and the objective lens 125, or singly the laser generation source 101 and the like included therein, in the optical-axis direction or in directions perpendicular thereto (X-, Y-directions) so as to cancel the evaluated defocus. Furthermore, the lens adjustment system 120 is provided with an adjustment mechanism 137 capable of adjusting the tilts of the objective lens 125 in the X-, Y-directions and the direction about the optical axis (i.e., adjustment of rotation), so that aberrations (e.g., coma) of the objective lens 125 evaluated by the signal processor 131 and the like can be adjusted.

Figure 22:
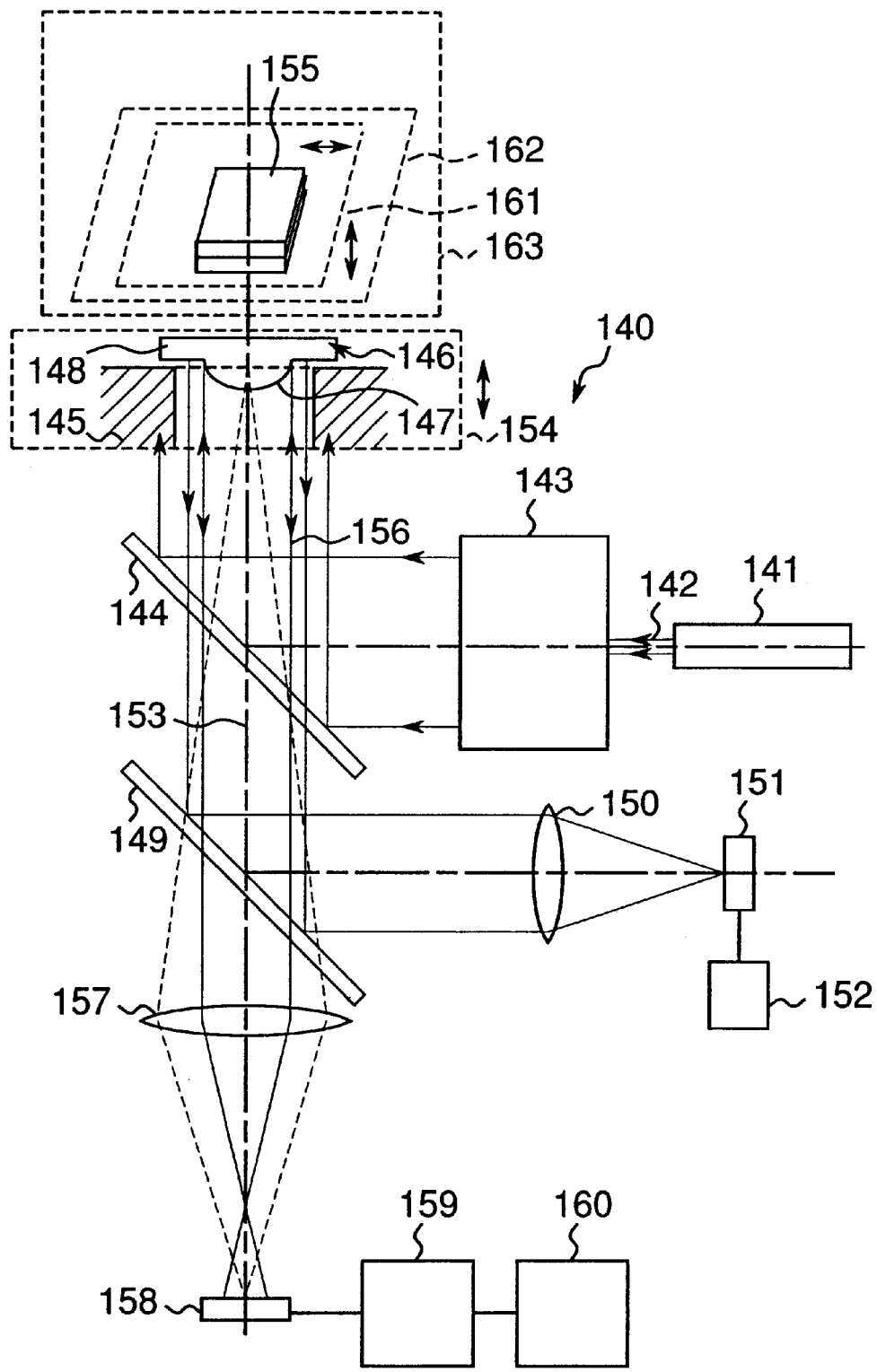
FIG. 22 is a view showing schematic constitution of a lens aberration evaluating system according to another embodiment.

FIG. 22 shows a lens adjustment system 140. In the lens adjustment system 140 shown in this figure, a laser generation source 141 serving as a light source emits a laser beam 142. The emitted laser beam 142 is magnified into generally parallel light by a beam expander 143, and thereafter reflected by a half mirror 144 so as to be incident on an objective lens 146 supported by a holding base 145. The objective lens 146 has a flat marginal surface 148 around a lens spherical surface 147, so that light is incident on not only the lens spherical surface 147, but also the marginal surface 148.

The light incident on the marginal surface 148 is reflected by this marginal surface 148, transmitted by the half mirror 144, and thereafter reflected by another half mirror 149 and focused into an image onto an image pickup device 151 by an image forming lens 150. The image pickup device 151 transmits to a display device 152 a signal corresponding to a received image. The display device 152 processes the signal from the image pickup device 151, displaying an image of the marginal surface 148. Accordingly, by viewing the image displayed on the display device 152, it can be decided whether or not the objective lens 146 is correctly placed with respect to an optical axis 153. If the objective lens 146 is not correctly positioned with respect to the optical axis 153, the holding base 145 is moved in the direction of the optical axis 153 and/or in directions perpendicular thereto with a holding-base transfer mechanism 154 and moreover, if necessary, the holding base 145 is rotated about the optical axis 153 and/or adjusted in its tilt with respect to the optical axis 153.

The light incident on the lens spherical surface 147 of the objective lens 146 is focused into an image on a reflecting diffraction grating 155. Diffracted light derived from the diffraction grating 155 is directed to the objective lens 146. As in the foregoing embodiments, the diffraction grating 155 is so designed that a 0th-order diffracted ray and a +1st-order diffracted ray or −1st-order diffracted ray light generate shearing interference at a pupillary surface of the objective lens 146. This shearing interfering light is returned to generally parallel light 156 by the objective lens 146, passing through the half mirrors 144, 149, and focused into an image on an image pickup device 158 by the image forming lens 157. The image pickup device 158 transmits to a signal processor 159 a signal corresponding to a received image. The signal processor 159 processes the signal from the image pickup device 158, displaying a shearing interference figure onto a display device 160. Then, various aberrations of the objective lens 146 are evaluated in the above-described manner with the use of the signal processor 159 and display device 160. Out of these aberrations, aberrations that can be minimized by moving the objective lens 146 are minimized or canceled by moving, tilting and rotating the objective lens 146 with the holding-base transfer mechanism 154.

Furthermore, as in the foregoing embodiments, with respect to the diffraction grating 155, it is also possible to provide a mechanism 162 for moving the diffraction grating 155 in the direction of the optical axis 153, a mechanism 163 for rotating the diffraction grating 155 and a mechanism (not shown) for adjusting the tilt of the diffraction grating, in addition to the mechanism 161 that moves the diffraction grating 155 in directions perpendicular to the grating.

Further, it is desirable to provide a transfer mechanism also for lenses other than the objective lens 146, the light source 141 and the like so that these members can be adjusted as required.

Figure 23:
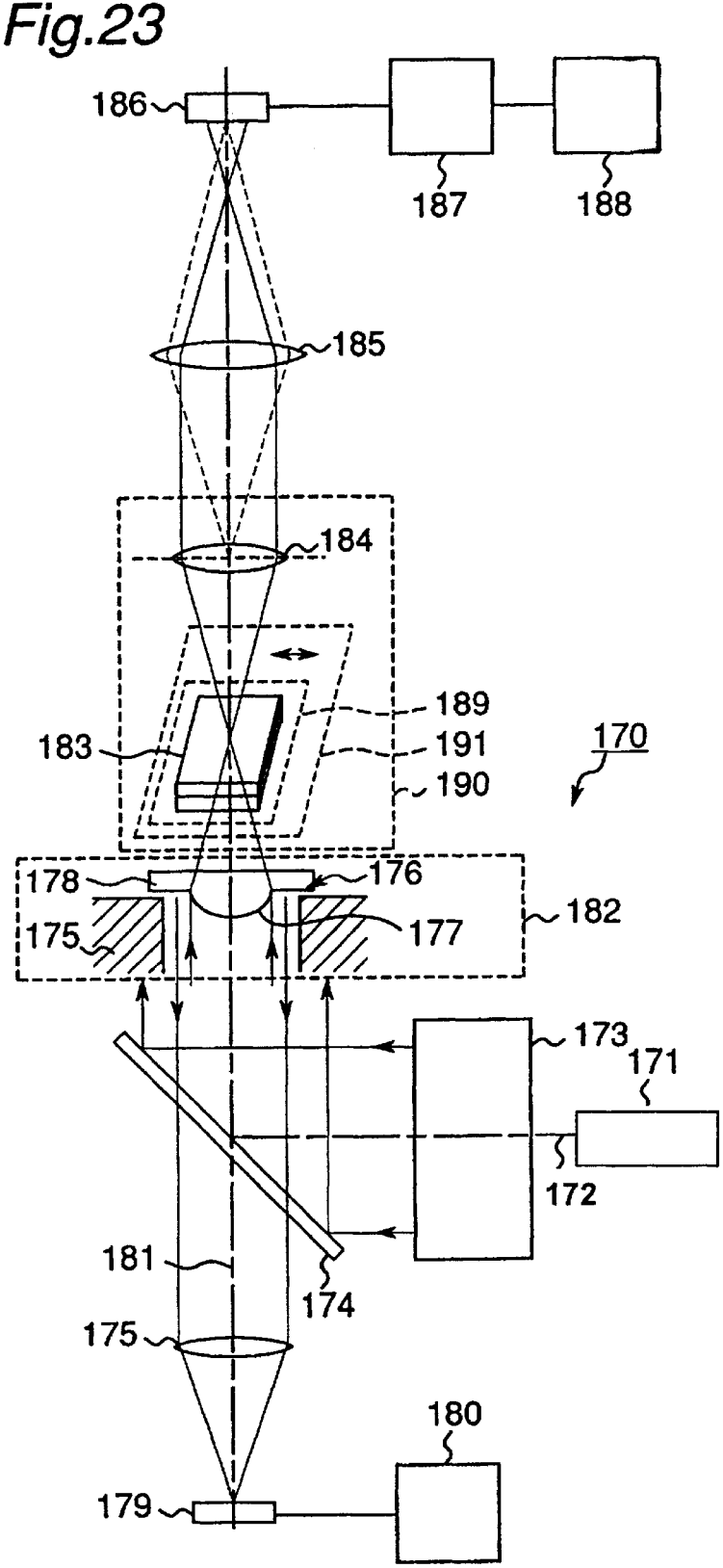
FIG. 23 is a view showing schematic constitution of a lens aberration evaluating system according to another embodiment.

FIG. 23 shows another lens adjustment system 170. In the lens adjustment system 170 shown in this figure, a laser generation source 171 serving as a light source emits a laser beam 172. The emitted laser beam 172 is magnified into generally parallel light by a beam expander 173, and thereafter reflected by a half mirror 174 so as to be incident on an objective lens 176 supported by a holding base 175. The objective lens 176 has a flat marginal surface 178 around a lens spherical surface 177, so that light is incident on not only the lens spherical surface 177, but also the marginal surface 178.

The light incident on the marginal surface 178 is reflected by this marginal surface 178, transmitted by the half mirror 174, and thereafter focused into an image onto an image pickup device (second image receiver) 179 by an image forming lens 175. The image pickup device 179 transmits to a display device 180 a signal corresponding to a received image. The display device 180 processes the signal from the image pickup device 179, displaying an image of the marginal surface 178. Accordingly, by viewing the image displayed on the display device 180, it can be decided whether or not the objective lens 176 is correctly placed with respect to an optical axis 181. If the objective lens 176 is not correctly positioned with respect to the optical axis 181, the holding base 175 is moved in the direction of the optical axis 181 and/or in directions perpendicular thereto with a holding-base transfer mechanism 182 and moreover, if necessary, the holding base 175 is rotated about the optical axis 181 and/or adjusted in its tilt with respect to the optical axis 181.

The light incident on the lens spherical surface 177 of the objective lens 176 is focused into an image on a transmission diffraction grating 183. Diffracted light transmitted by the diffraction grating 183 is directed to be incident on a lens 184. As in the foregoing embodiments, the diffraction grating 183 is so designed that a 0th-order diffracted ray and a +1st-order diffracted ray or −1st-order diffracted ray generate shearing interference at a pupillary surface of the lens 184. This shearing interfering light is returned to generally parallel light by the lens 184 and focused into an image on an image pickup device 186 by an image forming lens 185. The image pickup device 186 transmits to a signal processor 187 a signal corresponding to a received image. The signal processor 187 processes the signal from the image pickup device 186, displaying a shearing interference figure onto a display device 188. Then, various aberrations of the objective lens 176 are evaluated in the above-described manner with the use of the signal processor 187 and display device 188. Out of these aberrations, aberrations that can be minimized by moving the objective lens 176 are minimized or canceled by moving, tilting and rotating the objective lens 176 with the holding-base transfer mechanism 182.

Furthermore, as in the foregoing embodiments, with respect to the diffraction grating 183, it is also possible to provide a mechanism 190 for moving the diffraction grating 183 in the direction of the optical axis 181 together with the lens 184, a mechanism 191 for rotating the diffraction grating 183 and a mechanism (not shown) for adjusting the tilt of the diffraction grating, in addition to the mechanism 189 that moves the diffraction grating 183 in directions perpendicular to the grating.

Further, it is desirable to provide a transfer mechanism also for other lenses, the light source 141 and the like so that these members can be adjusted as required.

Figure 24:
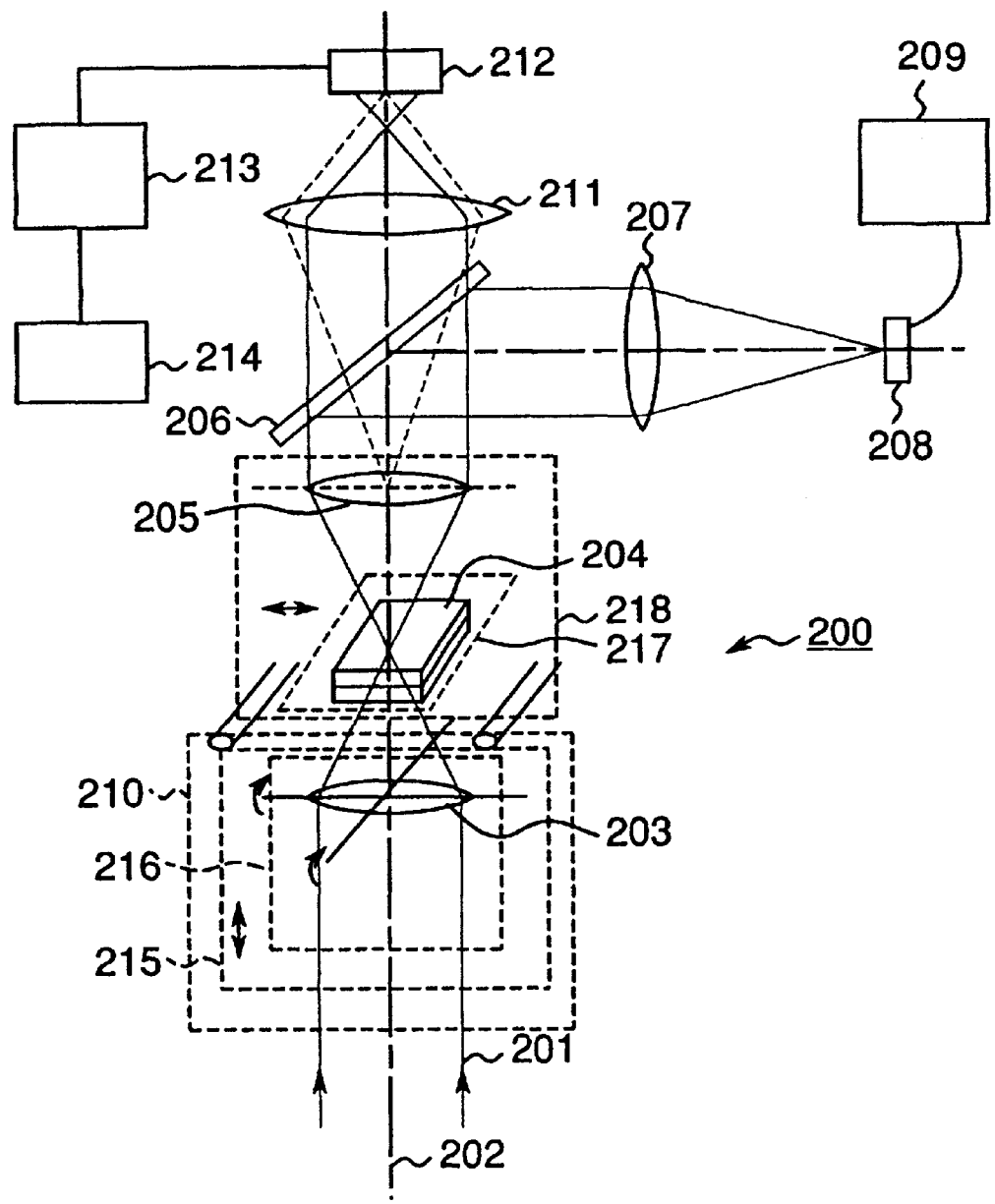
FIG. 24 is a view showing schematic constitution of a lens adjustment system according to another embodiment.

FIG. 24 shows another lens adjustment system 200. In the lens adjustment system 200 shown in this figure, a laser beam 201 is directed to be incident on an objective lens 203 in generally parallel to an optical axis 202. The light transmitted by the objective lens 203 is focused into an image onto a transmission diffraction grating 204. Diffracted light generated by the diffraction grating 204 is directed to be incident on a lens 205. As in the foregoing embodiments, the diffraction grating 204 is so designed that a 0th-order diffracted ray and a +1st-order diffracted ray or −1st-order diffracted ray generate shearing interference at a pupillary surface of the lens 205. This shearing interfering light is returned to generally parallel light by the lens 205, partly reflected by a half mirror 206 and focused into an image on an image pickup device 208 by an image forming lens 207. The image pickup device 208 transmits to a display device 209 a signal corresponding to a received image. The display device 209 processes the signal from the image pickup device 208, displaying an image of the light transmitted by the lens 205. Accordingly, by viewing the image displayed on the display device 209, it can be decided whether or not the optical axis of the objective lens 203 or the like is correctly coincident on the optical axis 202. For example, if the objective lens 203 is not correctly positioned with respect to the optical axis 202, the optical axis of the objective lens 203 is made coincident on the optical axis 202 with a lens transfer mechanism 210 that moves the objective lens 203 in directions perpendicular to the optical axis 202.

The light transmitted by the half mirror 206 is focused into an image on an image pickup device 212 by an image forming lens 211. The image pickup device 212 transmits to a signal processor 213 a signal corresponding to a received image. The signal processor 213 processes the signal from the image pickup device 212, displaying a shearing interference figure onto a display device 214. Then, various aberrations of the objective lens 203 are evaluated an the above-described manner with the use of these signal processor 213 and display device 214. Out of these aberrations, aberrations that can be minimized by moving the objective lens 203 are minimized or canceled by moving, tilting and rotating the objective lens 203 with a mechanism 215 that moves the objective lens 203 in the optical-axis direction, a mechanism 216 that adjusts the tilt of the objective lens 203 and, if necessary, the lens transfer mechanism 210.

Furthermore, as in the foregoing embodiments, with respect to the diffraction grating 204, it is also possible to provide a mechanism 218 for moving the diffraction grating 204 in the direction of the optical axis 202 together with the lens 205, and mechanisms (not shown) for rotating and tilt-adjusting the diffraction grating 204, in addition to a mechanism 217 that moves the diffraction grating 204 in directions perpendicular to the grating.

Further, it is desirable to provide a transfer mechanism also for other lenses, the light source and the like so that these members can be adjusted as required.

Figure 25:
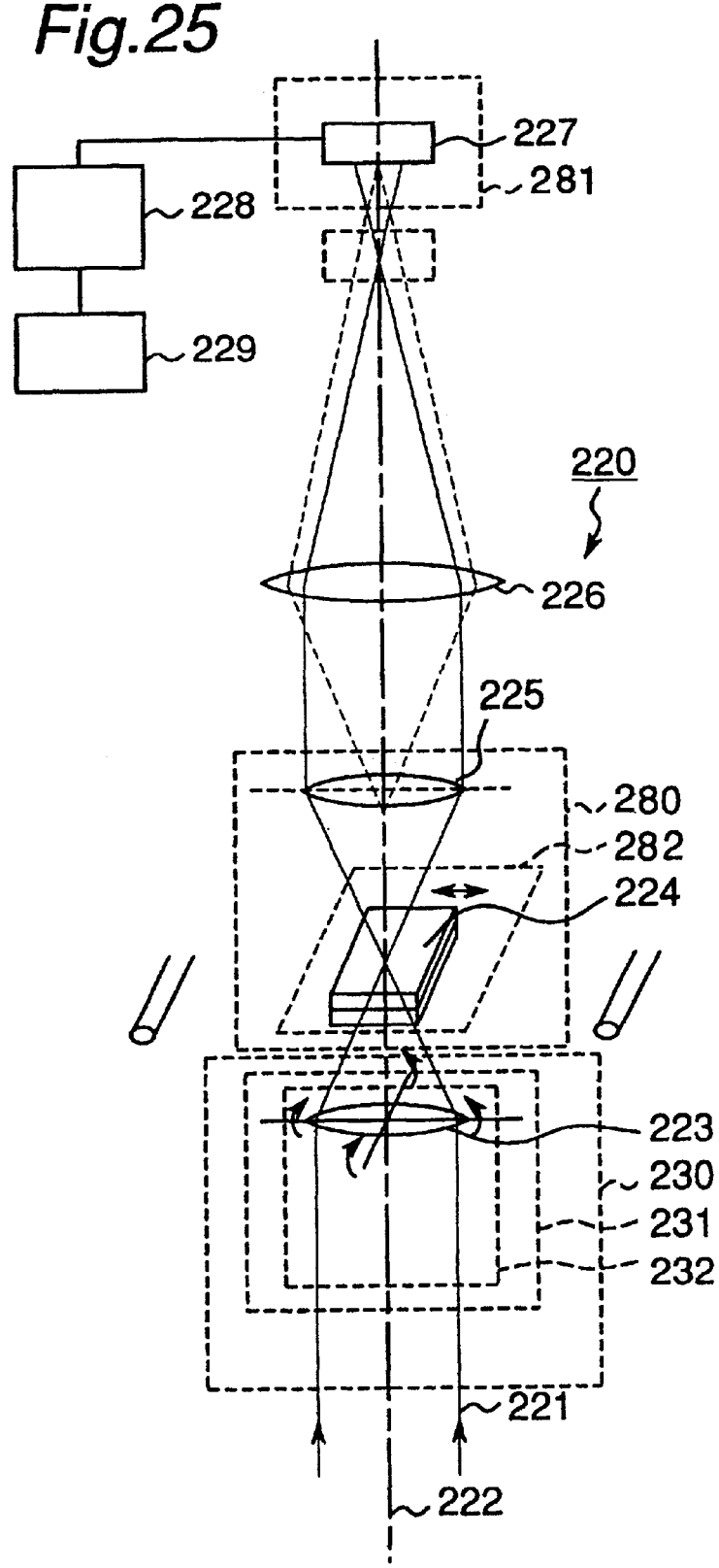
FIG. 25 is a view showing schematic constitution of a lens adjustment system according to another embodiment.

FIG. 25 shows another lens adjustment system 220. In the lens adjustment system 220 shown in this figure, a laser beam 221 is directed to be incident on an objective lens 223 in generally parallel to an optical axis 222. The light transmitted by the objective lens 223 is focused into an image onto a transmission diffraction grating 224. Diffracted light generated by the diffraction grating 224 is directed to be incident on a lens 225. As in the foregoing embodiments, the diffraction grating 224 is so designed that a 0th-order diffracted ray and a +1st-order diffracted ray or −1st-order diffracted ray generate shearing interference at a pupillary surface of the lens 225. This shearing interfering light is returned to generally parallel light by the lens 225 and focused into an image on an image pickup device 227 by an image forming lens 226. The image pickup device 227 transmits to a signal processor 228 a signal corresponding to a received image. The signal processor 228 processes the signal from the image pickup device 227, displaying a shearing interference figure onto a display device 229. Then, various aberrations of the objective lens 223 are evaluated in the above-described manner with the use of the signal processor 228 and display device 229. Out of these aberrations, aberrations that can be minimized by moving the objective lens 223 are minimized or canceled by moving and tilting the objective lens 223 with a mechanism 230 that moves the objective lens 223 in the optical-axis direction, a mechanism 231 that moves the objective lens 223 in directions perpendicular to the optical axis, and a mechanism 232 that adjusts the tilt of the objective lens 223.

Furthermore, by viewing the image displayed on the display device 229, it can be decided whether or not the image pickup device 227 is correctly placed at the image forming position of the image forming lens 226. If the Image pickup device 227 is not correctly placed at the image forming position, the image pickup device 227 can be moved in the optical-axis direction by a transfer mechanism 281 so as to be adjusted to the correct position. Further, as in the foregoing embodiments, with respect to the diffraction grating 224, it is also possible to provide a mechanism 280 for moving the diffraction grating 224 in the optical-axis direction together with the lens 225, and mechanisms (not shown) for rotating and tilt-adjusting the diffraction grating 204, in addition to a mechanism 282 that moves the diffraction grating 224 in directions perpendicular to the grating. Further, it is desirable to provide a transfer mechanism also for other lenses, the light source and the like so that these members can be adjusted as required.

Figure 26:
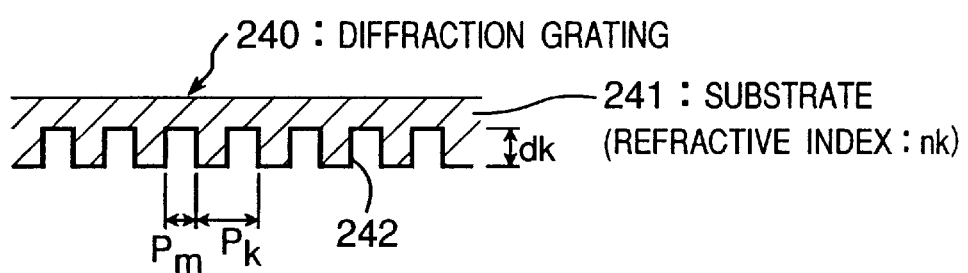
FIG. 26 is a partly enlarged sectional view of a diffraction grating.
Figure 27:
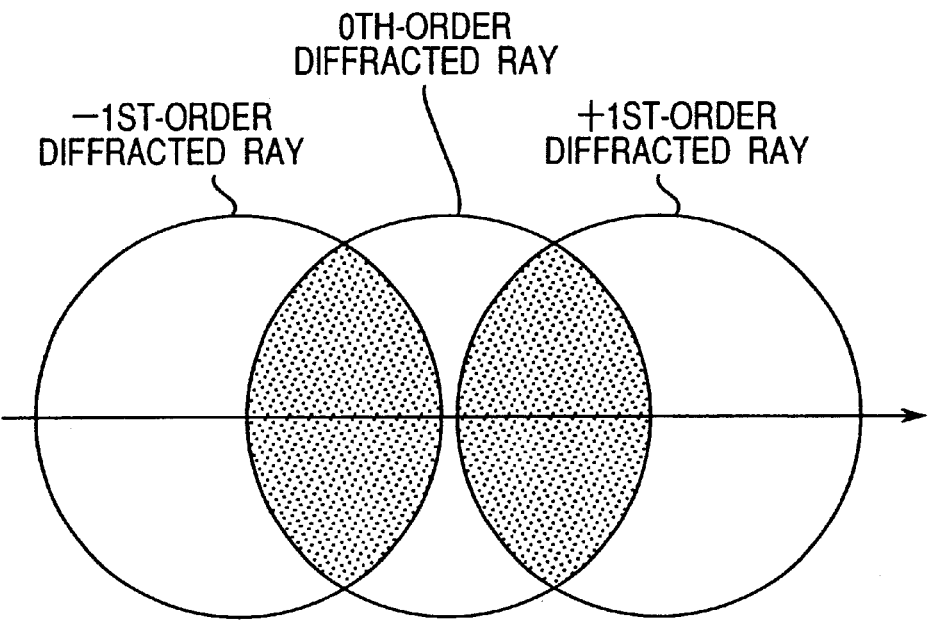
FIG. 27 is a view showing a shearing interference figure of a 0th-order diffracted ray and +1st-order and −1st-order diffracted rays.

The diffraction gratings used in the present invention include reflecting diffraction gratings and transmission diffraction gratings. In such a diffraction grating 240, as shown in FIG. 26, on a surface of a substrate 241 made of a material having a specified refractive index (nk) (e.g., polycarbonate), grating trenches 242 having a specified depth (grating depth: dk) with a specified width (grating width: Pm) are formed in specified directions at specified intervals (grating pitch: Pk) In the case of a reflecting diffraction grating, on the surface on which the grating trenches 242 are formed, a thin reflection coating (not shown) is formed by evaporating a reflective material such as aluminum. In addition, although not shown in FIG. 26, the surface on which the grating for the diffraction grating is formed is desirably covered with a cover made of an appropriate material (e.g., polycarbonate). It is also possible to provide a cover glass near the grating surface of the diffraction grating, so that the diffraction grating is protected by the cover glass. Further, an optical disk or part of it may also be used as a reflecting diffraction grating.

The above grating pitch Pk and the like largely affect the contrast of a 0th-order diffracted ray and ±1st-order diffracted rays, the size of the shearing interference figure, and the shearing diffracted light. More specifically, the grating pitch Pk affects the diffraction angle, and decreasing grating pitch Pk would cause the diffraction angle of diffracted light to increase. This would in turn cause the shearing interference figure to decrease. Conversely, increasing grating pitch Pk would cause the diffraction angle to decrease, which would in turn cause the shearing interference figure to increase. The size of the shearing interference figure is also dependent on the light wavelength λ, the numerical aperture $A(=\sin\theta s$, where $\theta s$ is the incident ray angle of light incident from the condenser lens onto the diffraction grating) of the condenser lens.

Intensity of diffracted light and the contrast of the shearing interference figure depend on grating depth dk and grating duty ratio Pm/Pk of the diffraction grating, the wavelength $\lambda$ of light and the refractive index nk of the diffraction grating.

Thus, under these circumstances, in order to obtain a shearing interference figure from interference of a 0th-order diffracted ray and a +1st-order diffracted ray or −1st-order diffracted ray, the diffraction grating is preferably designed so as to satisfy the following conditions:

$$0.8 \leq Pk \cdot (A/\lambda) \leq 1.2,$$

$$0.5 \leq dk \cdot (nk-1) \cdot (8/\lambda) \leq 2, \text{ and}$$

$$0.2 \leq du \leq 0.8.$$

where Pk is the grating pitch;
dk is the grating depth;
du is the grating duty ratio (=grating trench width/grating pitch);
A is the numerical aperture of diffraction grating (=sin$\theta$s, where $\theta$s is the incident ray angle of light incident from the condenser lens onto the diffraction grating);
nk is the refractive index of the diffraction grating; and
$\lambda$ is the wavelength of light.
Further, the most preferable conditions are:

$$Pk \cdot (A/\lambda) = 1,$$

$$dk \cdot (nk-1) \cdot (8/\lambda) = 1, \text{ and}$$

$$d = 0.5.$$

Figure 28:
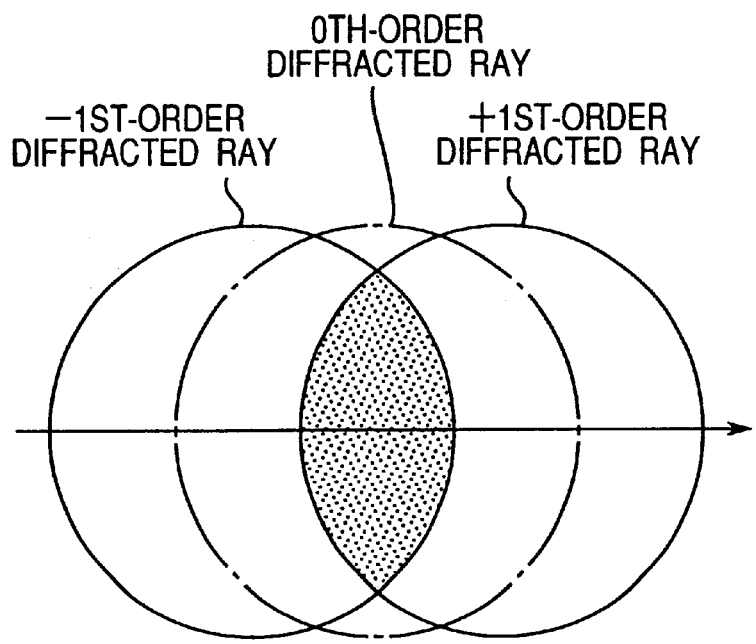
FIG. 28 is a view showing a shearing interference figure of +1st-order and −1st-order diffracted rays.

As shown in FIG. 28, in order to obtain a shearing interference figure from interference of a +1st-order diffracted ray and a −1st-order diffracted ray, the diffraction grating needs to be designed to such conditions that the 0th-order diffracted ray is not generated. Conditions in this case are as follows:

$$0.8 \leq Pk \cdot \sin(\theta s/2)/\lambda \leq 1.2,$$

$$0.8 \leq dk \cdot (nk-1) \cdot (4/\lambda) \leq 1.2, \text{ and}$$

$$0.4 \leq du \leq 0.6.$$

Further, the most preferable conditions are:

$$Pk \cdot \sin(\theta s/2)/\lambda = 1,$$

$$dk \cdot (nk-1) \cdot (4/\lambda) = 1, \text{ and}$$

$$d = 0.5.$$

However, the diffraction grating is not necessarily restricted to the above conditions, and may be designed to the following conditions:

Design conditions:

$$0.8 \leq Pk \cdot (A/\lambda) \leq 1.2,$$

$$0.5 \leq dk \cdot (nk-1) \cdot (4/\lambda) \leq 2, \text{ and}$$

$$0.2 \leq du \leq 0.8.$$

Design conditions:

$$0.8 \leq Pk \cdot \sin(\theta s/2)/\lambda \leq 1.2,$$

$$0.8 \leq dk \cdot (nk-1) \cdot (4/\lambda) \leq 1.2, \text{ and}$$

$$0.4 \leq du \leq 0.6.$$

In the above description, although the diffraction grating is so designed as to move the diffraction grating in directions perpendicular to the grating (grating trench) direction in the embodiment of the present invention, the diffraction grating may be moved in directions having directional components perpendicular to the grating direction, i.e., in directions oblique to the grating direction, in which case similar effects can also be obtained.

As apparent from the above description, with the lens evaluation method, evaluation system, adjustment method and adjustment system according to this embodiment, lens characteristics (defocus amount, coma, astigmatism, spherical aberration and higher-order aberration) can be determined without determining wave front configurations by a simple method that phases of light intensity changes are determined at a plurality of points of a shearing interference figure. Also, a minimum of two points will do as the number of points at which phases of light intensity changes are determined, so that the lens characteristics can be evaluated and adjusted in short time.

II. Second Embodiment

Figure 30:
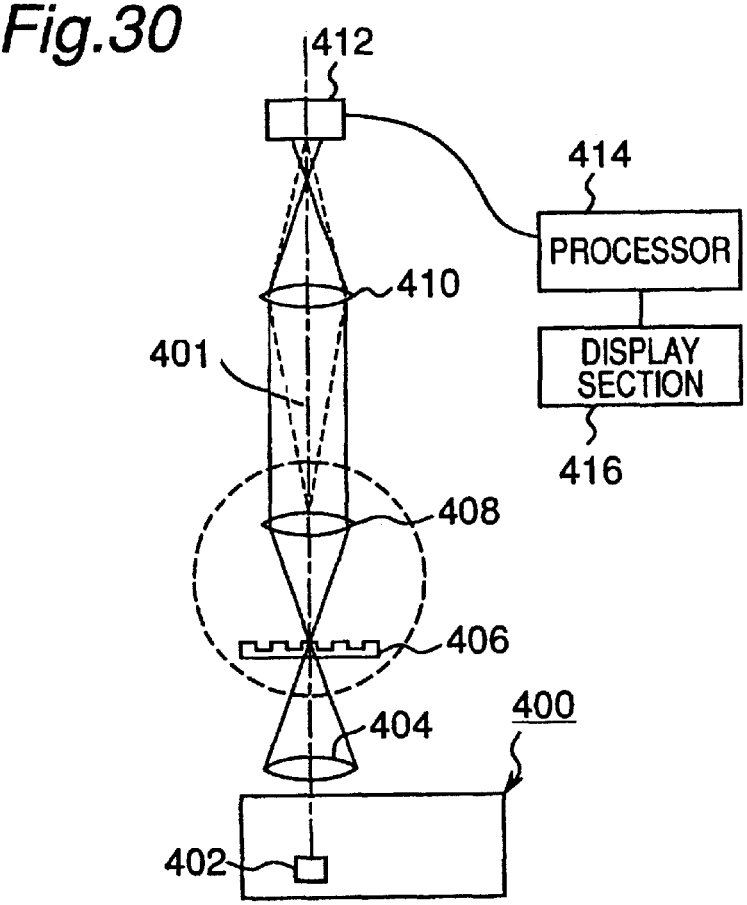
FIG. 30 is a view showing the constitution of a system for evaluating and correcting aberrations of a lens system (objective lens) of an optical unit.

FIG. 30 shows a system for adjusting an objective lens of an optical unit (optical head) by using a diffraction interference method. In this adjustment system, light generated by a light source (e.g., semiconductor laser) 402 of an optical unit 400 is emitted out via an objective lens 404. A transmission diffraction grating 406 is placed at the image forming position of the objective lens 404, so that the light incident on the transmission diffraction grating 406 is decomposed into, for example, 0th-, ±1st-, ±2nd-, ... -orders of diffracted rays. In the adjustment system shown in the figure, the transmission diffraction grating and the other optical elements are so designed that the 0th-order diffracted ray and the +1st-order diffracted ray, and the 0th-order diffracted ray and the −1st-order diffracted ray partly overlap with each other, respectively, to generate interference fringes in an opening region of a collimator lens 408.

Figure 11F:
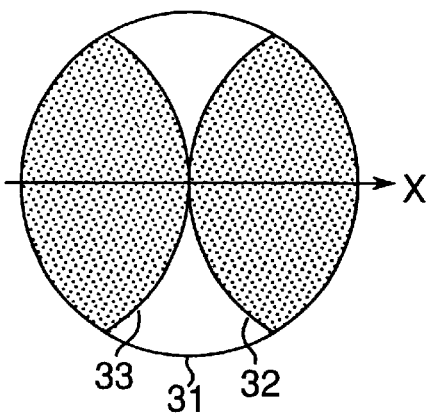

The light transmitted by the collimator lens 408 is focused into an image on an image pickup device 412 by an image forming lens 410. In the image formed on the image pickup device 412, the interference region of the 0th-order diffracted ray and the ±1st-order diffracted ray contains interference fringes due to defocus (see FIG. 11A), interference fringes due to coma (see FIGS. 11B, 11C), interference fringes due to astigmatism (see FIG. 11D), and interference fringes due to spherical aberration (see FIG. 11E). Generally, these aberrations are generated compositely so that interference fringes actually result in a pattern in which those interference fringes are superimposed on one another. However, when the objective lens 404 is correctly focused on the diffraction grating 406, there appears no pattern in the interference region (see FIG. 11F).

Each point in the interference fringes has its unique phase. Therefore, in the diffraction interference method, the diffraction grating 406 is moved at a constant speed in a direction perpendicular to an optical axis 401, and a plurality of points are set in the interference region of diffracted light, where phase differences between light intensity changes at one point and light intensity changes at another point are determined. Then, various aberrations are evaluated by analyzing the phase differences, and optical elements, such as the image forming lens, are adjusted.

Figure 31:
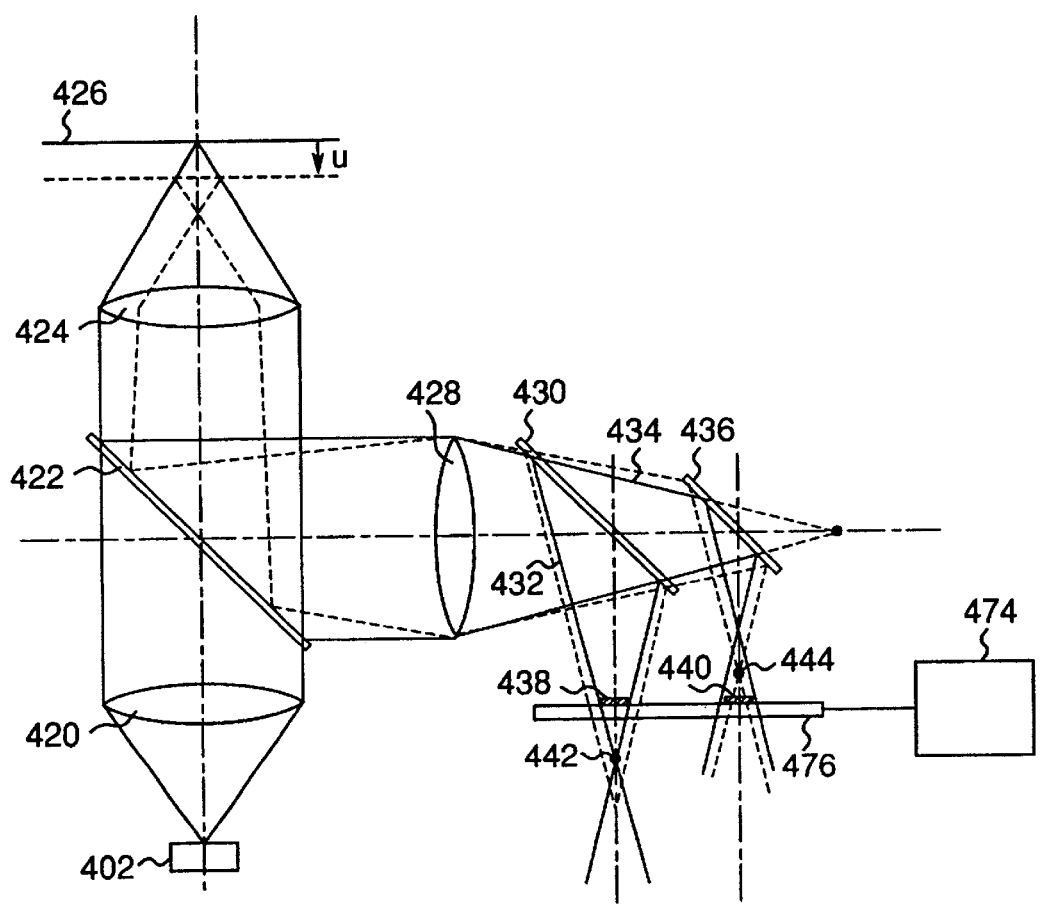
FIG. 31 is a sectional view of an optical system included in the optical unit.

Positional adjustment of the image receiving device is briefly explained. As shown in FIG. 31, in the optical unit 400, light generated by the light source 402 is adjusted into generally parallel light by a collimator lens 420, transmitted by a beam splitter 422 and then directed to be incident on a target position (e.g., optical disk 426) by an objective lens 424. The light incident on the optical disk 426 becomes reflected light containing information contained in the optical disk 426, going in a direction reverse to the incident light, adjusted into generally parallel light again by the objective lens 424. Thereafter, the adjusted light is reflected by the beam splitter 422 and converged by an image receiving lens 428. The converged light goes incident on a second beam splitter 430 and divided into a first light beam 432 traveling in a direction generally perpendicular to the incidence direction and a second light beam 434 transmitted by the second beam splitter 430. Further, the second light beam 434 is reflected by a mirror 436 so as to be directed along a direction generally parallel to the first light beam 432. Then, the first and second light beams 432, 434 are directed to be incident on the first and second image receiving devices 438, 440, respectively.

It is noted here that since the second light beam 434 is deflected on the downstream side of the second beam splitter 430, an image forming position 442 of the first light beam 432 and an image forming position 444 of the second light beam 434 are shifted from each other in a direction parallel to these light beams. Also, the first image receiving device 438 is placed before the image forming position 442, while the second image receiving device 440 is placed beyond the image forming position 444 of the second light beam 434.

Figure 32:
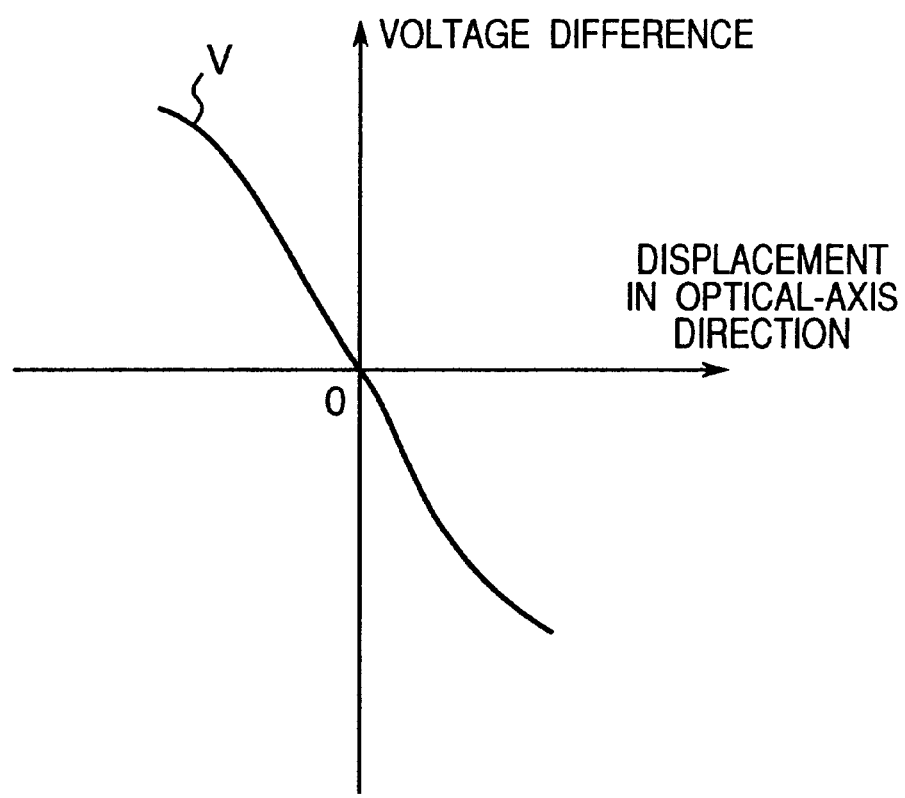
FIG. 32 is a view showing how voltage difference of signals outputted from the image receiver vary depending on changes in the optical-axis direction of the optical disk.

Therefore, when the optical disk 426 is moved so as to approach the objective lens 424, the distance between the image forming position 442 of the first light beam 432 and the first image receiving device 438 increases, while the distance between the image forming position 444 of the second light beam 434 and the second image receiving device 440 decreases. Conversely, when the optical disk 426 is moved so as to go away from the objective lens 424, the distance between the image forming position 442 of the first light beam 432 and the first image receiving device 438 decreases, while the distance between the image forming position 444 of the second light beam 434 and the second image receiving device 440 increases. Further, the intensity of light received by an image receiving device decreases with increasing distance between the image forming position and the image receiving device, while, conversely, the intensity of received light increases with decreasing distance between the image forming position and the image receiving device. Besides, the output voltage of an image receiving device varies with the intensity of received light. Therefore, an output voltage difference V between the first and second image receiving devices 438, 440 varies as shown in FIG. 32 depending on the distance between the objective lens 424 and the optical disk 426.

Furthermore, in the optical unit 400, the positions of the first and second image receiving devices 438, 440 are so adjusted that the output voltage difference V between the first and second image receiving devices 438, 440 is set as large as possible, so as to allow information recorded in the optical head to be correctly read regardless of any shifts of the optical head in the optical-axis direction that occur during the rotation of the optical head, and moreover to allow the information to be correctly recorded onto the optical head. More specifically, in actual adjustment, the optical head or its equivalent member is vibrated in the optical-axis direction, where voltages of signals outputted from the first and second image receiving devices 438, 440 are measured. Then the positions of the first and second image receiving devices 438, 440 are adjusted so that the difference between those voltages becomes a maximum.

Subsequently, adjustment of positional shift between the center of the objective lens and the center of light intensity distribution in an image formed through the transmission of this objective lens is explained. In this adjustment, light emitted from the optical unit 400 is directed to be incident on the image pickup device 412 by the image forming lens 410, and an image received by this image pickup device is processed by a processor 414 and then displayed on an image display unit 416. Then, the positional shift between the center of the image and the center (maximum light intensity position) of the light intensity distribution in the image is detected. Based on the detection result, the objective lens 404 is moved on a plane perpendicular to the optical axis 401, so that the positional shift is canceled.

Like this, the three types of adjustment as described above require different constitutions. That is, the aberration adjustment (correction) for the lens system requires a diffraction grating, the positional adjustment for an image receiving device requires a reflecting member, and the positional shift adjustment for an objective lens does not require such members.

Therefore, the optical unit is required to first correct the aberrations of lens diameter by a first adjustment position, then adjust the position of the image receiving device at a second adjustment position, and subsequently adjust the positional shift of the objective lens at a third adjustment position. As a result, because of the need for moving the optical unit from the first to third positions, the time required for adjustment would increase proportionally to the transfer time, as a newly posed problem. A plurality of embodiments described below are solutions to this problem.

Figure 33:
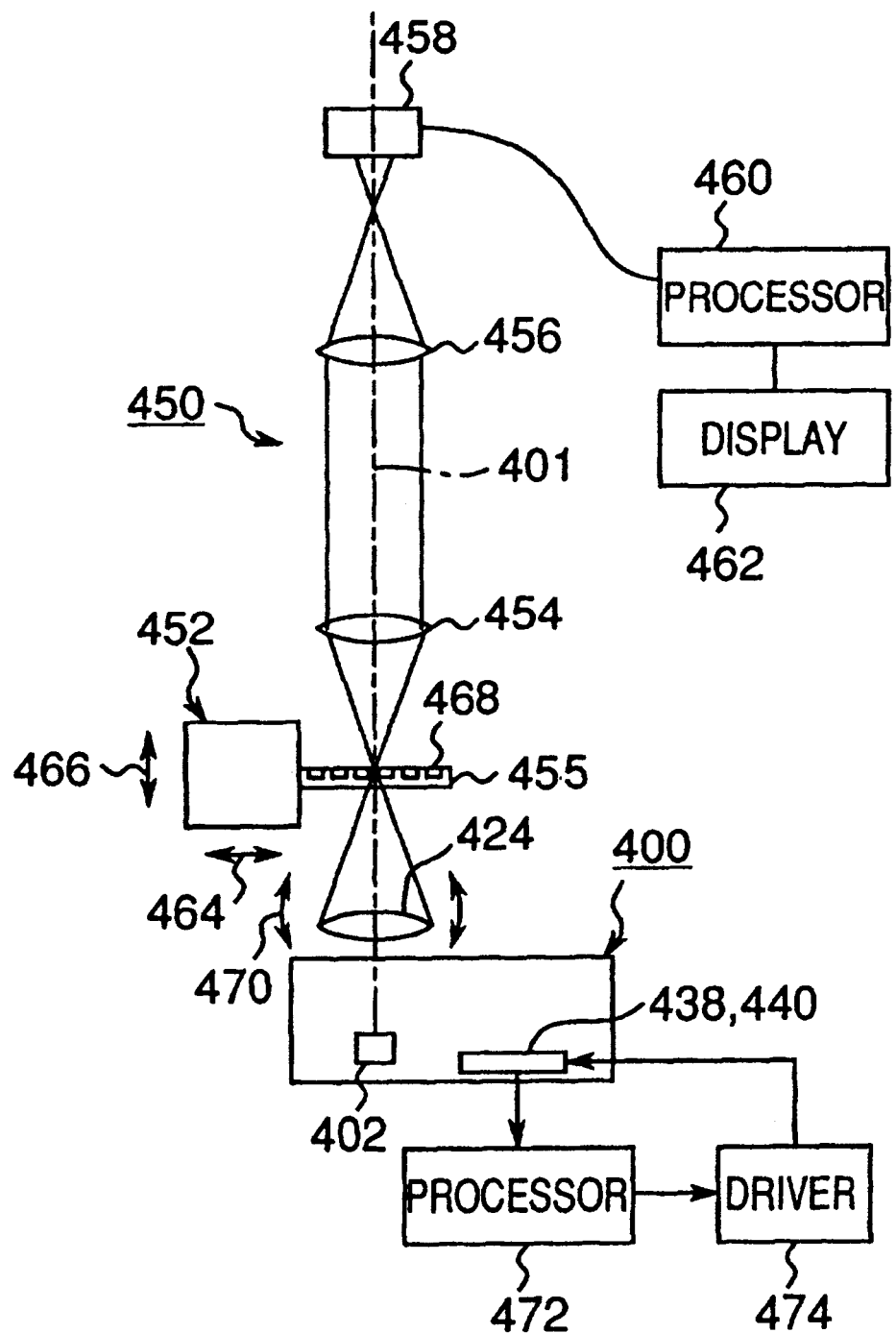
FIG. 33 is a view showing the constitution of an optical unit adjustment system.

As shown in FIG. 33, in a system 450 for evaluating optical characteristics of the optical unit 400 are placed, as listed in order from the objective lens 404 side on the optical axis 401 of the optical unit 400, a diffraction grating unit 455, a collimator lens 454, an image forming lens 456, and an image pickup device (photoelectric conversion device: CCD) 458. The image pickup device 458 is connected to an image processor 460, and the image processor 460 is connected to a display unit 462 (e.g., CRT), so that a signal outputted from the image pickup device 458 can be processed by the image processor 460, and that a processing result can be displayed on the display unit 462.

The diffraction grating unit 452 has a diffraction grating 454 placed so as to cross the optical axis 401. The diffraction grating unit 452 further has a horizontal transfer mechanism 464 for moving the diffraction grating 454 at a constant speed in a direction (horizontal direction in the figure) perpendicular to the optical axis 401, and a vertical transfer mechanism 466 for vibrating the diffraction grating 454 in a direction (up-and-down direction in the figure) parallel to the optical axis 401. Preferably, micro transfer mechanisms using piezo devices are used for these horizontal transfer mechanism 464 and vertical transfer mechanism 466.

The diffraction grating 454 is a transmission-and-reflecting diffraction grating and, besides, an amplitude type diffraction grating in which a surface made of a light-pervious material is coated with a layer (not shown) made of a reflective, opaque material and moreover a plurality of optical slits (light-pervious windows) 468 are formed in the layer in parallel at regular intervals. This transmission-and-reflecting diffraction grating may be replaced with a phase diffraction grating in which a plurality of parallel trenches are provided in the surface of a plate made of a light-pervious material with specified intervals, the surface of the phase diffraction grating being covered with a coating of a semi-light-pervious material. Therefore, light incident on the diffraction grating 454 is partly reflected in a direction reverse to the direction of incidence while the rest of the light is transmitted by the optical slits 468. Further, the optical slits 468 are so designed that 0th-, ±1st-, ±2nd-, . . . -order diffracted rays are formed from the incident light, and that the 0th-order diffracted ray and the +1st-order diffracted ray, as well as the 0th-order diffracted ray and the −1st-order diffracted ray are partly superimposed on each other to generate interference fringes in the opening region of the collimator lens 455.

Evaluation procedure and the like for the optical unit 450 using the above constitution are explained. In this evaluation procedure, light (a laser beam) emitted from the light source (e.g., semiconductor laser) 402 of the optical unit 450 passes through the objective lens 424, going out therefrom so as to be incident on the diffraction grating 454. Part of the light incident on the diffraction grating 454 is diffracted at the optical slits 468, thus forming 0th-, ±1st-, ±2nd-, . . . -order diffracted rays. Out of these diffracted rays, the 0th-order diffracted ray and the ±1st-order diffracted rays are superimposed on each other (interfere) at the opening region of the collimator lens 454, causing interference fringes (shearing interference figure) to be generated in the their interference region (shearing region). Next, light collimated by the collimator lens 454 is focused into an image by the image forming lens 456, and received by the image pickup device 458. The image pickup device 458 prepares a series of electric signals corresponding to the received light, outputting the electric signals to an image processor 460. The image processor 460 processes the received signals, and displays the image received by the image pickup device 458 onto a display unit 462.

For evaluation of aberrations of the lens system, the horizontal transfer mechanism 464 is driven so that the diffraction grating 454 is moved in the horizontal direction. As a result, light-intensity phase of each point in the shearing interference figure displayed on the display unit 462 varies. Therefore, with the above-described diffraction interference method, a plurality of points are set on the shearing interference figure, where phase differences among light intensities at these points are determined, by which various aberrations (defocus, spherical aberration, coma, astigmatism etc.) are evaluated. Also, based on the aberration evaluation result, the lens system of the optical unit 400 is adjusted. For example, when the objective lens 424 is adjusted based on the aberration evaluation result, the set angle or the like of the objective lens 424 with respect to the optical axis 401 is adjusted by operating a first adjustment mechanism 470 that supports this objective lens 424.

For adjustment of the positions of the image receiving devices 438, 440, the diffraction grating 454 is reciprocatively moved in the optical-axis direction by driving the vertical transfer mechanism 466. As a result, as already described, the intensities of light received by the two image receiving devices 438, 440 as well as the voltages outputted in response to the light intensities vary. Then, a signal processor 472 connected to the two image receiving devices 438, 440 activates a driver 474 based on the difference between the voltages outputted from these image receiving devices 438, 440, thereby moving a holder 476 that holds the image receiving devices 438, 440, by which the positions of the image receiving devices 438, 440 are adjusted so that the fluctuation of the difference between the output voltages of the image receiving devices 438, 440 becomes a maximum.

Figure 34:
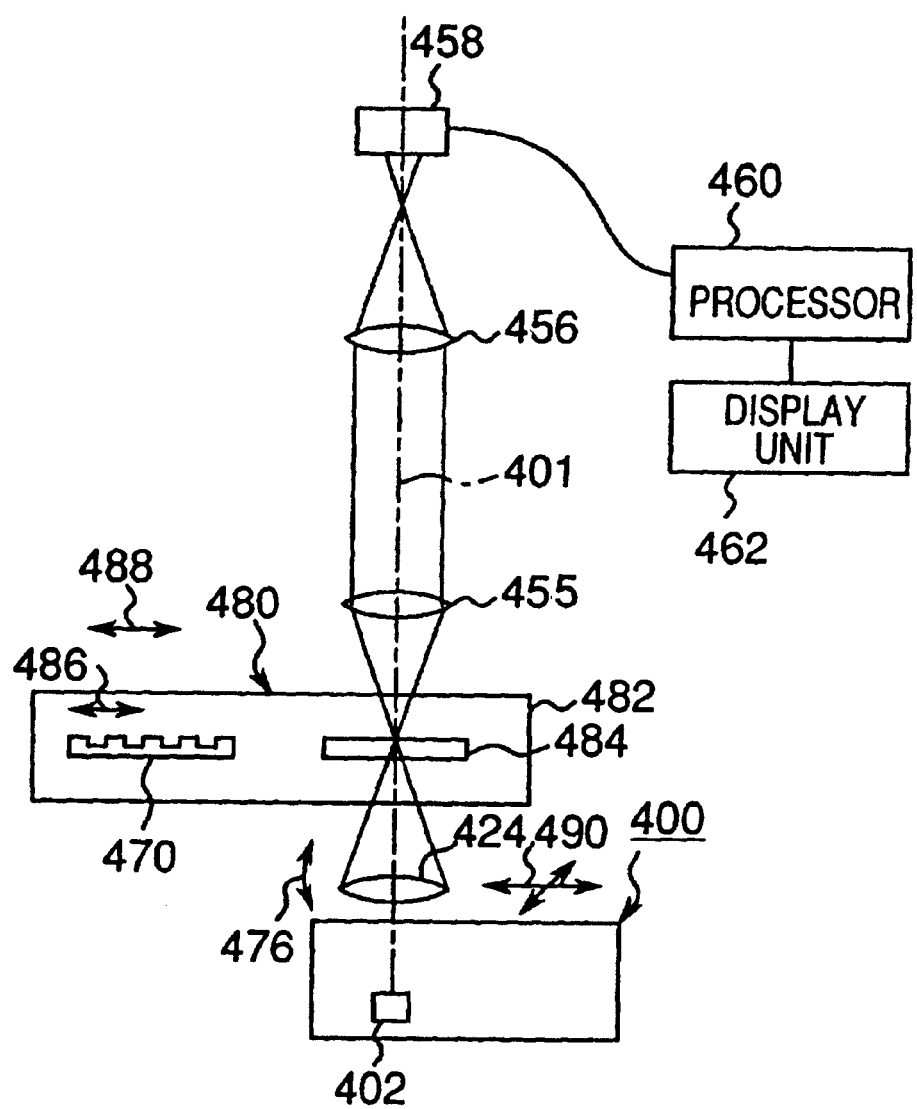
FIG. 34 is a view showing interference of diffracted rays derived from the transmission-and-reflecting diffraction grating.

FIG. 34 shows another embodiment. In this embodiment, a diffraction grating unit 480 has a frame 482 placed between the objective lens 424 and the collimator lens 455. In the frame 482 are held a transmission-and-reflecting diffraction grating 470 as described above, and a transparent plate 484 having a specified thickness. As the transmission-and-reflecting diffraction grating 470, either one of the above-described two types of transmission-and-reflecting diffraction gratings may be used. Also, the diffraction grating 470 is coupled to the frame 482 via a horizontal transfer mechanism 486, and the diffraction grating 470 is so designed as to be able to move in the horizontal direction at a constant speed relative to the frame 482. Meanwhile, the frame 482 is so designed as to be movable between a position (see FIG. 34) where the transparent plate 484 crosses the optical axis 401 and a position (not shown) where the diffraction grating 470 crosses the optical axis 401, manually or with an electromechanical drive mechanism 488.

For determination of aberrations of the lens system in this embodiment, the frame 482 is set to a position where the diffraction grating 470 crosses the optical axis 401. Then, as in the foregoing embodiment, while the diffraction grating 470 is moved by the horizontal transfer mechanism 486, aberrations of the lens system are determined with the shearing interference figure displayed on the display unit 462 and, for example, the angle of the objective lens 424 with respect to the optical axis 401 is adjusted.

For adjustment of any positional shift of the objective lens 424, first, it is decided with the image displayed on the display unit 462 whether or not the center of the image received by the image pickup device 458 and the center of the light intensity distribution in this image are coincident with each other. Then, if the two centers are not coincident with each other, the objective lens 424 is moved in the horizontal direction by operating an adjustment mechanism 490 that holds the objective lens 424, thereby making the centers coincident with each other.

Figure 35:
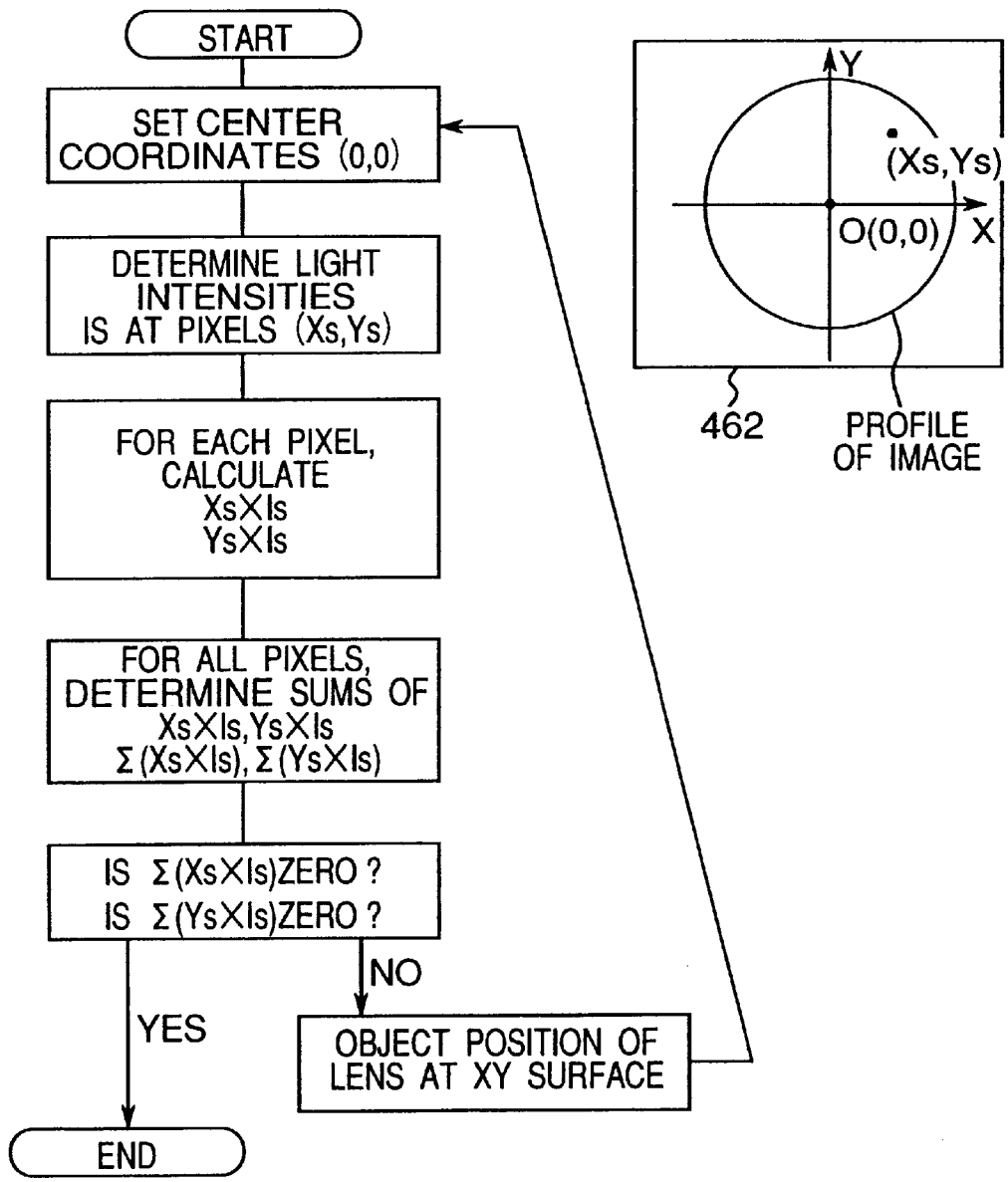
FIGS. 35A and B are views showing an interference figure of diffracted rays displayed on a display device.

More specifically, as shown in FIG. 35, center coordinates O(0, 0) of the objective lens 424 are determined from the profile of a circular image displayed on the display unit 462. Next, light intensities Is of the individual pixels (coordinates: (Xs, Ys)) in the image are determined, and thereafter Xs×Is, Ys×Is are calculated for the individual pixels. Subsequently, Xs×Is, Ys×Is determined for the individual pixels are totaled, respectively, by which $\Sigma(Xs \times Is)$, $\Sigma(Ys \times Is)$ are calculated. Then, it is decided whether or not $\Sigma(Xs \times Is)$, $\Sigma(Ys \times Is)$ are zero; where if these total values are not zero or not within a certain range around zero, the objective lens 424 is moved in parallel to the horizontal plane according to the total values, similar processes and calculations are done, and the objective lens 424 is adjusted in position until the total values come to zeroes or fall within the certain range around zero.

In the above embodiment, aberration adjustment for the optical unit 400 and positional shift adjustment for the objective lens 424 have been carried out at the same position. However, when the frame 482 is provided with a vertical transfer mechanism (see FIG. 33) for transferring the diffraction grating 454 in the optical-axis direction, three types of adjustment including the positional adjustment of the image receiving devices 438, 440 can be carried out at the same place.

As described above, in the optical unit adjustment system according to the second embodiment, at least two types of adjustment out of a plurality of types of adjustment work (aberration adjustment of the optical unit, positional shift adjustment of the image forming lens, positional adjustment of the image receiving devices) which have been carried out with different devices and at different places can be achieved at the same place. Thus, the total adjustment time for the optical unit can be reduced.

III. Third Embodiment

Whether defocus and spherical aberration can be correctly measured may be affected by bumps and dips that occur at central portions of an objective lens during the manufacturing process of the objective lens.

Figure 36:
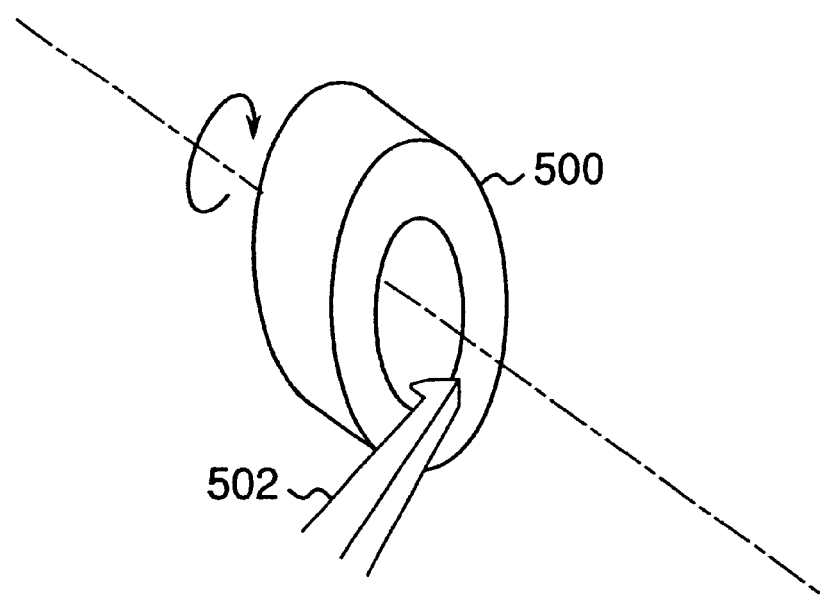
FIG. 36 is a view showing a state in which a lens mold is manufactured.
Figure 37:
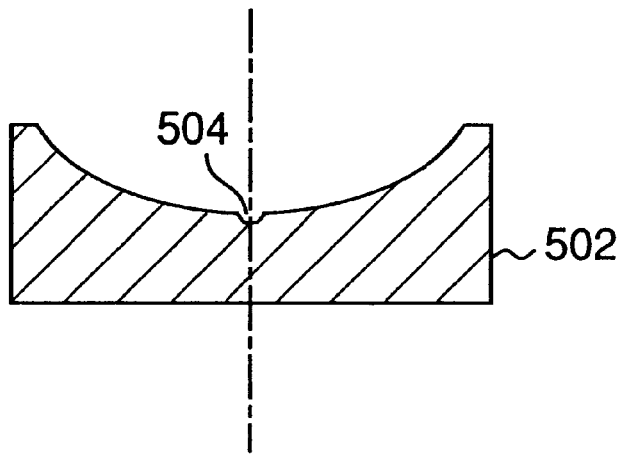
FIG. 37 is a sectional view of the manufactured mold.

More specifically, the process for manufacturing an objective lens includes a step for first fabricating a mold that determines the outline of the objective lens, and a step for next injecting a lens material into the prepared mold. Also, the process for manufacturing the mold includes a step for, as shown in FIG. 36, while rotating a mold 500, cutting the surface of the mold 500 into a shape corresponding to the profile of the objective lens with a precision cutting tool 502. During this process, since the mold is rotating at a constant speed, the traveling speed (cutting speed) of the cutting tool 502 relative to the mold 500 is faster with increasing distance from the rotational center and slower with decreasing distance to the center of the mold 500. Therefore, as shown in FIG. 37, a site 504 that differs in machined state from its surroundings occurs at the central portion of the mold 500, the site appearing in the lens profile as a dip or a bump.

Figure 38:
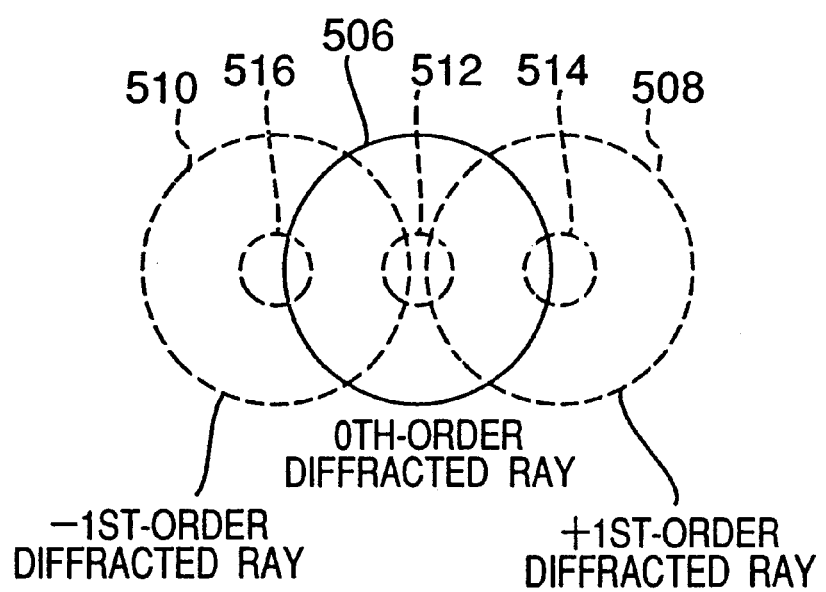
FIG. 38 is a view showing interference of 0th-order and ±1st-order diffracted rays.
Figure 40:
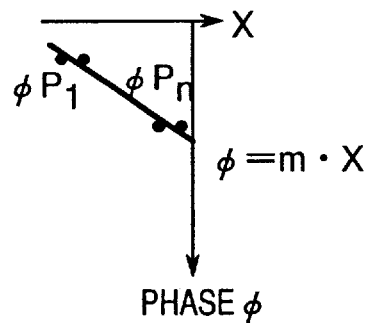
FIG. 40 is a view showing a state in which a linear function is fitted to light intensity phases.
Figure 41:
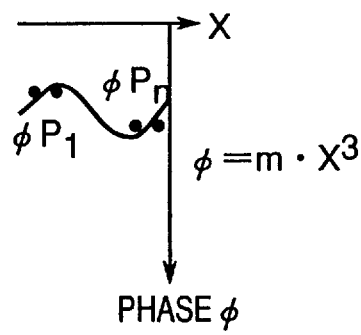
FIG. 41 is a view showing a state in which a cubic function is fitted to light intensity phases.

When a shearing interference figure is obtained by partly overlapping a 0th-order diffracted ray and ±1st-order diffracted rays derived from the diffraction grating on each other, such local configurational errors of the mold would affect interference patterns of regions 512, 514, 516 around the centers of the individual diffracted rays 506, 508, 510 as shown in FIG. 38. Therefore, according to the diffraction interference method, as shown in FIGS. 39, 40, 41, for example within the shearing interference region 516, measuring points $P_1, P_2, \ldots, P_n$, are set on a line segment that passes through the centers of the +1st-order ray and the −1st-order ray, and phases of light intensity changes resulting from shifting the phases of the individual measuring points are measured at the individual points. Then, the phases Y are approximated by fitting thereto a linear function, or a function having higher than first orders, of measuring positions X corresponding to the phases Y, and defocus is evaluated by the first-order coefficient value of the fitted function; or the phases Y are approximated by fitting thereto a cubic function, or a function having higher than third orders, of the measuring positions X, and spherical aberration is evaluated by the third-order coefficient of the fitted function. Then, results of those evaluations would have the aforementioned configurational errors.

FIG. 42 shows schematic constitution of a lens evaluation system capable of solving such problems. In this lens evaluation system 520, light going out from an objective lens 524 of an optical head 522 goes incident on a transmission diffraction grating 526, while being converged thereon, and is adjusted into generally parallel light by a detecting lens 528 and thereafter directed to an image pickup device 532 through an image forming lens 530. The image pickup device 532 is connected to a signal processing and display device 534, so that an image received by the image pickup device 532 is displayed on the signal processing and display device 534.

This system is so designed that 0th-, ±1st-, ±2nd-, . . . - orders diffracted rays are obtained from the transmission diffraction grating 526 and that the 0th-order diffracted ray and the +1st-order diffracted ray, or the 0th-order diffracted ray and the −1st-order diffracted ray partly overlap with each other in the opening region of the detecting lens 528. Thus, an interference figure formed on the detecting lens 528 is focused on the image pickup device 532 by the image forming lens 530, by which an interference figure is obtained.

The interference figure formed on the image pickup device 532 is as shown in FIG. 11.

(Spherical Aberration)

Therefore, given that a plane wave is referenced, a spherical-aberration wave front takes a rotationally symmetrical form with respect to the optical axis, representable by Equation (10):

$$\phi = d \cdot (\xi^2 + \eta^2)^2 \tag{10}$$

where d is a constant.

Also, in the case of shearing in the $\xi$ direction and in the case of shearing in the $\eta$ direction, intensity differences (i.e., phase differences) between the two interfering rays of light with respect to the individual directions are expressed as cubic functions of Equations (11) and (12), respectively:

$$d\phi/d\xi = 2d(\xi^2 + \eta^2)(2\xi) \tag{11}$$

$$d\phi/d\eta = 2d(\xi^2 + \eta^2)(2\eta) \tag{12}$$

Therefore, as shown in FIG. 43A, on a shearing interference FIG. 540, a plurality of points $(P_1, P_2, \ldots, P_{n-1}, P_n)$ are set on a vertical bisector that does not pass through a midpoint of a line segment interconnecting centers O, $O_1$ of a 0th-order diffracted ray 542 and a first-order diffracted ray 544, but passes through a point distant from the center O by a quarter distance of the line segment interconnecting O and $O_1$ (or a quarter of the center-to-center distance $OO_1$ from the center O), and further that is vertical to the shearing axis. Then, the diffraction grating 526 is moved in a direction perpendicular to its grating trenches by a transfer mechanism 536, and Y-coordinates $(P_1, P_2, \ldots, P_{n-1}, P_n)$ and phases $(\phi_{P1}, \phi_{P2}, \ldots, \phi_{Pn-1}, \phi P_n)$ of the individual points are plotted on the coordinate system. Further, a quadratic function is fitted to plotted points, by which the spherical aberrations (the constant d in Equations (9) to (11)) are quantitatively determined.

Concrete procedure for evaluating the spherical aberration is as follows:

(i) As shown in FIG. 43A, centers (optical axes O, $O_1$) of the diffracted rays (diffraction circles), and a shearing axis (X-axis) are determined on the interference figure;

(ii) A vertical line that does not pass through the centers O, $O_1$, but perpendicularly crosses the X-axis at a point distant from the center O by a quarter distance of a line segment interconnecting O and $O_1$ (or a quarter of the center-to-center distance $OO_1$ from the center O) is determined, and then a plurality of measuring points $(P_1, P_2, \ldots, P_{n-1}, P_n)$ are determined on this vertical line. These measuring points are desirably placed symmetrical with respect to the X-axis;

(iii) The diffraction grating is moved in a direction perpendicular to the grating;

(iv) Light intensities of the measuring points $(P_1, P_2, \ldots, P_{n-1}, P_n)$ are measured;

(v) With respect to the individual measuring points, phases $\phi_P(\phi_{P1}, \phi_{P2}, \ldots, \phi_{Pn-1}, \phi_{Pn})$ of the light-intensity sine waves are determined;

(vi) The Y-coordinates of the individual measuring points and their corresponding light-intensity phases $\phi_P(\phi_{P1}, \phi_{P2}, \ldots, \phi_{Pn-1}, \phi_{Pn})$ are plotted to the rectangular coordinate system as shown in FIG. 43B;

(vii) A quadratic function ($\phi = a_p \cdot Y^2 + bp \cdot Y + c_p$) or cubic function is fitted to the plotted points; and (viii) A second-order coefficient ($a_p$) of the fitted function is determined, by which the spherical aberration is evaluated.

Given that a plane wave is referenced, a defocus wave front takes a rotationally symmetrical form with respect to the optical axis, representable by Equation (13):

$$\phi = m \cdot (\xi^2 + \eta^2) \quad (13)$$

where m is a constant.

Accordingly, when two diffracted rays interfere in the $\xi$ direction, and when two diffracted rays interfere in the $\eta$ direction, intensity differences (i.e., phase differences) between the two interfering rays of light with respect to the individual directions are expressed as linear functions of Equations (14) and (15) in the shearing directions, respectively:

$$d\phi/d\xi = 2m\xi \quad (14)$$

$$d\phi/d\eta = 2m\eta \quad (15)$$

Accordingly, as shown in FIG. 44A, a plurality of points $(P_1, P_2, \ldots, P_{n-1}, P_n)$ are set on a Z-axis that is angled to a specified angle (e.g., 45°) to the X- and Y-axes, preferably symmetrically with respect to the intersecting point of the X- and Y-axes, on the shearing interference figure. Then, while the diffraction grating is moved in the direction perpendicular to the grating, phases of the individual points $(P_1, P_2, \ldots, P_{n-1}, P_n)$ are determined. Further, coordinates Z of these points and phases $\phi_P(\phi_{P1}, \phi_{P2}, \ldots, \phi_{Pn-1}, \phi_{Pn})$ of the individual points are plotted on the coordinate system, and then a linear function ($\phi = a_p \cdot Z + b_p$) or quadratic function is fitted to plotted points. Furthermore, the first-order coefficient $a_p$ of this linear function or quadratic function is determined. Thus, the defocus can be determined.

Concrete procedure for evaluating the defocus is as follows:

(i) As shown in FIG. 44A, centers (optical axes O, $O_1$) of the diffracted rays (diffraction circles), the shearing axis (X-axis), a vertical bisector (Y-axis) of a line segment that interconnects the optical axes O, $O_1$, and a Z-axis that passes through the intersecting point of the X- and Y-axes and that is angled to a specified angle $\theta$ (30°$\leq\theta\leq$60°, preferably 45°) with respect to the X-axis are determined on the shearing interference figure;

(ii) A plurality of measuring points $(P_1, P_2, \ldots, P_{n-1}, P_n)$ are determined on the Z-axis. These measuring points are preferably placed symmetrical with respect to the intersecting point of the X- and Y-axes;

(iii) The diffraction grating is moved in a direction perpendicular to the grating;

(iv) Light intensities of the measuring points $(P_1, P_2, \ldots, P_{n-1}, P_n)$ are measured;

(v) With respect to the individual measuring points, phases $\phi_P(\phi_{P1}, \phi_{P2}, \ldots, \phi_{Pn-1}, \phi_{Pn})$ of the light-intensity sine waves are determined;

(vi) The Z-coordinates of the individual measuring points and their corresponding light-intensity phases $\phi_P(\phi_{P1}, \phi_{P2}, \ldots, \phi_{Pn-1}, \phi_{Pn})$ are plotted to the rectangular coordinate system;

(vii) A linear function, $\phi = a_p \cdot Z + b_p$, is fitted to the plotted points; and (viii) A first-order coefficient $a_p$ of the fitted linear function is determined, by which the defocus is evaluated.

As will be described later, the detection of spherical aberration can also be achieved by the spherical aberration detection method shown in the second embodiment.

Figure 45:
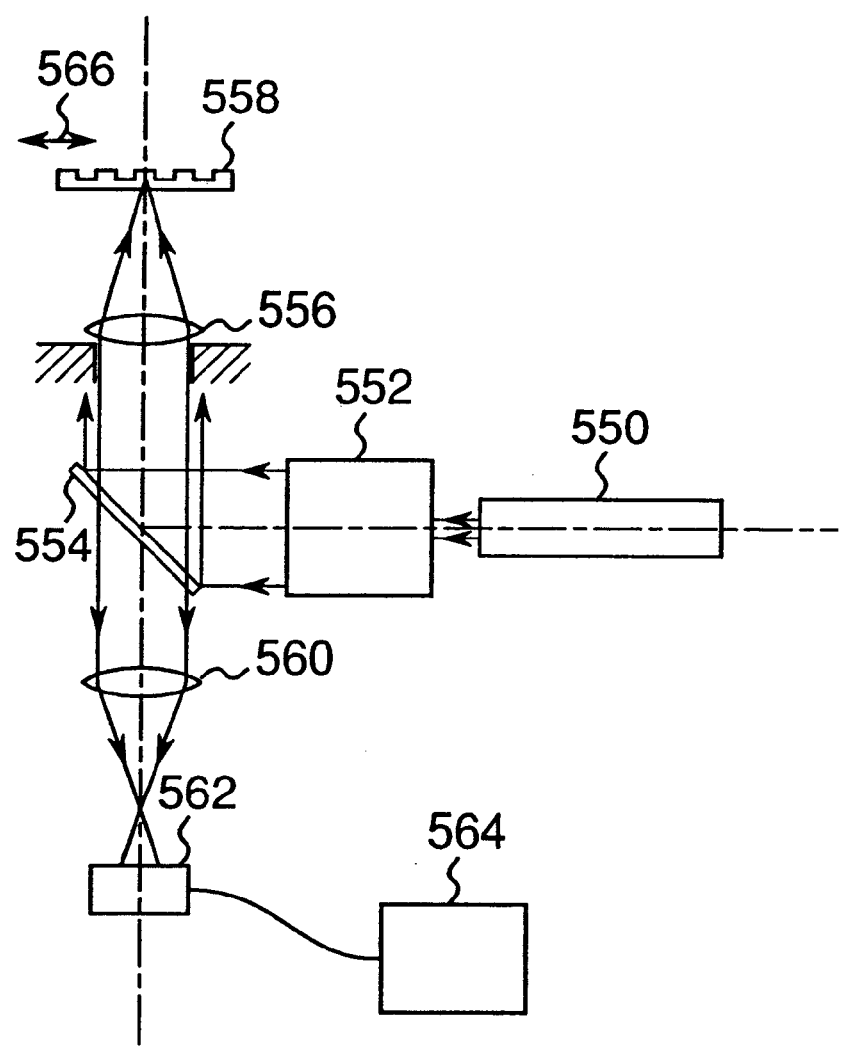
FIG. 45 is a view showing another embodiment of the lens evaluation system.

FIG. 45 shows another embodiment. In the lens evaluation system shown in this figure, a laser generation source 550 serving as a light source emits a laser beam. This laser beam has coherence and, for example, a helium neon laser beam can preferably be used therefor. The emitted laser beam is formed into generally parallel light having a beam diameter enlarged by a beam expander 552, thereafter changed in direction about 90 degrees by a half mirror 554 and directed to a reflecting diffraction grating 558 by a measurement-target lens 556. Diffracted light derived from the diffraction grating 558 is directed to be incident again on the lens 556. The diffraction grating 558 is so designed that a 0th-order diffracted ray and a +1st-order diffracted ray or −1st-order diffracted ray generate shearing interference at a pupillary surface of the lens 556. This shearing interfering light is returned to generally parallel light by the lens 556, transmitted by the half mirror 554, and passes through an image forming lens 560 so as to be incident on an image pickup device 562 (e.g., CCD sensor). The image forming lens 560 forms an image from the pupillary surface of the measurement-target lens 560 on the image pickup device 562. The image pickup device 562 is connected to a signal processing and display device 564, and an image received by the image pickup device 562 is displayed thereon.

Figure 46:
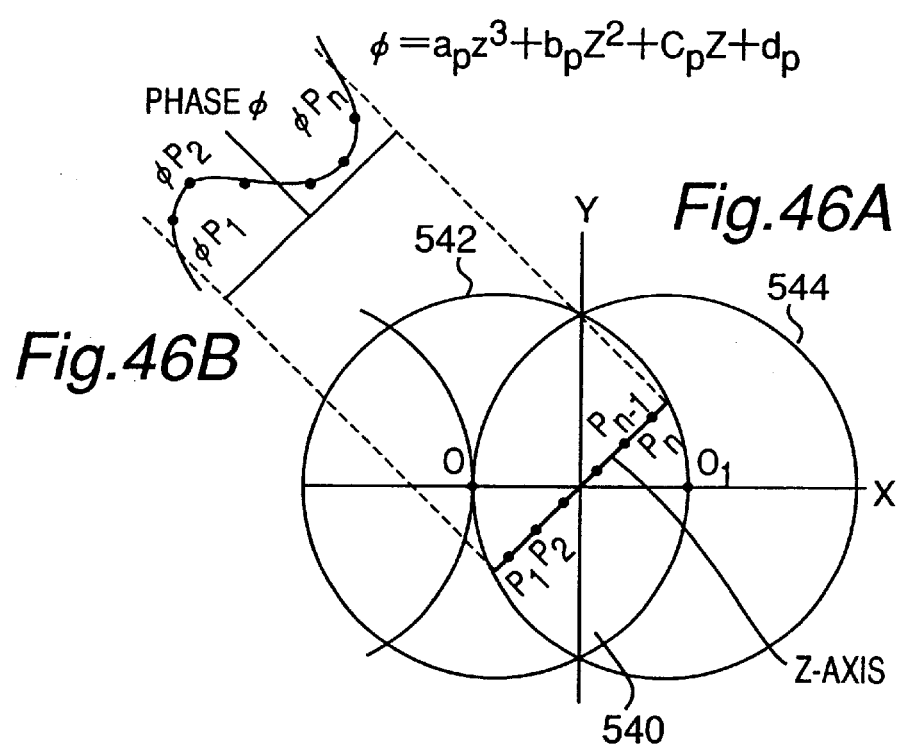
FIGS. 46A and B are views showing measuring points set in the interference region to determine spherical aberrations and a state in which a cubic function is fitted to phases measured at the measuring points.

Concrete procedure for evaluating the spherical aberration is as follows:

(i) As shown in FIG. 46A, centers (optical axes O, $O_1$) of the diffracted rays (diffraction circles) 542, 544, the shearing axis (X-axis), a vertical bisector (Y-axis) of a line segment that interconnects the optical axes O, $O_1$, and a Z-axis that passes through the intersecting point of the X- and Y-axes and that is angled to a specified angle $\theta$ (30°$\leq\theta\leq$60°, preferably 45°) with respect to the X-axis are determined on the shearing interference FIG. 540;

(ii) A plurality of measuring points $(P_1, P_2, \ldots, P_{n-1}, P_n)$ are determined on the Z-axis. These measuring points are preferably placed symmetrical with respect to the intersecting point of the X- and Y-axes;

(iii) The diffraction grating 558 is moved in a direction perpendicular to the grating by a transfer mechanism 566;

(iv) Light intensities of the measuring points $(P_1, P_2, \ldots, P_{n-1}, P_n)$ are measured;

(v) With respect to the individual measuring points, phases $\phi P(\phi_{P1}, \phi_{P2}, \ldots, \phi_{Pn-1}, \phi_{Pn})$ of the light-intensity sine waves are determined;

(vi) The Z-coordinates of the individual measuring points and their corresponding light-intensity phases $\phi_P(\phi_{P1}, \phi_{P2}, \ldots, \phi_{Pn-1}, \phi_{Pn})$ are plotted to the rectangular coordinate system as shown in FIG. 44B;

(vii) A cubic function, $\phi = a_p \cdot Z^3 + b_p \cdot Z^2 + c_p \cdot Z + d_p$, is fitted to the plotted points; and (viii) A third-order coefficient $a_p$ of the fitted cubic function is determined, by which the spherical aberration is evaluated.

The detection of spherical aberration and defocus can also be achieved by the method shown in the first embodiment.

As described above, with the lens evaluation method and system according to this embodiment, spherical aberration and defocus can correctly be detected without being affected by local bump and dip portions of the lens due to errors that have occurred during the manufacturing process of the lens mold.

IV. Fourth Embodiment

As a method for detecting fifth- and seventh-order spherical aberrations, there is a method in which interference fringes of a reference wave front and a measurement-target wave front are generated, for example, with a constitution shown in FIG. 47, and in which the aberrations of the target wave front are calculated from whole data of these fringes. In this method, coherent light from a light source 570 such as He—Ne laser is enlarged into generally parallel light by a beam expander 572, and divided into two light beams by a half mirror 574. One light beam (reference wave front) of the divided beams is reflected by a mirror 576, transmitted by the half mirror 574, being incident on an image pickup device 578. Meanwhile, the other light beam (target wave front) of the divided beams goes incident on a target lens 580, being focused into an image on a reference spherical mirror 582, thereafter reflected by the reference spherical mirror 582, passing through the target lens 580, being reflected by the half mirror 574, and being incident on the image pickup device 578. In this case, two light beams are overlapped with each other by the half mirror 574, causing interference fringes, and the interference fringes are received by the image pickup device (e.g., CCD), and further aberrations are calculated by a signal processor 584 by using the received interference fringes. For the calculation, data of the whole interference fringes are used and processed on the coordinate system having radius and angle axes. However, this method involves use of data of the whole interference fringes, requiring long time for the calculation process.

Figure 48:
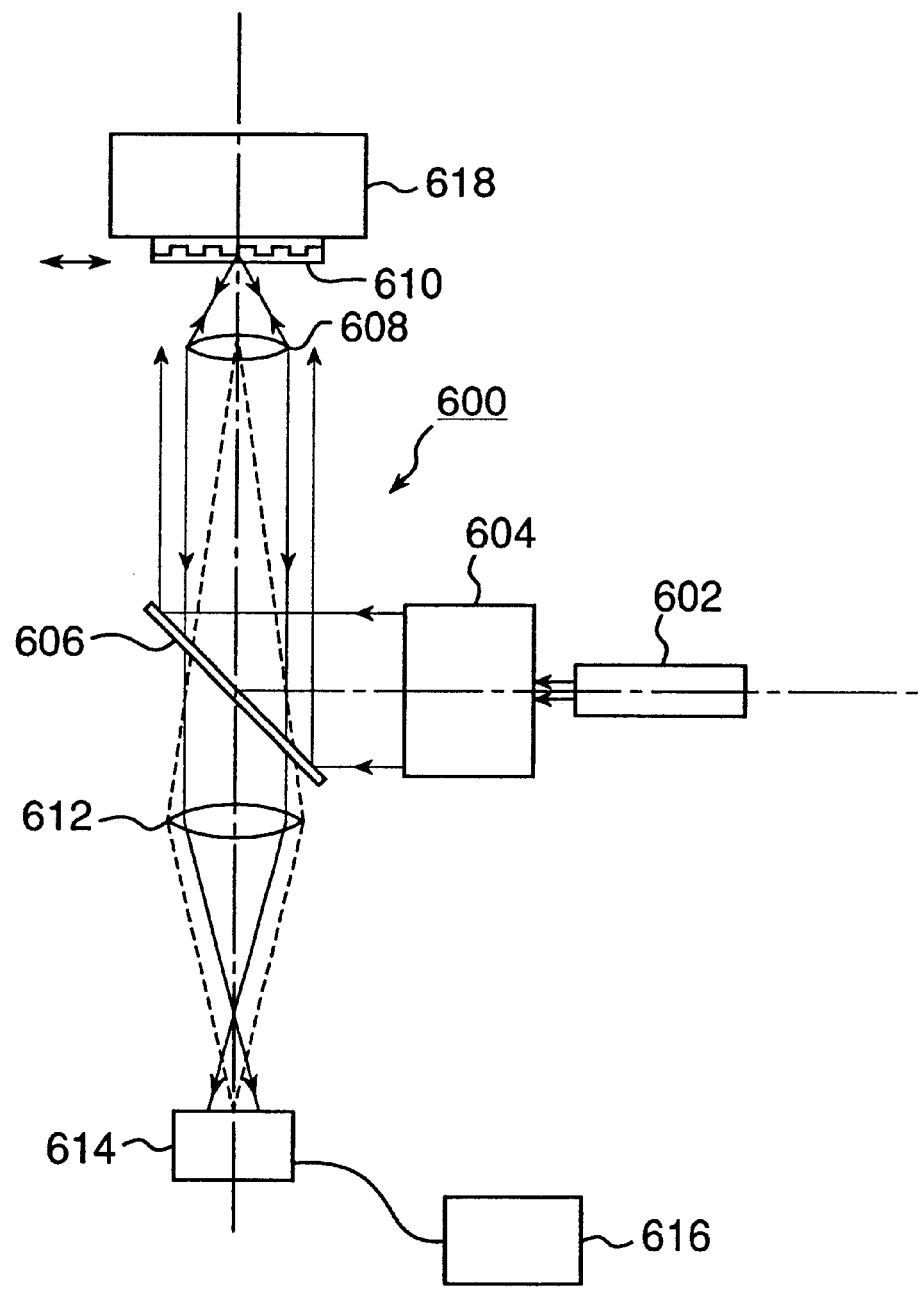
FIG. 48 is a view showing a method for detecting seventh-order spherical aberrations according to the present invention.

In an aberration evaluation system 600 shown in FIG. 48, a laser generation source 602 serving as a light source emits a laser beam. This laser beam has coherence and, for example, a helium neon laser beam can preferably be used therefor. The emitted laser beam is formed into generally parallel light having a beam diameter enlarged by a beam expander 604, thereafter changed in direction about 90 degrees by a half mirror 606 and directed to a reflecting diffraction grating 610 by a measurement-target lens 608. Diffracted light derived from the diffraction grating 610 is directed to be incident again on the lens 608. The diffraction grating 610 is so designed that a 0th-order diffracted ray and a +1st-order diffracted ray or −1st-order diffracted ray generate shearing interference at a pupillary surface of the lens 608. This shearing interfering light is returned to generally parallel light by the lens 608, transmitted by the half mirror 606, and passes through an image forming lens 612 so as to be incident on an image pickup device (image receiver) 614 (e.g., CCD). The image forming lens 612 forms an image from the pupillary surface of the measurement-target lens 608 on the image pickup device 614. The image pickup device 614 is connected to a signal processing and display device 616, and an image received by the image pickup device 614 is displayed thereon.

Given that a plane wave is referenced, a fifth-order spherical-aberration wave front is represented, in a coordinate system, by Equation (16) with a constant A:

$$\Phi = A(20(\xi^2+\eta^2)^3 - 30(\xi^2+\eta^2)^2 + 12(\xi^2+\eta^2) - 1) \quad (16)$$

Therefore, in the case of shearing in the $\xi$ direction and in the case of shearing in the $\eta$ direction, intensity differences (i.e., phase differences) between the two interfering rays of light with respect to the individual directions are expressed as functions of Equations (17) and (18) with respect to the shearing directions, respectively:

$$d\Phi/d\xi = A(120\xi(\xi^2+\eta^2)^2 - 120\xi(\xi^2+\eta^2) + 24\xi) \quad (17)$$

$$d\Phi/d\eta = A(120\eta(\xi^2+\eta^2)^2 - 120\eta(\xi^2+\eta^2) + 24\eta) \quad (18)$$

This can be understood also from the fact that the fifth-order spherical aberration appears as interference fringes shown in FIG. 50A on the shearing interference figure, given that the lens has no other aberrations or the like.

Therefore, as shown in FIG. 51, on a shearing interference figure, a plurality of points ($P_1, P_2, \ldots, P_{n-1}, P_n$) are set on a line segment that does not pass through centers O, $O_1$ and that is vertical to the shearing axis. Then, the diffraction grating 610 is moved in a direction perpendicular to its grating trenches, and Y-coordinates of the points ($P_1, P_2, \ldots, P_{n-1}, P_n$) and phases ($\phi_{P1}, \phi_{P2}, \ldots, P_{n-1}, \phi_{Pn}$) of the individual points are plotted on the coordinate system. Further, a biquadratic function is fitted to plotted points, by which the fifth-order spherical aberrations (the constant A in Equations (16) to (18)) can be quantitatively determined.

Concrete procedure for evaluating the fifth-order spherical aberration is as follows:

(i) As shown in FIG. 51, centers (optical axes O, $O_1$) of the diffracted rays (diffraction circles) and the shearing axis (X-axis) are determined on the interference figure;

(ii) On the interference figure, a plurality of measuring points ($P_1, P_2, \ldots, P_{n-1}, P_n$) are determined on a line segment that does not pass through the centers O, $O_1$ of a 0th-order diffracted ray and a +1st-order diffracted light ray, but passes through a point distant from the center O by a quarter distance of a line segment interconnecting O and $O_1$ (or a quarter of the center-to-center distance $OO_1$ from the center O), and further that is vertical to the shearing axis. These measuring points are preferably placed symmetrical with respect to the X-axis;

(iii) The diffraction grating 610 is moved in a direction perpendicular to the grating by a transfer mechanism 618;

(iv) Light intensities of the measuring points ($P_1, P_2, \ldots, P_{n-1}, P_n$) are measured;

(v) With respect to the individual measuring points, phases $\phi_P(\phi_{P1}, \phi_{P2}, \ldots, \phi_{Pn-1}, \phi_{Pn})$ of the light-intensity sine waves are determined;

(vi) The Y-coordinates of the individual measuring points and their corresponding light-intensity phases $\phi_P(\phi_{P1}, \phi_{P2}, \ldots, \phi_{Pn-1}, \phi_{Pn})$ are plotted to the rectangular coordinate system as shown in FIG. 51;

(vii) A biquadratic function ($\phi = a_4Y^4 + a_3Y^3 + a_2Y^2 + a_1Y + a_0$) or quintic function is fitted to the plotted points; and (viii) A fourth-order coefficient ($a_4$) of the fitted function is determined, by which the fifth-order spherical aberration is evaluated.

Figure 52:
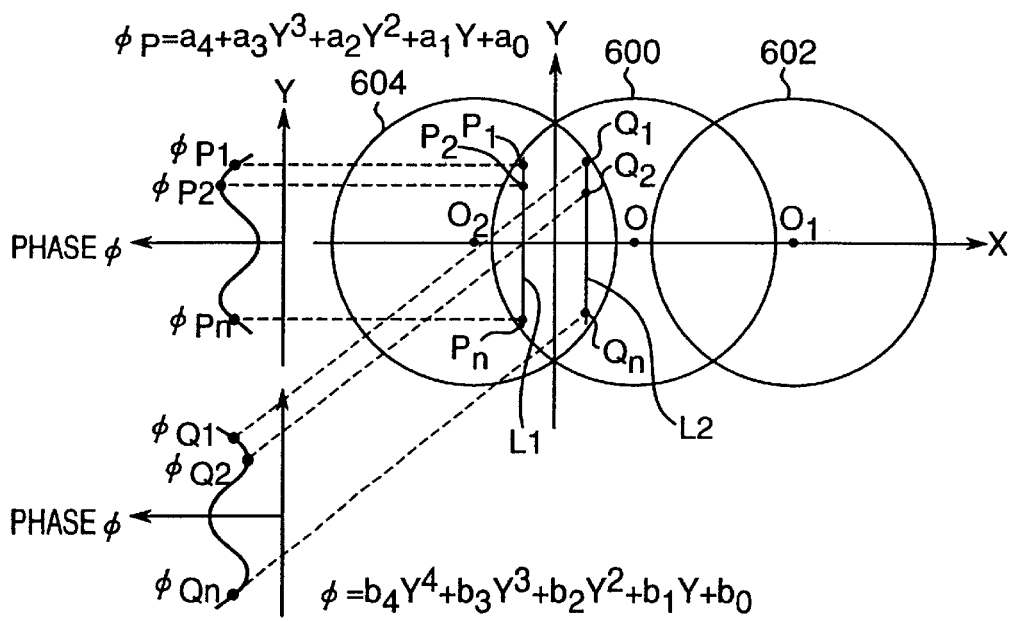
FIG. 52 is a view showing a method for detecting fifth-order spherical aberrations according to the present invention.

The fifth-order spherical aberration can be determined also by the following method. As shown in FIG. 52, on the shearing interference figure, a plurality of points ($P_1, P_2, \ldots, P_{n-1}, P_n$) are set on a line segment $L_1$ that does not pass through the centers O, $O_1$ and that is vertical to the shearing axis. Also, a plurality of points ($Q_1, Q_2, \ldots, Q_{n-1}, Q_n$) are set on a line segment $L_2$ vertical to the shearing axis on the side opposite to $L_1$ with the vertical bisector of the line segment interconnecting O and $O_1$ interposed therebetween. Then, the diffraction grating is moved in a direction perpendicular to its grating trenches, and Y-coordinates of the points ($P_1, P_2, \ldots, P_{n-1}, P_n$) and phases ($\phi_{P1}, \phi_{P2}, \phi_{Pn-1}, \phi_{Pn}$) of the individual points are plotted on the coordinate system. Further, a biquadratic function ($\phi_P = a_4Y^4 + a_3Y^3 + a_2Y^2 + a_1Y + a_0$) or quintic function is fitted to plotted points. Similarly, Y-coordinates of the points ($Q_1, Q_2, \ldots, Q_{n-1}, Q_n$) and phases $\phi_{Q1}, \phi_{Q2}, \ldots, \phi_{Qn-1}, \phi_{Qn}$) of the individual points are plotted on the coordinate system. Further, a biquadratic function ($\phi_Q = b_4Y^4 + b_3Y^3 + b_2Y^2 + b_1Y + b_0$) or quintic function is fitted to plotted points. By the difference of these coefficients, ($a_4 - b_4$), the fifth-order spherical aberrations (the constant A in Equations (16) to (18)) can be quantitatively determined. Thus, compared with the foregoing method, the fifth-order spherical aberration can be determined more correctly.

Concrete procedure for evaluating the fifth-order spherical aberration is as follows:

(i) As shown in FIG. 52, centers (optical axes O, $O_1$) of the diffracted rays (diffraction circles) and the shearing axis (X-axis) are determined on the interference figure;

(ii) On the interference figure, a plurality of measuring points ($P_1, P_2, \ldots, P_{n-1}, P_n$) are determined on a line $L_1$ that does not pass through the centers $O, O_1$ of a 0th-order diffracted ray and a +1st-order diffracted ray, but passes through a point distant from the center O by a quarter distance of a line segment interconnecting O and $O_1$ (or a quarter of the center-to-center distance $OO_1$ from the center O), and further that is vertical to the X-axis. These measuring points are desirably placed symmetrical with respect to the X-axis;

(iii) Within the interference region, a line segment $L_2$ vertical to the shearing axis is set on the side opposite to $L_1$ with the vertical bisector of the line segment interconnecting O and $O_1$ interposed therebetween, and a plurality of points ($Q_1, Q_2, \ldots, Q_{n-1}, Q_n$) are determined on $L_2$. These measuring points are desirably placed symmetrically with respect to the X-axis;

(iv) The diffraction grating 610 is moved in a direction perpendicular to the grating;

(v) Light intensities of the measuring points ($P_1, P_2, \ldots, P_{n-1}, P_n$), ($Q_1, Q_2, \ldots, Q_{n-1}, Q_n$) are measured;

(vi) With respect to the individual measuring points, phases $\phi_P(\phi_{P1}, \phi_{P2}, \ldots, \phi_{Pn-1}, \phi_{Pn})$, $\phi_Q(\phi_{Q1}, \phi_{Q2}, \ldots, \phi_{Qn-1}, \phi_{Qn})$ of the light-intensity sine waves are determined;

(vii) The Y-coordinates of the individual measuring points and their corresponding light-intensity phases $\phi_P(\phi_{P1}, \phi_{P2}, \ldots, \phi_{Pn-1}, \phi_{Pn})$ and $\phi Q(\phi_{Q1}, \phi_{Q2}, \ldots, \phi_{Qn-1}, \phi_{Qn})$ are plotted to the rectangular coordinate system as shown in FIG. 52;

(viii) Biquadratic functions ($\phi_P = a_4Y^4 + a_3Y^3 + a_2Y^2 + a_1Y + a_0$, $\phi_Q = b_4Y^4 + b_3Y^3 + b_2Y^2 + b_1Y + b_0$) or quintic functions are fitted to the plotted points; and (ix) Fourth-order coefficients ($a_4, b_4$) of the fitted functions are determined, and the fifth-order spherical aberration is evaluated from ($a_4 - b_4$).

Figure 53:
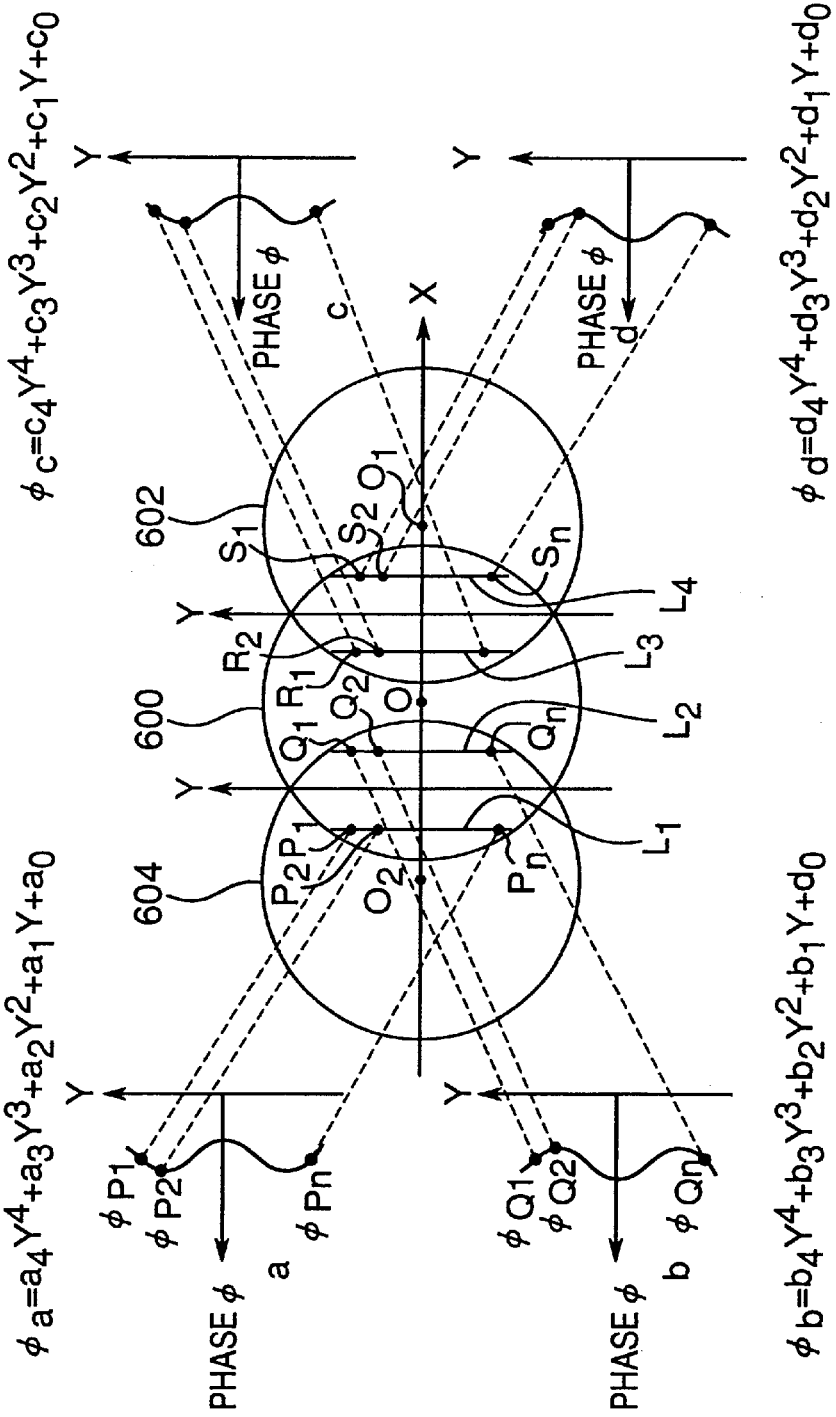
FIG. 53 is a view showing a method for detecting fifth-order spherical aberrations according to the present invention.

Further, the fifth-order spherical aberration can be determined also by the following method. As shown in FIG. 53, on a shearing interference figure of a 0th-order diffracted ray and a +1st-order diffracted ray, a plurality of points ($P_1, P_2, \ldots, P_{n-1}, P_n$) are set on a line segment $L_1$ that does not pass through the centers $O, O_1$ and that is vertical to the shearing axis. Also, a plurality of points ($Q_1, Q_2, \ldots, Q_{n-1}, Q_n$) are set on a line segment $L_2$ vertical to the shearing axis on the side opposite to $L_1$ with the vertical bisector of the line segment interconnecting O and $O_1$ interposed therebetween. Similarly, with $L_3, L_4$ determined on the shearing interference figure of the 0th-order diffracted ray and the −1st-order diffracted ray, a plurality of points ($R_1, R_2, \ldots, R_{n-1}, R_n$) and ($S_1, S_2, \ldots, S_{n-1}, S_n$) are set. Then, the diffraction grating 610 is moved in the direction perpendicular to the grating direction, Y-coordinates of the points ($P_1, P_2, \ldots, P_{n-1}, P_n$), ($Q_1, Q_2, \ldots, Q_{n-1}, Q_n$), ($R_1, R_2, \ldots, R_{n-1}, R_n$) and ($S_1, S_2, \ldots, S_{n-1}, S_n$) and phases ($\phi_{P1}, \phi_{P2}, \ldots, \phi_{Pn-1}, \phi_{Pn}$), ($\phi_{Q1}, \phi_{Q2}, \ldots, \phi_{Qn-1}, \phi_{Qn}$), ($\phi_{R1}, \phi_{R2}, \ldots, \phi_{Rn-1}, \phi_{Rn}$), and ($\phi_{S1}, \phi_{S2}, \ldots, \phi_{Sn-1}, \phi_{Sn}$) of the individual points are plotted on the coordinate system, and then biquadratic functions ($\phi_P = a_4Y^4 + a_3Y^3 + a_2Y^2 + a_1Y + a_0$), ($\phi_Q = b_4Y^4 + b_3Y^3 + b_2Y^2 + b_1Y + b_0$), ($\phi_R = c_4Y^4 + c_3Y^3 + c_2Y^2 + c_1Y + c_0$), and ($\phi_S = d_4Y^4 + d_3Y^3 + d_2Y^2 + d_1Y + d_0$) or quintic functions are fitted to plotted points. By sums and differences of these coefficients, ($a_4 - b_4 + c_4 - d_4$), the fifth-order spherical aberrations (the constant A in Equations (16) to (18)) can be quantitatively determined. According to this method, compared with the foregoing two methods, the fifth-order spherical aberration can be determined even more correctly.

Concrete procedure for evaluating the fifth-order spherical aberration is as follows:

(i) As shown in FIG. 53, centers (optical axes $O, O_1$) of the diffracted rays (diffraction circles) and the shearing axis (X-axis) are determined on the interference figure;

(ii) A plurality of measuring points ($P_1, P_2, \ldots, P_{n-1}, P_n$) are determined on a line $L_1$ that does not pass through the centers $O, O_1$ and that is vertical to the X-axis. These measuring points are desirably placed symmetrical with respect to the X-axis;

(iii) Within the interference region, a line segment $L_2$ vertical to the shearing axis is set symmetrical with respect to $L_1$ with the vertical bisector of the line segment interconnecting O and $O_1$ interposed therebetween, and a plurality of points ($Q_1, Q_2, \ldots, Q_{n-1}, Q_n$) are determined on $L_2$. These measuring points are desirably placed symmetrically with respect to the X-axis;

(iv) A plurality of measuring points ($R_1, R_2, \ldots, R_{n-1}, R_n$) are determined on a line $L_3$ that does not pass through the centers $O, O_2$ and that is vertical to the X-axis. These measuring points are desirably placed symmetrical with respect to the X-axis;

(v) Within the interference region, a line segment $L_4$ vertical to the shearing axis is set on the side opposite to $L_3$ with the vertical bisector of the line segment interconnecting O and $O_2$ interposed therebetween, and a plurality of points ($S_1, S_2, \ldots, S_{-1}, S_n$) are determined on $L_4$. These measuring points are desirably placed symmetrically with respect to the X-axis;

(vi) The diffraction grating 610 is moved in a direction perpendicular to the grating;

(vii) Light intensities of the measuring points ($P_1, P_2, \ldots, P_{n-1}, P_n$), ($Q_1, Q_2, \ldots, Q_{n-1}, Q_n$), ($R_1, R_2, \ldots, R_{n-1}, R_n$) and ($S_1, S_2, \ldots, S_{n-1}, S_n$) are measured;

(viii) With respect to the individual measuring points, phases $\phi_P(\phi_{P1}, \phi_{P2}, \ldots, \phi_{Pn-1}, \phi_{Pn})$, $\phi_Q(\phi_{Q1}, \phi_{Q2}, \ldots, \phi_{Qn-1}, \phi_{Qn})$, $\phi_R(\phi_{R1}, \phi_{R2}, \ldots, \phi_{Rn-1}, \phi_{Rn})$ and $\phi_S(\phi_{S1}, \phi_{S2}, \ldots, \phi_{Sn-1}, \phi_{Sn})$ of the light-intensity sine waves are determined;

(ix) The Y-coordinates of the individual measuring points and their corresponding light-intensity phases $\phi_P(\phi_{P1}, \phi_{P2}, \ldots, \phi_{Pn-1}, \phi_{Pn})$, $\phi_Q(\phi_{Q1}, \phi_{Q2}, \ldots, \phi_{Qn-1}, \phi_{Qn})$, $\phi_R(\phi_{R1}, \phi_{R2}, \ldots, \phi_{Rn-1}, \phi_{Rn})$ and $\phi_S(\phi_{S1}, \phi_{S2}, \ldots, \phi_{Sn-1}, \phi_{Sn})$ are plotted to the rectangular coordinate system as shown in FIG. 53;

(x) Biquadratic functions ($\phi_P = a_4Y^4 + a_3Y^3 + a_2Y^2 + a_1Y + a_0$, $\phi_Q = b_4Y^4 + b_3Y^3 + b_2Y^2 + b_1Y + b_0$, $\phi_R = c_4Y^4 + c_3Y^3 + c_2Y^2 + c_1Y + c_0$, $\phi S = d_4Y^4 + d_3Y^3 + d_2Y^2 + d_1Y + d_0$) or quintic functions are fitted to the plotted points; and (xi) Fourth-order coefficients ($a_4, b_4, c_4, d_4$) of the fitted functions are determined, and the fifth-order spherical aberration is evaluated from ($a_4 - b_4 + c_4 - d_4$)

In addition, also with the constitution shown in the second embodiment, a similar shearing interference pattern is obtained, and the fifth-order spherical aberration can be evaluated by the above-described process.

Figure 54:
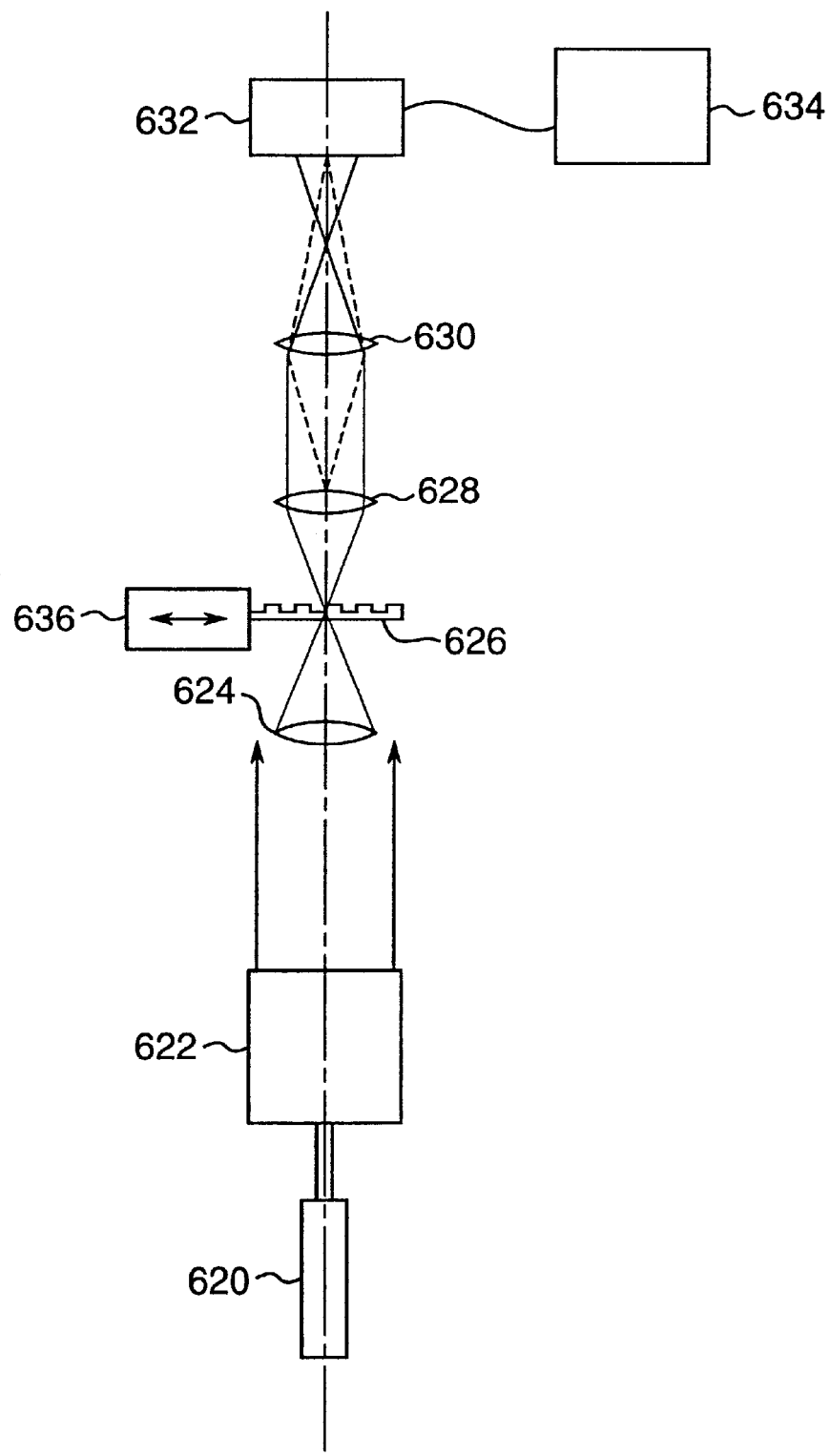
FIG. 54 is a view showing a method for detecting fifth-order spherical aberrations according to the present invention.

FIG. 54 shows another embodiment. In an aberration evaluation system shown in this figure, a laser generation source 620 serving as a light source emits a laser beam. This beam has coherence and, for example, a helium neon laser beam can preferably be used therefor. The emitted laser beam is formed into generally parallel light having a beam diameter enlarged by a beam expander 622, and thereafter directed to a transmission diffraction grating 626 by a measurement-target lens 624. Transmitted and diffracted light derived from the diffraction grating 626 is directed to be incident on a detecting lens 628. The diffraction grating 626 is so designed that a 0th-order diffracted ray and a +1st-order diffracted ray or −1st-order diffracted ray generate shearing interference at a pupillary surface of the lens 628. This shearing interfering light is returned to generally parallel light by the lens 628 and passes through an image forming lens 630 so as to be incident on an image pickup device 632 (e.g., CCD). The image forming lens 630 forms an image from the pupillary surface of the detecting lens 628 on the image pickup device 632. The image pickup device 632 is connected to a signal processing and display device 634, and an image captured by the image pickup device 632 is displayed thereon.

Figure 49:
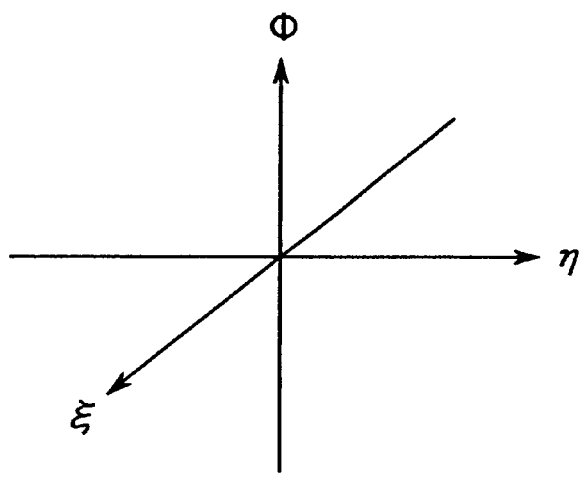
FIG. 49 is a schematic constitutional diagram of an embodiment of the aberration detecting system according to the present invention.

Given that a plane wave is referenced, a seventh-order spherical-aberration wave front is represented, in a coordinate system shown in FIG. 49, by Equation (19) with a constant B:

$$\Phi = B(70(\xi^2+\eta^2)^4 - 140(\xi^2+\eta^2)^3 + 90(\xi^2+\eta^2)^2 - 20(\xi^2+\eta^2) + 1) \quad (19)$$

Therefore, in the case of shearing in the $\xi$ direction and in the case of shearing in the $\eta$ direction, intensity differences (i.e., phase differences) between the two interfering rays of light with respect to the individual directions are expressed as functions of Equations (20) and (21) with respect to the shearing directions, respectively:

$$d\Phi/d\xi = B(560\xi(\xi^2+\eta^2)^3 - 840\xi(\xi^2+\eta^2)^2 + 360\xi(\xi^2+\eta^2) - 40\xi) \quad (20)$$

$$d\Phi/d\eta = B(560\eta(\xi^2+\eta^2)^3 - 840\eta(\xi^2+\eta^2)^2 + 360\eta(\xi^2+\eta^2) - 40\eta) \quad (21)$$

This can be understood also from the fact that the seventh-order spherical aberration appears as interference fringes on the shearing interference figure, given that the lens has no other aberrations or the like.

Figure 55:
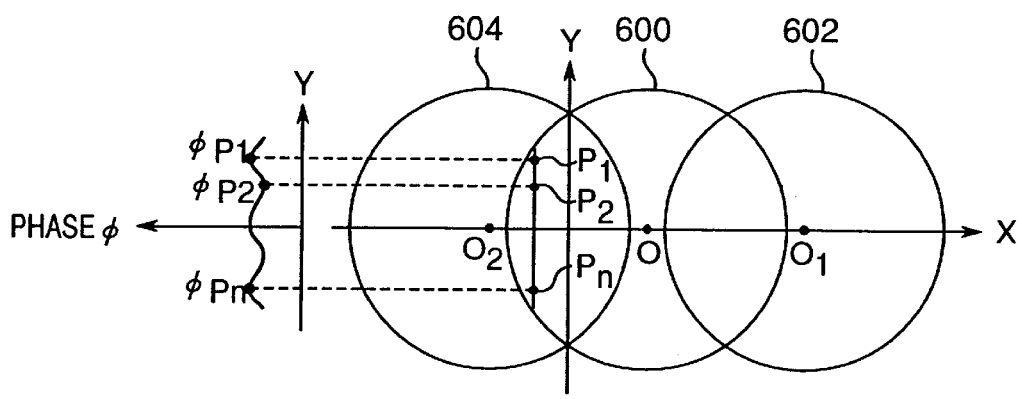
FIG. 55 is a schematic constitutional diagram of a second embodiment of the aberration detecting system according to the present invention.

Therefore, as shown in FIG. 55, on a shearing interference figure, a plurality of points ($P_1, P_2, \ldots, P_{n-1}, P_n$) are set on a line segment $L_1$ that does not pass through centers O, $O_1$ of a 0th-order diffracted ray, and a +1st-order diffracted ray but passes through a point distant from the center O by a quarter distance of a line segment interconnecting O and $O_1$ (or a quarter of the center-to-center distance $OO_1$ from the center O), and further that is vertical to the shearing axis. Then, the diffraction grating 626 is moved in a direction perpendicular to its grating trenches, and Y-coordinates of the points ($P_1, P_2, \ldots, P_{n-1}, P_n$) and phases ($\phi_{P1}, \phi_{P2}, \ldots, \phi_{Pn-1}, \phi_{Pn}$) of the individual points are plotted on the coordinate system. Further, a sextic function is fitted to plotted points, by which the seventh-order spherical aberrations (the constant B in Equations (19) to (21)) can be quantitatively determined.

Concrete procedure for evaluating the seventh-order spherical aberration is as follows:

(i) As shown in FIG. 55, centers (optical axes O, $O_1$) of the diffracted rays (diffraction circles) and the shearing axis (X-axis) are determined on the interference figure;

(ii) A plurality of measuring points ($P_1, P_2, \ldots, P_{n-1}, P_n$) are determined on a line $L_1$ that does not pass through the centers O, $O_1$ of the 0th-order diffracted ray and the +1st-order diffracted ray but passes through a point distant from the center O by a quarter distance of a line segment interconnecting O and $O_1$ (or a quarter of the center-to-center distance $OO_1$ from the center O), and further that is vertical to the X-axis. These measuring points are desirably placed symmetrical with respect to the X-axis;

(iii) The diffraction grating 626 is moved in a direction perpendicular to the grating by a transfer mechanism 636;

(iv) Light intensities of the measuring points ($P_1, P_2, \ldots, P_{n-1}, P_n$) are measured;

(v) With respect to the individual measuring points, phases $\phi_P(\phi_{P1}, \phi_{P2}, \ldots, \phi_{Pn-1}, \phi_{Pn})$ of the light-intensity sine waves are determined;

(vi) The Y-coordinates of the individual measuring points and their corresponding light-intensity phases $\phi_P(\phi_{P1}, \phi_{P2}, \ldots, \phi_{Pn-1}, \phi_{Pn})$ are plotted to the rectangular coordinate system as shown in FIG. 55;

(vii) A sextic function ($\phi_P = a_6 Y^6 + a_5 Y^5 + a_4 Y^4 + a_3 Y^3 + a_2 Y^2 + a_1 Y + a_0$) or septimal function is fitted to the plotted points; and (viii) A sixth-order coefficient ($a_6$) of the fitted function is determined, by which the seventh-order spherical aberration is evaluated.

In addition, as shown in the first embodiment, it is also possible to evaluate the seventh-order spherical aberration from differences among a plurality of sixth-order coefficients, by executing the same processing for not only the line segment $L_1$, but also for a line segment corresponding to $L_2$ or line segments corresponding to $L_2, L_3, L_4$. In such a case, the seventh-order spherical aberration can be evaluated even more correctly. Furthermore, by executing similar process not only in the interference region of 0th- and +1st-order diffracted rays, but also in the interference region of 0th- and −1st-order diffracted rays, the seventh-order spherical aberration may also be determined from the resulting mean values.

As described above, with the aberration evaluation method and system of this embodiment, the fifth- and seventh-order spherical aberrations can be detected at high speed.

What is claimed is:

1. A lens evaluation method comprising:
    diffracting light derived from a lens with a diffraction grating, so that two diffracted rays of different orders interfere with each other, thereby obtaining a shearing interference figure;
    moving the diffraction grating in a direction having a directional component perpendicular to a grating direction, thereby changing phases of the two diffracted rays;
    in the shearing interference figure, determining phases of light intensity changes at a plurality of measuring points on a measuring line which passes through a midpoint of a line segment interconnecting optical axes of the two diffracted rays; and
    determining characteristics of the objective lens based on the phases.

2. The lens evaluation method according to claim 1, wherein said determining of the characteristics includes, given that the measuring points are X and the phases are Y, fitting a function of the measuring points X to the phases Y, and evaluating characteristics of the lens by a coefficient value of the function.

3. The lens evaluation method according to claim 1, wherein the shearing interference figure of the two diffracted rays is transmitted by the lens.

4. A lens evaluation method comprising:
    condensing light emitted from a light source by an objective lens, projecting the condensed light onto a reflecting diffraction grating, collimating two diffracted rays of different orders reflected by the reflecting diffraction grating into generally parallel light, condensing the collimated generally parallel light by a condenser lens, focusing the condensed light onto an image receiving surface, and obtaining a shearing interference figure;
    moving the reflecting diffraction grating in a direction having a directional component perpendicular to a grating direction, thereby changing phases of the two diffracted rays;

in the shearing interference figure, determining phases of light intensity changes at a plurality of measuring points on a measuring line which passes through a midpoint of a line segment interconnecting optical axes of the two diffracted rays; and determining characteristics of the objective lens based on the phases.

5. The lens evaluation method according to claim 4, wherein said determining of the characteristics includes, given that the measuring points are X and the phases are Y, fitting a function of the measuring points X to the phases Y, and evaluating optical characteristics of the objective lens by a coefficient value of the function.

6. A lens evaluation method comprising:

condensing light emitted from a light source by an objective lens, projecting the condensed light onto a transmission diffraction grating, collimating two diffracted rays of different orders transmitted by the transmission diffraction grating into generally parallel light, condensing the collimated generally parallel light by a condenser lens, focusing the condensed light onto an image receiving surface, and obtaining a shearing interference figure;

moving the transmission diffraction grating in a direction having a directional component perpendicular to a grating direction, thereby changing phases of the two diffracted rays;

in the shearing interference figure, determining phases of light intensity changes at a plurality of measuring points on a measuring line which passes through a midpoint of a line segment interconnecting optical axes of the two diffracted rays; and determining characteristics of the objective lens based on the phases.

7. The lens evaluation method according to claim 6, wherein said determining of the characteristics includes, given that the measuring points are X and the phases are Y, fitting a function of the measuring points X to the phases Y, and evaluating optical characteristics of the objective lens by a coefficient value of the function.

8. The lens evaluation method according to claim 1, wherein the two diffracted rays are a 0th-order diffracted ray and either one of ±1st-order diffracted rays, or a +1st-order diffracted ray and a −1st-order diffracted ray.

9. The lens evaluation method according to claim 4, wherein the two diffracted rays are a 0th-order diffracted ray and either one of ±1st-order diffracted rays, or a +1st-order diffracted ray and a −1st-order diffracted ray.

10. The lens evaluation method according to claim 6, wherein the two diffracted rays are a 0th-order diffracted ray and either one of ±1st-order diffracted rays, or a +1st-order diffracted ray and a −1st-order diffracted ray.

11. The lens evaluation method according to claim 1, wherein the characteristics to be evaluated are defocus amount, coma, spherical aberration, astigmatism and any one of aberrations other than these aberrations.

12. The lens evaluation method according to claim 4, wherein the characteristics to be evaluated are defocus amount, coma, spherical aberration, astigmatism and any one of aberrations other than these aberrations.

13. The lens evaluation method according to claim 6, wherein the characteristics to be evaluated are defocus amount, coma, spherical aberration, astigmatism and any one of aberrations other than these aberrations.

14. A lens evaluation method comprising:

diffracting light derived from a lens with a diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining phases of light intensity changes at a plurality of measuring points on a line segment which passes through optical axes of the diffracted rays; and given that the measuring points are X and the phases are Y, fitting a linear function, or a function having a more than a first order, of the measuring points X to the phases Y, and evaluating defocus amount of an optical system by a first-order coefficient value of the fitted function.

15. A lens evaluation method comprising:

diffracting light derived from a lens with diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining phases of light intensity changes at a plurality of measuring points on a vertical bisector of a line segment interconnecting optical axes of the diffracted rays; and given that the measuring points are X and the phases are Y, fitting a quadratic function of the measuring points X to the phases Y, and evaluating coma by a second-order coefficient value of the quadratic function.

16. A lens evaluation method comprising:

diffracting light derived from a lens with a diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining phases of light intensity changes at a plurality of measuring points on two oblique lines which pass a midpoint of a line segment interconnecting optical axes of the diffracted rays and which form a specified angle in positive and negative directions to the line segment; and given that the measuring points are X and the phases are Y, fitting a quadratic function or cubic function of the measuring points X to the phases Y, and evaluating coma by a second-order coefficient value of the quadratic function or cubic function.

17. A lens evaluation method comprising:

diffracting light derived from a lens with a diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining phases of light intensity changes at a plurality of measuring points on a vertical bisector which passes a midpoint of a line segment interconnecting optical axes of the diffracted rays and on two oblique lines which form a specified angle in positive and negative directions to the line segment; and with respect to the vertical bisector, given that the measuring points are X and the phases are Y, fitting a quadratic function or cubic function of the measuring points X to the phases Y, and obtaining a second-order coefficient value of the quadratic function or cubic function, and with respect to the two oblique lines, given that the measuring points are X and the phases are Y, fitting a quadratic function or cubic function of the measuring points X to the phases Y, and obtaining a second-order coefficient value of the quadratic function or cubic function, and then evaluating coma by using a difference between the first and second second-order coefficient values.

18. A lens evaluation method comprising:

diffracting light derived from a lens with a diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

rotating a shearing direction of the shearing interference figure;

moving the diffraction grating in a direction having a directional component perpendicular to a grating direction, thereby changing phases of the diffracted rays;

in the shearing interference figure, determining phases of light intensity changes at a plurality of measuring points on a vertical bisector which interconnects optical axes of the diffracted rays; and given that the measuring points are X and the phases are Y, fitting a linear function, or a function having more than a first order, of the measuring points X to the phases Y, and evaluating astigmatism of an optical system by a first-order coefficient value of the fitted function.

19. The lens evaluation method according to claim 18, wherein said rotating of the shearing direction includes rotating the diffraction grating to a specified angle.

20. The lens evaluation method according to claim 18, wherein said rotating of the shearing direction includes rotating the lens to a specified angle.

21. The lens evaluation method according to claim 18, wherein said rotating of the shearing direction includes:

diffracting light with a first diffraction grating in which grating trenches are formed in a first direction; and diffracting light with a second diffraction grating in which grating trenches are formed in a direction other than the first direction.

22. A lens evaluation method comprising:

diffracting light derived from a lens with diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining phases of light intensity changes at a plurality of measuring points on a line segment which passes through optical axes of the diffracted rays; and given that the measuring points are X and the phases are Y, fitting a cubic function or biquadratic function of the measuring points X to the phases Y, and evaluating spherical aberration of an optical system by a third-order coefficient value of the cubic function or biquadratic function.

23. A lens evaluation method comprising:

diffracting light derived from a lens with diffraction grating, thereby obtaining a shearing interference figure of a 0th-order diffracted ray and either one of ±1st-order diffracted rays, or of a +1st-order diffracted ray and a −1st-order diffracted ray, on an image receiving surface;

moving the diffraction grating in a direction having a directional component perpendicular to a grating direction, thereby changing phases of the diffracted rays;

in the shearing interference figure, determining first phases of light intensity changes at a plurality of first measuring points on a line segment which interconnects optical axes of the diffracted rays, determining second phases of light intensity changes at a plurality of second measuring points on a vertical bisector of the line segment, determining third phases of light intensity changes at a plurality of third measuring points on a third oblique line which passes a midpoint of the line segment and which forms a specified angle in a positive direction to the line segment, and determining fourth phases of light intensity changes at a plurality of fourth measuring points on a fourth oblique line which passes the midpoint of the line segment and which forms a specified angle in a negative direction to the line segment;

given that the first measuring points are X and the first phases are Y, fitting a first function F of the first measuring points X to the first phases Y, given that the second measuring points are X and the second phases are Y, fitting a second function F of the second measuring points X to the second phases Y, given that the third measuring points are X and the third phases are Y, fitting a third function F of the third measuring points X to the third phases Y, and given that the fourth measuring points are X and the fourth phases are Y, fitting a fourth function F of the fourth measuring points X to the fourth phases Y, and then evaluating higher-order aberrations of an optical system based on a residual Δ between the first function F and the first phases Y, a residual Δ between the second function F and the second phases Y, a residual Δ between the third function F and the third phases Y, and a residual Δ between the fourth function F and the fourth phases Y.

24. A lens adjustment method for adjusting a condenser lens included in an optical system, said lens adjustment method comprising:

diffracting light transmitted by the condenser lens with a diffraction grating letting out shearing interfering light of two diffracted rays of different orders;

moving the diffraction grating in a direction having a directional component perpendicular to a grating direction;

receiving the shearing interfering light by an image receiver;

in an interference figure of the shearing interfering light received by the image receiver, determining phases of light intensity changes at a plurality of measuring points on a measuring line which passes through a midpoint of a line segment interconnecting optical axes of the two diffracted rays, and detecting characteristics of the condenser lens based on the phases with a characteristic detector; and adjusting a position of the condenser lens with an adjustment mechanism based on a detection result of the characteristic detector.

25. The lens adjustment method according to claim 20, further comprising:

receiving reflected light or transmitted light of the lens with an image receiver; and adjusting a position of the lens with a lens adjustment mechanism based on information upon light received by the image receiver.

26. The lens adjustment method according to claim 24, wherein the condenser lens has a marginal surface around a lens surface, and said lens adjustment method further comprises receiving reflected light or transmitted light of the marginal surface by an image receiver.

27. The lens adjustment method according to claim 24, wherein the diffraction grating is a reflecting diffraction grating.

28. The lens adjustment method according to claim 24, wherein the diffraction grating is a transmission diffraction grating.

29. A lens adjustment method for adjusting a condenser lens included in an optical system, said lens adjustment method comprising:

collimating light emitted from a light source into generally parallel light, the generally parallel light incident on the condenser lens;

while moving a reflecting diffraction grating in a direction having a directional component perpendicular to a grating direction, reflecting and diffracting the light condensed by the condenser lens with the reflecting diffraction grating, shearing interfering light of two diffracted rays of different orders thereby being incident on the condenser lens;

forming an image of the shearing interfering light emitted from the condenser lens;

receiving the image of the shearing interfering light with an image receiver; and in the shearing interference figure received by the image receiver, determining phases of light intensity changes at a plurality of measuring points on a measuring line which passes through a midpoint of a line segment interconnecting optical axes of the two diffracted rays, and determining characteristics of the condenser lens based on the phases with a characteristic detector, the characteristic detector:

in the shearing interference figure, determining phases of light intensity changes at a plurality of measuring points on a line which interconnects optical axes of the two diffracted rays; and given that the measuring points are X and the phases are Y, fitting a linear function of the measuring points X to the phases Y, and evaluating defocus amount of the optical system by a first-order coefficient value of the linear function.

30. A lens adjustment method for adjusting a condenser lens included in an optical system, said lens adjustment method comprising:

step for collimating light emitted from a light source into generally parallel light, the generally parallel light being incident on the condenser lens;

while moving a transmission diffraction grating in a direction having a directional component perpendicular to a grating direction, transmitting and diffracting light condensed by the condenser lens with the transmission diffraction grating, shearing interfering light of two diffracted rays of different orders thereby being incident on a second condenser lens;

forming an image of the shearing interfering light emitted from the second condenser lens;

receiving the image of the shearing interfering light with an image receiver; and in the shearing interference figure received by the image receiver, determining phases of light intensity changes at a plurality of measuring points on a measuring line which passes through a midpoint of a line segment interconnecting optical axes of the two diffracted rays, and determining characteristics of the condenser lens based on the phases with a characteristic detector, the characteristic detector:

in the shearing interference figure, determining phases of light intensity changes at a plurality of measuring points on a line which interconnects optical axes of the two diffracted rays; and given that the measuring points are X and the phases are Y, fitting a linear function of the measuring points X to the phases Y, and evaluating defocus amount of the optical system by a first-order coefficient value of the linear function.

31. A lens adjustment method for adjusting a condenser lens included in an optical system, said lens adjustment method comprising:

collimating light emitted from a light source into generally parallel light, the generally parallel light being incident on the condenser lens;

while moving a reflecting diffraction grating in a direction having a directional component perpendicular to a grating direction, reflecting and diffracting light condensed by the condenser lens with the reflecting diffraction grating, shearing interfering light of two diffracted rays of different orders thereby being incident on the condenser lens;

forming an image of the shearing interfering light emitted from the condenser lens;

receiving the image of the shearing interfering light with an image receiver; and in the shearing interference figure received by the image receiver, determining phases of light intensity changes at a plurality of measuring points on a measuring line which passes through a midpoint of a line segment interconnecting optical axes of the two diffracted rays, and determining characteristics of the condenser lens based on the phases with a characteristic detector, the characteristic detector:

in the shearing interference figure, determining phases of light intensity changes at a plurality of measuring points on two oblique lines which pass a midpoint of a line segment interconnecting optical axes of the two diffracted rays and which form a specified angle in positive and negative directions to the line segment; and with respect to the individual oblique lines, given that the measuring points are X and the phases are Y, fitting a quadratic function or cubic function of the measuring points X to the phases Y, and evaluating coma by a second-order coefficient value of the quadratic function or cubic function.

32. A lens adjustment method for adjusting a condenser lens included in an optical system said lens adjustment method comprising:

collimating light emitted from a light source into generally parallel light, the generally parallel light being incident on the condenser lens;

while moving a transmission diffraction grating in a direction having a directional component perpendicular to a grating direction, transmitting and diffracting the light condensed b y the condenser lens with the transmission diffraction grating, shearing interfering light of two diffracted rays of different orders thereby being incident on a second condenser lens;

forming an image of the shearing interfering light emitted from the second condenser lens;

receiving the image of the shearing interfering light with an image receiver; and in the shearing interference figure received by the image receiver, determining phases of light intensity changes at a plurality of measuring points on a measuring line which passes through a midpoint of a line segment interconnecting optical axes of the two diffracted rays, and determining characteristics of the condenser lens based on the phases with a characteristic detector, the characteristic detector;

in the shearing interference figure, determining phases of light intensity changes at a plurality of measuring points on two oblique lines which pass a midpoint of a line segment interconnecting optical axes of the two diffracted rays and which form a specified angle in positive and negative directions to the line segment; and with respect to the individual oblique lines, given that the measuring points are X and the phases are Y, fitting a quadratic function or cubic function of the measuring points X to the phases Y, and evaluating coma by a second-order coefficient value of the quadratic function or cubic function.

33. An optical unit adjustment method comprising:

preparing a reflecting-and-transmission diffraction grating which has a layer made of a reflective material and a plurality of parallel light-pervious windows formed at specified intervals, and which is placed across an optical axis of light emitted from an optical unit so as to reflect incident light, and further which diffracts light transmitted by the plurality of light-pervious windows so that two diffracted rays of different orders interfere with each other, thus obtaining a shearing interference figure;

moving the reflecting-and-transmission diffraction grating in a direction having a directional component perpendicular to a grating direction;

detecting characteristics of the optical unit from the shearing interference figure with a detector;

adjusting the optical unit based on a detection result of the detector;

moving the reflecting-and-transmission diffraction grating in the optical-axis direction;

receiving an image of light reflected by the reflecting-and-transmission diffraction grating with a light receiving element; and adjusting a position of the light receiving element based on an intensity of the light received by the light receiving element.

34. An optical unit adjustment method comprising:

preparing a reflecting-and-transmission diffraction grating in which a plurality of parallel trenches are provided in a surface of a plate made of a light-pervious material with specified intervals, the surface being covered with a semi-light-pervious material, and which is placed across an optical axis of light emitted from an optical unit so as to reflect the incident light, and further which diffracts light transmitted by the plurality of parallel trenches so that two diffracted rays of different orders interfere with each other, thus obtaining a shearing interference figure;

moving the reflecting-and-transmission diffraction grating in a direction having a directional component perpendicular to a grating direction;

detecting characteristics of the optical unit from the shearing interference figure with a detector;

adjusting the optical unit based on a detection result of the detector;

moving the reflecting-and-transmission diffraction grating in the optical-axis direction;

receiving an image of light reflected by the reflecting-and-transmission diffraction grating with a light receiving element; and adjusting a position of the light receiving element based on an intensity of the light received by the light receiving element.

35. An optical unit adjustment method for adjusting an optical unit having a lens, said optical unit adjustment method comprising:

preparing a holder having a transparent plate and a transmission diffraction grating which diffracts light emitted from the optical unit and forms a shearing interference figure of diffracted rays of different orders;

moving the transmission diffraction grating to an operative position transverse across an optical axis of light transmitted by the lens;

detecting characteristics of the optical unit from the shearing interference figure transmitted by the transmission diffraction grating placed at the operative position;

adjusting the optical unit based on the detected characteristics of the optical unit;

moving the transparent plate to an operative position transverse across an optical axis of light transmitted by the lens;

detecting a positional shift between a center of light intensity distribution and a center of the lens from an image transmitted by the transparent plate placed at the operative position; and adjusting the lens based on the detected positional shift.

36. A lens evaluation method comprising:

diffracting light derived from a lens so that two diffracted rays of different orders interfere with each other, thereby obtaining a shearing interference figure;

changing phases of the two diffracted rays;

in the shearing interference figure, determining phases of light intensity changes at a plurality of measuring points on a line segment which does not pass through a midpoint of a line segment interconnecting optical axes of the two diffracted rays and which is vertical to a line interconnecting the two optical axes; and given that the measuring points are Y and the phases are $\phi$, fitting a quadratic function or cubic function of the measuring points Y to the phases $\phi$, and evaluating spherical aberration of the lens by a second-order coefficient value of the function.

37. A lens evaluation method comprising:

diffracting light derived from a lens so that two diffracted rays of different orders interfere with each other, thereby obtaining a shearing interference figure;

changing phases of the two diffracted rays;

in the shearing interference figure, determining phases of light intensity changes at a plurality of measuring points on a line segment which passes through a midpoint of a line segment interconnecting optical axes of the two diffracted rays and which forms a specified angle to a line interconnecting the two optical axes; and given that the measuring points are Z and the phases are $\phi$, fitting a cubic function or biquadratic function of the measuring points Z to the phases $\phi$, and evaluating spherical aberration of the lens by a third-order coefficient value of the function.

38. A lens evaluation method comprising:

diffracting light derived from a lens so that two diffracted rays of different orders interfere with each other, thereby obtaining a shearing interference figure;

changing phases of the two diffracted rays;

in the shearing interference figure, determining phases of light intensity changes at a plurality of measuring points on a line segment which passes through a midpoint of a line segment interconnecting optical axes of the two diffracted rays and which forms a specified angle to a line interconnecting the two optical axes; and given that the measuring points are Z and the phases are $\phi$, fitting a linear function or quadratic function of the measuring points Z to the phases $\phi$, and evaluating defocus of the lens by a first-order coefficient value of the function.

39. The lens evaluation method according to claim 36, wherein the two diffracted rays are a 0th-order diffracted ray and either one of ±1st-order diffracted rays, or a +1st-order diffracted ray and a −1st-order diffracted ray.

40. The lens evaluation method according to claim 37, wherein the two diffracted rays are a 0th-order diffracted ray and either one of ±1st-order diffracted rays, or a +1st-order diffracted ray and a −1st-order diffracted ray.

41. The lens evaluation method according to claim 38, wherein the two diffracted rays are a 0th-order diffracted ray and either one of ±1st-order diffracted rays, or a +1st-order diffracted ray and a −1st-order diffracted ray.

42. A lens evaluation method comprising:

diffracting light derived from a lens so that two diffracted rays of different orders interfere with each other, thereby obtaining a shearing interference figure;

changing phases of the two diffracted rays;

in the shearing interference figure, determining phases of light intensity changes at a plurality of measuring points on a line segment which does not pass through a midpoint of a line segment interconnecting optical axes of the two diffracted rays and which is vertical to a line interconnecting the two optical axes; and given that the measuring points are Y and the phases are $\phi$, fitting a biquadratic function or quintic function of the measuring points Y to the phases $\phi$, and evaluating fifth-order spherical aberration of the lens by a fourth-order coefficient value of the function.

43. A lens evaluation method comprising:

diffracting light derived from a lens so that two diffracted rays of different orders interfere with each other, thereby obtaining a shearing interference figure;

changing phases of the two diffracted rays;

in the shearing interference figure, setting line segments which do not pass through a midpoint of a line segment interconnecting optical axes of the two diffracted rays and which are vertical to a line interconnecting the two optical axes, on both sides of a vertical bisector of a line segment interconnecting the two optical axes, and determining phases of light intensity change at a plurality of measuring points on the individual set line segments; and given that the measuring points are $Y_1, Y_2$ and the phases are $\phi_1, \phi_2$, fitting biquadratic functions or quintic functions of the measuring points $Y_1, Y_2$ to the phases $\phi_1, \phi_2$, and, given that fourth-order coefficient values of the two functions are $a_4$ and $b_4$, respectively, evaluating fifth-order spherical aberration of the lens by a difference between $a_4$ and $b_4$.

44. A lens evaluation method comprising:

diffracting light derived from a lens so that two diffracted rays of different orders interfere with each other, thereby obtaining a shearing interference figure;

changing phases of the two diffracted rays;

in the shearing interference figure, determining phases of light intensity changes at a plurality of measuring points on a line segment which passes through a midpoint of a line segment interconnecting optical axes of the two diffracted rays and which forms a specified angle to a line interconnecting the two optical axes; and given that the measuring points are Y and the phases are $\phi$, fitting a sextic function or septimal function of the measuring points Y to the phases $\phi$, and evaluating seventh-order spherical aberration of the lens by a sixth-order coefficient value of the function.

45. A lens evaluation method comprising:

diffracting light derived from a lens so that two diffracted rays of different orders interfere with each other, thereby obtaining a shearing interference figure;

changing phases of the two diffracted rays;

in the shearing interference figure, setting line segments which do not pass through a midpoint of a line segment interconnecting optical axes of the two diffracted rays and which are vertical to a line interconnecting the two optical axes, on both sides of a vertical bisector of a line segment interconnecting the two optical axes, and determining phases of light intensity change at a plurality of measuring points on the individual set line segments; and given that the measuring points positions are $Y_1$, $Y_2$ and the phases are $\phi_1$, $\phi_2$, fitting sextic functions or septimal functions of the measuring points $Y_1$, $Y_2$ to the phases $\phi_1$, $\phi_2$, and, given that sixth-order coefficient values of the two functions are $a_6$ and $b_6$, respectively, evaluating seventh-order spherical aberration of the lens by a difference between $a_6$ and $b_6$.

46. The lens evaluation method according to claim 42, wherein the two diffracted rays are a 0th-order diffracted ray and either one of ±1st-order diffracted rays, or a +1st-order diffracted ray and a −1st-order diffracted ray.

47. The lens evaluation method according to claim 43, wherein the two diffracted rays are a 0th-order diffracted ray and either one of ±1st-order diffracted rays, or a +1st-order diffracted ray and a −1st-order diffracted ray.

48. The lens evaluation method according to claim 44, wherein the two diffracted rays are a 0th-order diffracted ray and either one of ±1st-order diffracted rays, or a +1st-order diffracted ray and a −1st-order diffracted ray.

49. The lens evaluation method according to claim 45, wherein the two diffracted rays are a 0th-order diffracted ray and either one of ±1st-order diffracted rays, or a +1st-order diffracted ray and a −1st-order diffracted ray.

* * * * *

UNITED STATES PATENT AND TRADEMARK OFFICE
CERTIFICATE OF CORRECTION

PATENT NO. : 6,809,829 B1
DATED : October 26, 2004
INVENTOR(S) : Kazumasa Takata et al.

It is certified that error appears in the above-identified patent and that said Letters Patent is hereby corrected as shown below:

Column 34,
Line 49, replace "evaluating" with -- evaluating the --.

Column 37,
Line 15, replace "second-order" with -- first second-order --.
Line 21, replace "second-order" with -- second second-order --.

Column 39,
Line 49, replace "light" with -- light being --.

Column 40,
Line 17, delete "step for".

Column 41,
Line 21, replace "system" with -- system, --.
Line 29, replace "b y" with -- by --.
Line 45, replace "detector;" with -- detector: --.

Column 45,
Line 4, replace "points positions" with -- points --.

Signed and Sealed this

Fifteenth Day of March, 2005

JON W. DUDAS
*Director of the United States Patent and Trademark Office*